(12) United States Patent
Ohki

(10) Patent No.: US 6,750,790 B2
(45) Date of Patent: Jun. 15, 2004

(54) DATA-ENCODING APPARATUS, DATA-ENCODING METHOD, DATA-DECODING APPARATUS, DATA-DECODING METHOD, DATA-TRANSMITTING APPARATUS, DATA-RECEIVING APPARATUS, DATA STORAGE MEDIUM AND COMPUTER PROGRAMS

(75) Inventor: Mitsuharu Ohki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/437,792

(22) Filed: May 14, 2003

(65) Prior Publication Data

US 2004/0004627 A1 Jan. 8, 2004

(30) Foreign Application Priority Data

May 15, 2002 (JP) ........................................ 2002-140623

(51) Int. Cl.$^7$ ................................................ H03M 7/00
(52) U.S. Cl. .......................................... 341/50; 341/137
(58) Field of Search ............................ 341/50, 51, 137

(56) References Cited

U.S. PATENT DOCUMENTS 4,652,942 A * 3/1987 Eto ............................ 386/124

6,384,744 B1 * 5/2002 Philyaw et al. ............... 341/50

\* cited by examiner

*Primary Examiner*—Brian Young
(74) *Attorney, Agent, or Firm*—Frommer Lawrence & Haug LLP; William S. Frommer

(57) ABSTRACT

The space of the two-dimensional blinking pattern is divided into a plurality of resolution sub-spaces onto which the data to be transmitted is mapped in an encoding process. A data-receiving apparatus with a resolution thereof reduced to an insufficient level due to a long distance between the data-receiving apparatus and the data-transmitting apparatus is capable of reading a two-dimensional blinking pattern obtained as a result of a process to encode the data to be transmitted in a low-resolution sub-space. On the other hand, a data-receiving apparatus with a sufficient resolution is capable of reading a two-dimensional blinking pattern resulting from a process to encode the data to be transmitted in a high-resolution sub-space. As a result, even if a data-receiving apparatus is at a location far away from the data-transmitting apparatus, the data-receiving apparatus is capable of obtaining information to a certain degree, allowing a person carrying the data-receiving apparatus to form a judgment as to whether or not it is necessary for the person to approach the data-transmitting apparatus in order to obtain more detailed information.

19 Claims, 37 Drawing Sheets

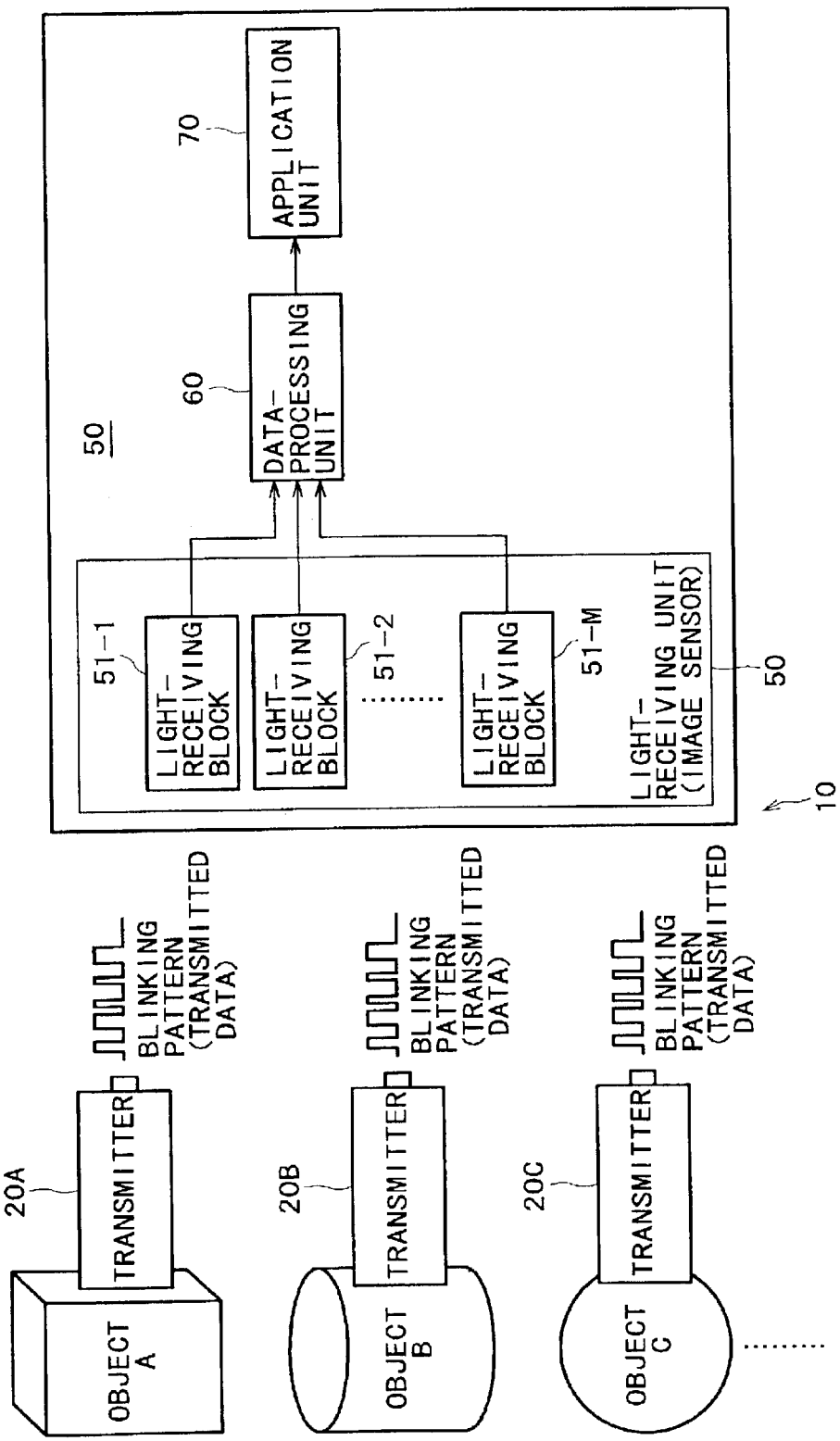

F I G. 1 7
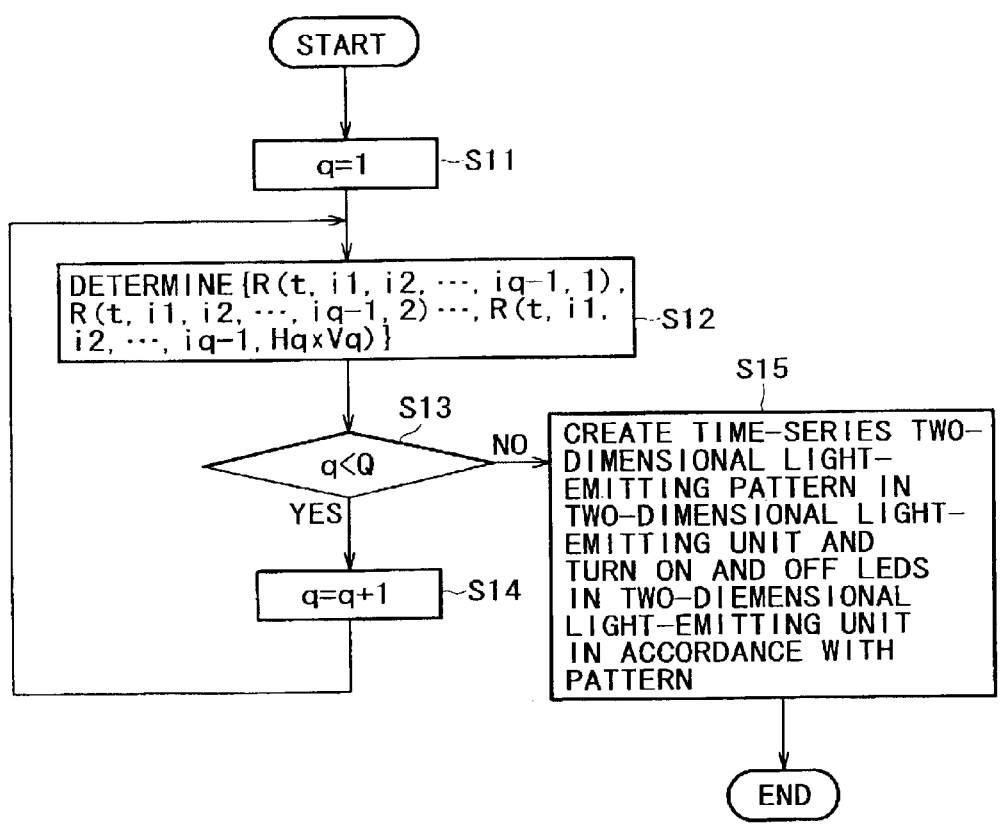

DATA-ENCODING APPARATUS, DATA-ENCODING METHOD, DATA-DECODING APPARATUS, DATA-DECODING METHOD, DATA-TRANSMITTING APPARATUS, DATA-RECEIVING APPARATUS, DATA STORAGE MEDIUM AND COMPUTER PROGRAMS

CROSS-REFERENCE TO RELATED APPLICATIONS

This application claims the benefit of priority to Japanese application No. 2002-140623, filed May 15, 2002, the contents of which are herein incorporated by reference.

BACKGROUND OF THE INVENTION

In general, the present invention relates to a system including a data-transmitting apparatus having a data-encoding apparatus adopting a data-encoding method for encoding data to be transmitted in a real space and including a data-receiving apparatus having a data-decoding apparatus adopting a data-decoding method for decoding the transmitted data obtained as a result of encoding, as well as relates to computer programs implementing the data-encoding method and the data-decoding method. More particularly, the present invention relates to a system including a data-transmitting apparatus having a data-encoding apparatus adopting a data-encoding method for encoding data to be transmitted as an optical signal representing a light-blinking pattern obtained as a result of encoding and including a data-receiving apparatus having a data-decoding apparatus adopting a data-decoding method for decoding the transmitted optical signal, as well as relates to computer programs implementing the data-encoding method and the data-decoding method.

To put it in detail, the present invention relates to a system including a data-transmitting apparatus having a data-encoding apparatus adopting a data-encoding method for encoding data to be transmitted into a light-blinking pattern of light-emitting sources laid out to form a two-dimensional matrix and including a data-receiving apparatus having a data-decoding apparatus adopting a data-decoding method for decoding the transmitted light-blinking pattern into the original data, as well as relates to computer programs implementing the data-encoding method and the data-decoding method. More particularly, the present invention relates to a system including a data-transmitting apparatus having a data-encoding apparatus adopting a data-encoding method for encoding data to be transmitted into a light-blinking pattern of light-emitting sources laid out to form a two-dimensional matrix and for transmitting the light-blinking pattern at a bit rate according to a distance from the data-transmitting apparatus to a data-receiving apparatus and including the data-receiving apparatus having a data-decoding apparatus adopting a data-decoding method for decoding the transmitted light-blinking pattern, as well as relates to computer programs implementing the data-encoding method and the data-decoding method.

In this present day of an advanced information-processing technology and an advanced information communication technology, information apparatus such as personal computers and portable information terminals universally exist in the real world such as offices and homes. In such an environment, the apparatus are connected to each other so that implementations of a ubiquitous computing system and an AR (Augmented Reality) system can be expected. The ubiquitous computing system is a system for obtaining desired information. On the other hand, the AR system is a system actively using circumstances in the real world. The circumstances in the real world include matters of the real world and the position of the user.

The concept of the ubiquitous computing is introduced to make the environment of a computer unchanged without regard to the place at which the user is present. Since the concept of the ubiquitous computing brings about a computing capability at any time and at any place, an ultimate ubiquitous computing system does not necessarily require an information terminal such as a computer, a PDA (Personal Digital Assistant) and a hand phone.

In operations carried out by the user to specify a computer or a peripheral apparatus as a data transmission destination within a network and to obtain a circumstance of the real world, however, the user must know the name of a partner even if the partner exists right in front of the user. An example of the peripheral apparatus is a transmission target such as a user terminal. Examples of the circumstance of the real world include the position of the user and information related to a real-world object. Instead of knowing the name of a partner, the user must know a resource identifier such as an ID unique to the partner apparatus and/or the network address of the partner apparatus, a host name or a URL/URI. That is to say, in the operations carried out by the user, collaboration with the computer exists only in an indirect form and there is a lack of an intuitive sense.

As a technology for transmitting the identification of the user and acquiring a real-world circumstance such as the position of the user without following such a complicated-procedure, there have been proposed techniques of utilizing real-world computing such as a technique of using visual codes including cyber codes and RF tags. By adopting any of these techniques, it is not necessary for the user to make an access to the network in a conscious manner. Instead, the user is capable of obtaining information related to an object from the object ID, which is automatically picked up.

For example, for an identification such as a visual code or an RF tag, the function of an application or the like, an apparatus ID, a network address, a host name, a URL or other object-related information is registered in advance. Then, in response to a cyber code recognized from a picture taken by a camera, the computer executes the registered application. For example, the computer activates a mail program. Then, the computer searches for a network address of the partner on the basis of the recognized ID to automatically establish a connection with the partner and to make an access to the resource indicated by the recognized URL.

If visual identification information such as a visual code is used, however, the size of the code changes in accordance with the distance. That is to say, the size of the code of an object located far away is small so that it is necessary to form a code having a large pattern for recognizing an object located far away. In other words, an information transmission method based on this technique has a lack of robustness in the case of a long distance. In order to recognize a building located far away, for example, it is necessary to paste a huge code on the building and such a huge code pasted on the building is not realistic.

In addition, in the case of an RF tag, the user must orient the RF tag in a direction toward a tag-reading apparatus or must take the RF tag into contact with the tag-reading apparatus. That is to say, only an object at a short distance can be recognized and an object at a long distance cannot.

In order to solve this problem, there has been proposed a data communication system for implementing data transmissions including long-distance transmissions of data at different resolutions as disclosed in Japanese Patent Application No. 2002-57836 describing a specification of an invention, the patent of which was granted to the applicant for a patent of the present invention. In this system, data is transmitted as an optical signal for conveying identification and other data in an optical format, and is detected by using an advanced two-dimensional image sensor.

A data-transmitting apparatus employed in the above system extracts portions each having a predetermined length from a bit stream of data being transmitted and transforms each of the extracted portions into a display pattern by using a predetermined transformation table. The display pattern appears on blinking light-emitting sources such as LEDs, which in turn generate an optical signal. Thus, prior to a transmission of data, the data-transmitting apparatus encodes the data to be transmitted not into a color spatial pattern such as a visual code, but into a time-series optical signal such as a blinking pattern, which does not change in accordance with the distance between the data-transmitting apparatus and a data-receiving apparatus.

The image sensor serving as a receiver employed in the data-receiving apparatus comprises a countless number of light-receiving devices (that is, pixels), which are arranged to form a two-dimensional array as is the case with a CMOS (Complementary Metal Oxide Semiconductor) sensor and a CCD (Charge Coupled Device) sensor. The image sensor decodes the received optical signal and its spatial information at all the pixels. As an ordinary camera, the image sensor is used for shooting a scene and is capable of receiving an optical signal in its field of vision even if the optical signal is transmitted by a data-transmitting apparatus located far away from the data-receiving apparatus.

Assume for example that a transmitter including light-emitting units implemented typically by at least two LEDs laid out at predetermined physical locations is installed for a real-world object such as a piece of indoor furniture, an indoor electrical appliance or an outdoor building. The transmitter extracts portions each having a predetermined length from a bit stream of data being transmitted and transforms each of the extracted portions into a blinking display pattern by using a predetermined transformation table. The blinking display pattern puts the light-emitting units in a blinking state, transmitting the data. On the other hand, the receiver has a two-dimensional light-receiving surface used as a light-receiving unit capable of decoding the received blinking pattern into the original data on the basis of a transformation table and capable of recognizing spatial information on the real-world object on the basis of the blinking pattern's detection location on the two-dimensional light-receiving surface.

Transmitted data output by the transmitter includes a resource identification such as the ID of the object, its network address, a host name, a URL or a URI, or other object-related information.

Applications of the data communication system using an optical signal include a system in which a number of LEDs is arranged to form a matrix in the data-transmitting apparatus and the optical signal is transmitted by the data-transmitting apparatus as a two-dimensional blinking pattern appearing on the matrix of LEDs.

In the case of a system using such a two-dimensional blinking pattern as transmission media, however, the distance between the data-transmitting apparatus and the data-receiving apparatus becomes a problem. If the image sensor employed in the data-receiving apparatus has a resolution insufficient for the distance between the data-transmitting apparatus and the data-receiving apparatus, for example, the data-receiving apparatus is not capable of receiving information at all. That is to say, the data-receiving apparatus is not capable of receiving any information unless the data-receiving apparatus is taken to a location close enough to the data-transmitting apparatus so that the state of blinking of the LED matrix in the data-transmitting apparatus can be recognized completely. In other words, there is a lack of robustness in the case of a long distance.

In such a case, the data-receiving apparatus is taken to a location close enough to the data-transmitting apparatus in order to solve the problem. In actuality, however, the person carrying the data-receiving apparatus approaches the data-transmitting apparatus only to find out that the transmitted information is information not required at all by the person so that the person becomes aware of the fact that the move to approach the data-transmitting apparatus has been wasteful. In a word, in a system using a two-dimensional blinking pattern as transmission media, there is a lack of robustness in the case of a long distance.

SUMMARY OF THE INVENTION

It is thus an object of the present invention addressing the problems described above to provide a data-transmitting apparatus having a data-encoding apparatus adopting a data-encoding method capable of well encoding data to be transmitted as an optical signal representing a light-blinking pattern obtained as a result of encoding, relates to a data-receiving apparatus having a data-decoding apparatus adopting a data-decoding method capable of well decoding the transmitted optical signal, relates to computer programs implementing the data-encoding method and the data-decoding method as well as relates to a storage medium for storing the computer programs.

It is another object of the present invention addressing the problems described above to provide a data-transmitting apparatus having a data-encoding apparatus adopting a data-encoding method capable of well encoding data to be transmitted into a blinking pattern of light-emitting sources laid out to form a two-dimensional matrix, relates to a data-receiving apparatus having a data-decoding apparatus adopting a data-decoding method capable of well decoding the blinking pattern received from the data-transmitting apparatus, relates to computer programs implementing the data-encoding method and the data-decoding method as well as relates to a storage medium for storing the computer programs.

In accordance with a first aspect of the present invention, there is provided a data-encoding apparatus or a data-encoding method used for mapping data onto a pattern in a two-dimensional picture space, including:

space-disassembling means for or a space-disassembling step of disassembling the two-dimensional picture space into a plurality of picture sub-spaces having resolution different from each other; and data-mapping means for or a data-mapping step of mapping the data onto a pattern in any one of the picture sub-spaces that has a resolution suitable for the data.

In accordance with a second aspect of the present invention, there is provided a data-decoding apparatus or a data-decoding method used for decoding data obtained as a result of a mapping process in a two-dimensional picture space, including:

space-disassembling means for or a space-disassembling step of disassembling the two-dimensional picture space into one or more picture sub-spaces having resolution different from each other; and data-decoding means for or a data-decoding step of decoding the data obtained as a result of a mapping process in any one of the picture sub-spaces that has a resolution suitable for the data.

Applications of the data communication system using an optical signal include a system in which a number of LEDs is arranged to form a matrix in the data-transmitting apparatus and the optical signal is transmitted by the data-transmitting apparatus as a two-dimensional blinking pattern appearing on the matrix of LEDs. In the case of a system using such a two-dimensional blinking pattern as transmission media, however, the distance between the data-transmitting apparatus and the data-receiving apparatus becomes a problem. If the image sensor employed in the data-receiving apparatus has a resolution insufficient for the distance between the data-transmitting apparatus and the data-receiving apparatus, for example, the data-receiving apparatus is not capable of receiving information at all.

In order to solve the problem described above, in accordance with the present invention, the two-dimensional picture space is divided into a plurality of resolution sub-spaces having resolution different from each other, and data is mapped onto a pattern in a subspace with a resolution suitable for the data. Thus, a data-receiving apparatus with a resolution thereof reduced to an insufficient level due to a long distance between the data-receiving apparatus and the data-transmitting apparatus is capable of reading a two-dimensional blinking pattern obtained as a result of a process carried out by the data-transmitting apparatus to encode the data to be transmitted in a sub-space at a low-resolution. By observation of a two-dimensional picture space at a short distance between the data-receiving apparatus and the data-transmitting apparatus at a sufficient resolution due to the short distance, on the other hand, the data-receiving apparatus is capable of reading a two-dimensional blinking pattern resulting from a process to encode the data to be transmitted in a sub-space at high-resolution. As a result, even if a data-receiving apparatus is at a location far away from the data-transmitting apparatus, the data-receiving apparatus is capable of obtaining information to a certain degree, allowing a person carrying the data-receiving apparatus to form a judgment as to whether or not it is necessary for the person to approach the data-transmitting apparatus in order to obtain more detailed information.

In this case, the two-dimensional picture space typically comprises a plurality of light-emitting devices laid out on a two-dimensional planar surface. Thus, in the data-mapping means or at the data-mapping step, data can be mapped onto a blinking pattern having ON ratios for areas each consisting of $n_i$ light-emitting devices of the two-dimensional picture space in the picture sub-space having the ith resolution suitable for the data where the ON ratio for an area is a ratio of the number of ON light-emitting devices in the area to the total number of all light-emitting devices in the same area. In this case, for j<k, the relation $n_j$<$n_k$ holds true where symbols j and k each denote a resolution whereas symbols $n_j$ or $n_k$ denotes the number of light-emitting devices in an area in a sub-space with the jth or kth resolution respectively. In addition, in the data-decoding means or at the data-decoding step, a blinking pattern having ON ratios for areas each including $n_i$ light-emitting devices of the two-dimensional picture space in the picture sub-space having the ith resolution suitable for the original data can be restored to the original data.

Furthermore, in the data-mapping means or at the data-mapping step, it is possible to determine the resolution of the picture sub-space, in which data is to be encoded, in accordance with the size of the data to be encoded.

Moreover, in the data-mapping means or at the data-mapping step, it is possible to map desired data onto a two-dimensional blinking pattern in the two-dimensional picture space's picture sub-space at a lower resolution so that the two-dimensional blinking pattern can be observed at a low resolution insufficient for a picture sub-space with a higher resolution.

In addition, in the data-mapping means or at the data-mapping step, it is possible to map more detailed data onto a two-dimensional blinking pattern in a picture sub-space at a high resolution and to map abstracted rough data onto a two-dimensional blinking pattern in a picture sub-space at a low resolution.

Furthermore, in the data-mapping means or at the data-mapping step, it is possible to add data for correcting errors to each picture sub-space having a resolution. In such a case, the data-receiving apparatus is capable of knowing the number of errors included in information at a hierarchical layer of each resolution. If such a system is used and the number of errors detected by the data-receiving apparatus at a specific hierarchical layer is too large, it is possible to prevent a two-dimensional blinking pattern at a hierarchical layer with a frequency higher than the specific hierarchical layer from being decoded.

Moreover, in the data-mapping means or at the data-mapping step, in a process to encode data of a computer graphic, it is possible to map geometrical data of a drawing object onto a two-dimensional blinking pattern in a picture sub-space at a low resolution and texture data of the drawing object onto a two-dimensional blinking pattern in a picture sub-space at a high resolution. In addition, it is also possible to change the resolution of the picture sub-space, in which a mapping process is to be carried out, in accordance with a frequency component of the texture data.

Normally, an ordinary person will probably orient the camera employed in the data-receiving apparatus carried by the person to the right front surface of a data-transmitting apparatus, which serves as a source transmitting information of interest to the person. With the camera oriented in such a direction, a source transmitting information of no interest to the person will probably appear as a picture on an edge of the screen of the camera even if the picture of such a source is taken by the camera. With the camera oriented to the right front surface of a source transmitting information of interest to the person, the person sees the right front surface of the information-emitting source, and the data-receiving apparatus is capable of recognizing two-dimensional blinking patterns in picture sub-spaces at all resolution. That is to say, in this case, the data-receiving apparatus is capable of receiving all data of a computer graphic. Thus, a three-dimensional virtual object of the computer graphic can be reproduced from information on the three-dimensional virtual object's contours and very fine textures, and then displayed on a monitor.

In accordance with a third aspect of the present invention, there is provided a data-transmitting apparatus used for outputting transmitted data in a format of an optical signal, including:

two-dimensional light-emitting means including a plurality of light-emitting devices arranged on a two-dimensional planar surface;

space-disassembling means for disassembling a two-dimensional picture space of blinking states of the light-emitting devices included in the two-dimensional light-emitting means into a plurality of picture sub-spaces having resolution different from each other; and data-mapping means for mapping data to be transmitted onto a blinking pattern in any one of the picture sub-spaces that has a resolution suitable for the data, wherein the blinking pattern obtained as a result of a mapping process carried out by the data-mapping means is output by the light-emitting devices included in the two-dimensional light-emitting means.

In accordance with a fourth aspect of the present invention, there is provided a data-receiving apparatus used for receiving data transmitted in a format of an optical signal, including:

shooting means for shooting an optical blinking pattern spread over a two-dimensional planar surface;

space-disassembling means for disassembling a two-dimensional picture space into one or more picture subspaces having resolution different from each other; and data-decoding means for decoding data obtained as a result of a mapping process in any one of the picture sub-spaces that has a resolution suitable for the data.

In accordance with the third and fourth aspects of the present invention, the data-transmitting apparatus disassembles a two-dimensional picture space into a plurality of picture sub-spaces having resolution different from each other, and maps data to be transmitted onto a two-dimensional blinking pattern in any one of the picture sub-spaces that has a resolution suitable for the data prior to a transmission of the blinking pattern. Thus, the data-receiving apparatus is capable of reading a two-dimensional blinking pattern obtained as a result of a mapping process carried out by the data-transmitting apparatus in a picture sub-space at a low resolution in an observation of the two-dimensional picture space at an insufficient resolution caused by the fact that the data-receiving apparatus is at a location far away from the data-transmitting apparatus. In addition, the data-receiving apparatus is capable of reading a two-dimensional blinking pattern obtained as a result of a mapping process carried out by the data-transmitting apparatus in a picture sub-space at a high resolution in an observation of the two-dimensional picture space at an sufficient resolution caused by the fact that the data-receiving apparatus is at a location close to the data-transmitting apparatus. As a result, even if a data-receiving apparatus is at a location far away from the data-transmitting apparatus, the data-receiving apparatus is capable of obtaining information to a certain degree, allowing a person carrying the data-receiving apparatus to form a judgment as to whether or not it is necessary for the person to approach the data-transmitting apparatus in order to obtain more detailed information.

In this case, the two-dimensional picture space typically comprises a plurality of light-emitting devices laid out on a two-dimensional planar surface. Thus, in the data-mapping means or at the data-mapping step, data can be mapped onto a blinking pattern having predetermined ON ratios for areas each consisting of $n_i$ light-emitting devices of the two-dimensional picture space in the picture sub-space having the ith resolution suitable for the data where the ON ratio for an area is a ratio of the number of ON light-emitting devices in the area to the total number of all light-emitting devices in the same area. In this case, for j<k, the relation $n_j<n_k$ holds true where symbols j and k each denote a resolution whereas symbols $n_j$ or $n_k$ denotes the number of light-emitting devices in an area in a sub-space with the jth or kth resolution respectively. In addition, in the data-decoding means or at the data-decoding step, a blinking pattern having ON ratios for areas each consisting of $n_i$ light-emitting devices of the two-dimensional picture space in the picture sub-space having the ith resolution suitable for the original data can be restored to the original data.

In this case, the data-receiving apparatus may be provided with a perspective projection means for carrying out a perspective-projection process on a two-dimensional picture space's two-dimensional blinking pattern photographed by the shooting means. If the line of sight of the shooting means toward the two-dimensional picture space is oriented in a slanting direction, the photographed perspective two-dimensional blinking pattern of the two-dimensional picture space can be transformed into a pattern of the two-dimensional picture space seen from a location right in front of the two-dimensional picture space.

In the data-transmitting apparatus, it is possible to vary the display time of a blinking pattern, which is obtained as a result of a mapping process carried out by the data-mapping means, in accordance with the resolution of the picture sub-space in which the mapping process is performed. For example, the display time of the blinking pattern is set at a large value for a picture sub-space having a high resolution. That is to say, since the data-transmitting apparatus is capable of transmitting a low-frequency portion at a low speed, that is, at a relatively small value of the ratio P (q):q, the data-receiving apparatus is capable of taking a picture in P (q) units by lengthening the exposure time. As a result, a data-receiving apparatus is capable of receiving information of a low-frequency portion transmitted by the data-transmitting apparatus even if the data-receiving apparatus is located far away from the data-transmitting apparatus and, hence, prone to insufficient exposure.

In addition, in accordance with a fifth aspect of the present invention, there is provided a computer program, which is written in a format that can be read by a computer, is prescribed for execution on a computer system for carrying out a data-encoding process to map data onto a blinking pattern in a two-dimensional image space and is characterized in that the computer program comprises:

a space-disassembling step of disassembling the two-dimensional picture space into a plurality of picture sub-spaces having resolution different from each other; and a data-mapping step of mapping data to be transmitted onto a blinking pattern in any one of the picture sub-spaces that has a resolution suitable for the data.

Furthermore, in accordance with a sixth aspect of the present invention, there is provided a computer program, which is written in a format that can be read by a computer, is prescribed for execution on a computer system for carrying out a data-decoding process to decode data obtained as a result of a mapping process carried out in a two-dimensional image space and is characterized in that the computer program comprises:

a space-disassembling step of disassembling the two-dimensional picture space into one or more picture sub-spaces having resolution different from each other; and a data-decoding step of decoding data obtained as a result of a mapping process in any one of the picture sub-spaces that has a resolution suitable for the data.

The computer programs according to the fifth and sixth aspects of the present invention are each a program written in a format that can be read by a computer and prescribed for carrying out a predetermined process on a computer system.

In other words, by installing the computer programs according to the fifth and sixth aspects of the present invention into the computer system, collaboration functions can be exhibited by the computer system to give the same effects as the data-encoding apparatus according to the first aspect of the present invention and the data-encoding method adopted by the data-encoding apparatus as well as the data-decoding apparatus according to the second aspect of the present invention and the data-decoding method adopted by the data-decoding apparatus.

Other objects, characteristics and advantages according to the present invention will probably become obvious from a study of the following detailed descriptions of preferred embodiments of the present invention with reference to the following diagrams.

BRIEF DESCRIPTION OF THE DRAWINGS

FIG. 1 is a diagram showing a model of the basic configuration of a data communication system using an optical signal;

FIG. 17 shows a flowchart representing the procedure of a process carried out by an encoder employed in a transmitting apparatus;

PREFERRED EMBODIMENTS OF THE INVENTION

Figure 2:
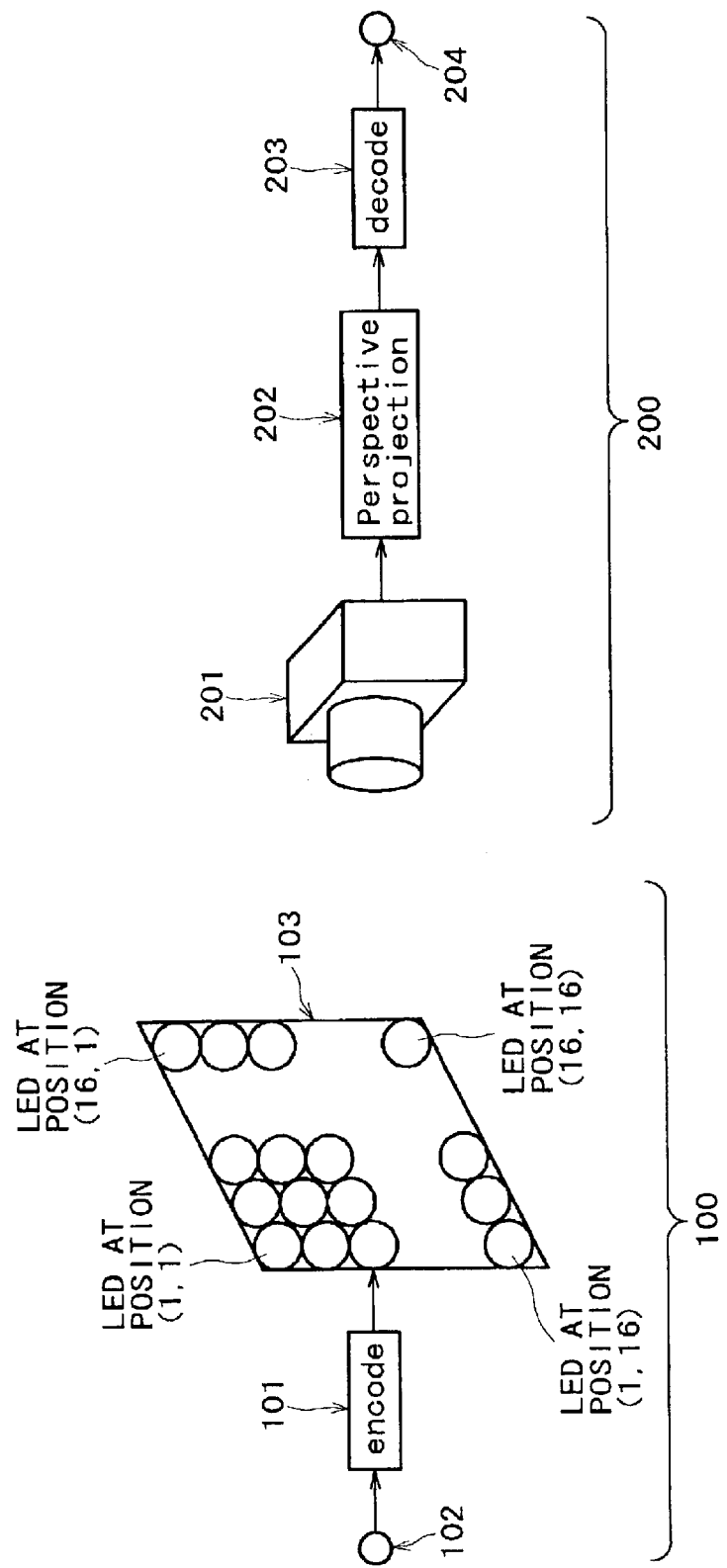
FIG. 2 is a diagram showing a model of the basic configuration of a data communication system using for transmitting and receiving an optical signal representing a two-dimensional blinking pattern.

Preferred embodiments are explained in detail by referring to the diagrams as follows.

The present invention is implemented by recognition of visually recognizable identification information shot by using a camera through utilization of a ubiquitous network for transmission of data. To put it in detail, for a physical object existing in a real world, a plurality of pieces of optical identification information are furnished. Then, a picture of the object is taken and subjected to picture-processing and picture recognition processes prior to interpretation of the data transmitted from the object.

As optical identification information to be provided as information on an object existing in a real world, it is possible to use visual code encoded into a colored spatial pattern and an optical signal generated by a blinking optical source such as an LED (Light Emitting Diode). In the case of an optical signal, the signal is encoded to generate a signal including a blinking pattern spread along the time series and the data represented by the signal including a blinking pattern is transmitted so as to allow robust data transmission along the time series over a long distance.

An image sensor used for shooting a blinking pattern has a configuration in which countless pixels each serving as a light-receiving device are laid out over a two-dimensional array as is the case with a CMOS (Complementary Metal Oxide Semiconductor) sensor and a CCD (Charge Couple Device) sensor. An optical signal and spatial information thereof are decoded by all the pixels. The image sensor is used as an ordinary camera for taking a picture of a scene and capable of receiving optical signals, which are spread over the image sensor's field of vision and generated by a source located at a long distance.

First of all, the principle of a data communication system using an optical signal as data transmission media is explained.

FIG. 1 is a diagram showing a model of the basic configuration of a data communication system 10 using an optical signal as data transmission media. As shown in the figure, the data communication system 10 includes transmitters 20A, 20B, 20C and so on as well as a receiver 50 carried by the user. The transmitters 20A, 20B, 20C and so on are installed on objects scattered throughout the real space.

The transmitter 20 outputs an optical signal displayed as one or more patterns obtained as a result of optically splitting a byte array representing transmitted data. A receiver 50 on the other side optically receives the displayed optical pattern and recognizes its optically received picture. Then, the receiver 50 finds the transmitted byte array on the basis of a blinking pattern expressed by the optical signal and finds the detection position of the optical signal on the optical-reception surface. Finally, the receiver 50 carries out a processing service according to a combination of the byte array and the optical-reception position.

Data output by the transmitters 20A, 20B, 20C and so on includes the ID of an object, the network address of the object, a host name, a resource identification such as a URL or a URI and other information related to the object.

The transmitters 20A, 20B, 20C and so on are installed at a surface of real-world object that can be seen with ease. Examples of the object in the real world are an external wall of a building and a signboard. Each of the transmitters 20A, 20B, 20C and so on includes one or more light-emitting units. The light-emitting unit is typically an LED controlled by a microcomputer. Transmitted data having a digital format with a predetermined number of bits is modulated by adoption of a predetermined modulation technique. The data to be transmitted is encoded into a display format, in which ON and OFF states of the LED represents 1 and 0 bits respectively, to generate an optical signal corresponding to the transmitted data having a predetermined length such as N bits. In the following description, such a transmitter is referred to a light beacon.

The data transfer rate of the transmitter 20 is determined by the driving speed to put the LED in a blinking state. In the case of an ordinary LED (light-emitting diode) product presently available in the market, for example, it is possible to drive the product to blink at a frequency of 4 kHz. However, the blinking frequency is limited by the response speed of a light-receiving block 51 of the receiver 50.

Assume for example that, as a light-receiving unit including light-receiving blocks 51 laid out as a two-dimensional matrix, a CCD image sensor is used. In this case, the response speed is about 60 Hz, which is too low for receiving blinking data of the LED. In the case of CMOS image sensor used as such a light-receiving unit, on the other hand, the response speed is at least 12 kHz. Thus, even if the LED on the transmitter 20 is driven at a maximum speed, the receiver 50 is fully capable of detecting the blinking pattern.

In the case of transmitted data with a length of 8 bits, it is possible to transmit 255 different values of the data. The data having a length of 8 bits is subjected to a Manchester encoding process using a carrier with a frequency of 4 kHz and transmitted as a packet with a length of 22 bits. By doing so, the data can be transmitted in packet units even if the optical signal is concealed by an obstruction or the like during the transmission of the packets.

In addition, in this embodiment, the transmitter 20 includes a plurality of (N) LEDs arranged to form a two-dimensional matrix. By turning the LEDs on and off, N-bit information can be displayed as a spatial pattern. In this case, since data including a plurality of bits can be output at one time, the bit rate of the system can be improved substantially.

FIG. 2 is a diagram showing a model of the configuration of a data communication system 10-2 for transmitting and receiving an optical signal as a two-dimensional blinking pattern. As shown in the figure, the data communication system 10-2 includes a transmitting apparatus 100 and a receiving apparatus 200.

Reference numeral 101 denotes an encoder employed in the transmitting apparatus 100. Assume that data to be transmitted is information A received via an input terminal 102. In this case, the data to be transmitted is converted into a 16×16 time-series two-dimensional blinking pattern. That is to say, the input data to be transmitted is converted into a set D={d (x, y, t)|d (x, y, t)} ∈ {0, 1} where x is an integer in the range 1 to 16, y is also an integer in the range 1 to 16 and t is a parameter representing a time and having a value in the range 1 to T.

In this case, T depends on the amount of the information A. A two-dimensional light-emitting unit 103 has a width of at least 16 LEDs and a height of at least 16 LEDs. The LEDs employed in the two-dimensional light-emitting unit 103 are arranged to form a two-dimensional matrix. At a time t, information d (x, y, t) is emitted from a position with coordinates of (x, y) on the two-dimensional light-emitting unit 103. That is to say, when d (x, y, t) is 1, the LED at the position with coordinates of (x, y) is turned on. When d (x, y, t) is 0, on the other hand, the LED at the position with coordinates of (x, y) is turned off. In this way, the information A is transmitted as a time-series two-dimensional blinking pattern generated by a plurality of LEDs.

FIG. 2 shows only some of 256 (=16×16) LEDs. The number of LEDs is set at 16×16 only for the sake of simplicity. It is to be noted, however, that the present invention does not limit the number of LEDs to 16×16.

Reference numeral 201 denotes a camera employed in the receiving apparatus 200. The camera 201 is a component used for taking a motion picture on the reception side. The camera 201 has a typical resolution of 512×512 pixels. Thus, the camera 201 can be used for taking a picture of the two-dimensional light-emitting unit 103. The shooting timing of the camera 201 is synchronized with the emission timing of the two-dimensional light-emitting unit 103. That is to say, the camera 201 is used for taking a picture of the two-dimensional light-emitting unit 103 at t=1 2, . . . and T. As an alternative, the camera 201 is used for taking a picture of the two-dimensional light-emitting unit 103 at a higher speed with the shooting timing of the camera 201 unsynchronized with the emission timing of the two-dimensional light-emitting unit 103. This is because, by taking a picture of the two-dimensional light-emitting unit 103 at a higher speed, at least one picture of the 16×16 time-series two-dimensional blinking pattern d (x, y, t) of the two-dimensional light-emitting unit 103 can be taken for each time t, which is an integer. By taking a picture of the two-dimensional light-emitting unit 103 with the shooting timing of the camera 201 synchronized with the emission timing of the two-dimensional light-emitting unit 103 or by taking a picture of the two-dimensional light-emitting unit 103 with the shooting timing of the camera 201 unsynchronized with the emission timing of the two-dimensional light-emitting unit 103 but at a higher speed, an image d (x, y, t) can be obtained at each of times t=1, 2, . . . and T.

Figure 3:
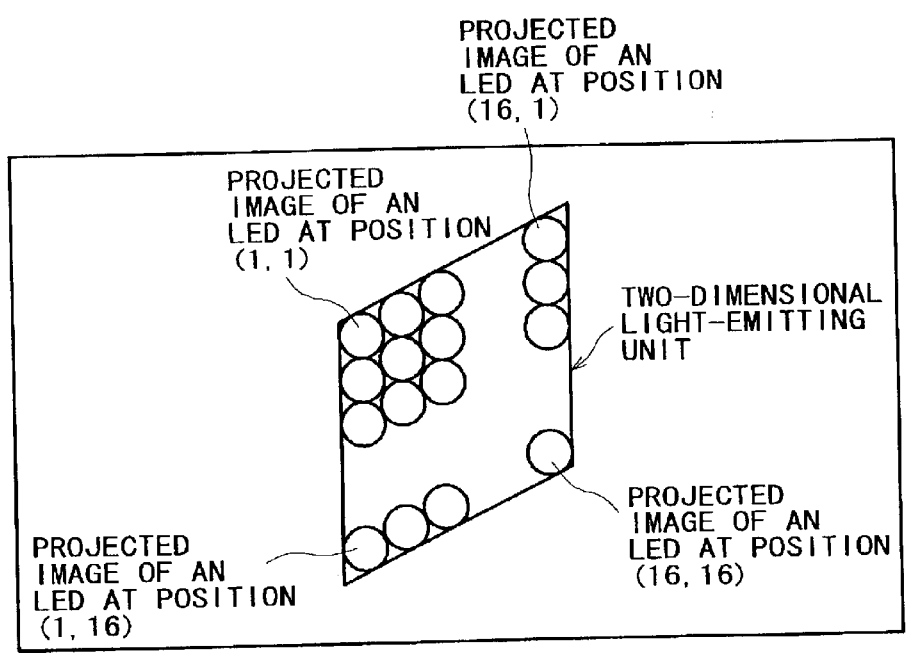
FIG. 3 is a diagram showing a picture obtained as a result of shooting a two-dimensional light-emitting unit oriented in a slanting posture.
Figure 4:
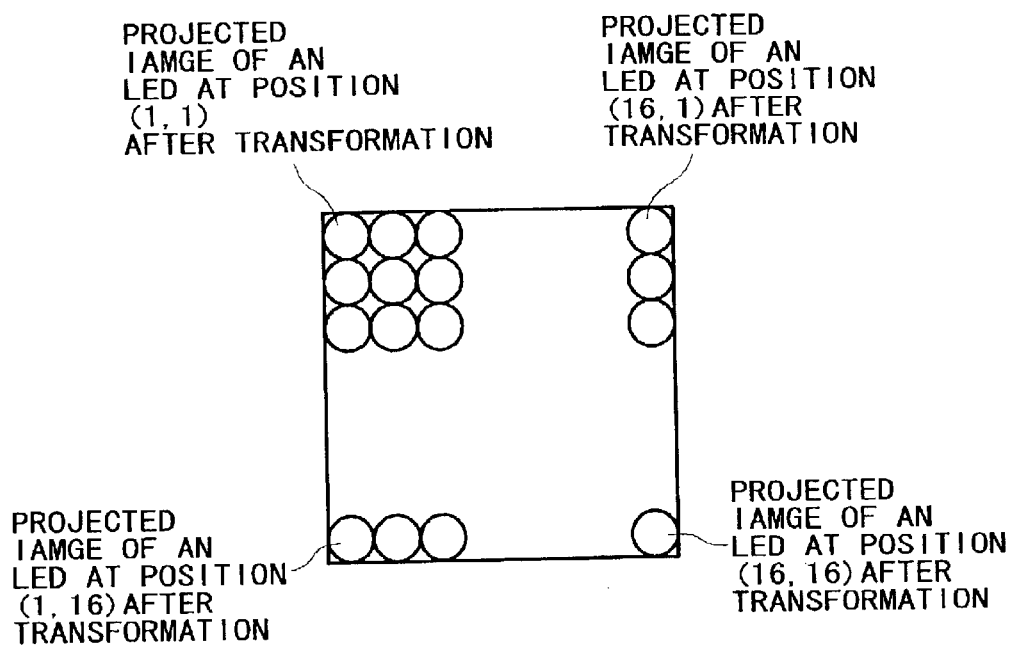
FIG. 4 is a diagram showing a picture obtained as a result of an affine transformation process carried out on a picture obtained as a result of shooting the two-dimensional light-emitting unit oriented in a slanting posture.

A picture taken by the camera 201 at each of the times is passed on to a perspective projection unit 202. The perspective projection unit 202 is a circuit for projecting the two-dimensional light-emitting unit 103 onto a front-view picture typically in case a positional relation between the two-dimensional light-emitting unit 103 and the camera 201 is a slanting relation. For example, FIG. 3 is a diagram showing a perspective-view picture of the two-dimensional light-emitting unit 103. This picture is taken by using the camera 201 from a slanting direction with respect to the two-dimensional light-emitting unit 103. The perspective projection unit 202 carries out a perspective-projection process on this perspective-view picture to generate a front-view picture shown in FIG. 4. To put it concretely, the LED on the left upper corner of the perspective-view picture shown in FIG. 3 is projected on a position at coordinates (1, 1) of the front-view picture obtained as a result of the perspective-projection process as shown in FIG. 3. The LED on the right upper corner of the perspective-view picture shown in FIG. 3 is projected on a position at coordinates (16, 1) of the front-view picture obtained as a result of the perspective-projection process as shown in FIG. 4. The LED on the left lower corner of the perspective-view picture shown in FIG. 3 is projected on a position at coordinates (1, 16) of the front-view picture obtained as a result of the perspective-projection process as shown in FIG. 4. The LED on the right lower corner of the perspective-view picture shown in FIG. 3 is projected on a position at coordinates (16, 16) of the front-view picture obtained as a result of the perspective-projection process as shown in FIG. 4. In this way, the picture taken by the camera 201 is subjected to an affine transformation process to generate the picture having a size of 16×16 pixels as shown in FIG. 4.

A picture output by the perspective projection unit 202 is supplied to a decoder 203. This picture is a picture having a size of 16×16 pixels at each time t. The picture having a size of 16×16 pixels at each time t is decoded by the decoder 203 to produce the transmitted data. That is to say, in this decoding process, if a picture at a position at coordinates (x, y) at a time t is 1, e (x, y, t) is set at 1. If a picture at a position at coordinates (x, y) at a time t is 0, on the other hand, e (x, y, t) is set at 0. Then, the decoder 203 creates a set E={e (x, y, t)|e (x, y, t)} ∈ {0, 1} where x is an integer in the range 1 to 16, y is also an integer in the range 1 to 16 and t is a parameter representing a time and having a value in the range 1 to T. The set E is then restored to the information A transmitted by the transmitting apparatus 100. The information A obtained as a result of restoration is finally supplied to an output terminal 204.

It is to be noted that a technique agreed on in advance by the transmitting apparatus 100 and the receiving apparatus 200 is adopted in the encoding process carried out by the encoder 101 to convert the information A into the time-series two-dimensional blinking pattern (that is, the set D) and the decoding process carried out by the decoder 203 to convert the time-series two-dimensional blinking pattern (that is, the set E) back into the information A. The technique agreed on makes the decoding process the inverse process of the encoding process. In addition, in order to handle errors, the transmitting apparatus 100 adds parity bits to the information A prior to transmission so that the receiving apparatus 200 is capable of correcting the errors.

The transmitting apparatus 100 is typically installed on an external wall of a building or on an advertisement sign board or the like on a street. The two-dimensional light-emitting unit 103 is a square LED matrix having a typical width of several meters and a typical height of also several meters. The two-dimensional light-emitting unit 103 displays useful information such as business hours of a restaurant in the building, information on discounts or the like. An ordinary user walks along the street, carrying the receiving apparatus 200. By directing the camera 201 employed in the receiving apparatus 200 to the two-dimensional light-emitting unit 103 of the transmitting apparatus 100, the user is capable of obtaining the useful information emitted by the transmitting apparatus 100.

The following description considers a case in which the user carrying the receiving apparatus 200 is at a place far away from a location at which the transmitting apparatus 100 is installed.

In this case, a picture taken by the camera 201 includes a small figure of the two-dimensional light-emitting unit 103. Assume for example that the small figure of the two-dimensional light-emitting unit 103 included in the picture taken by the camera 201 has a size of about 8×8 pixels. In this case, the perspective projection unit 202 enlarges the small figure of the two-dimensional light-emitting unit 103 included in the picture taken by the camera 201 to create an enlarged picture having a doubled size of 16×16 pixels. With such an enlarged picture, however, the blinking of each of the 16×16 LEDs in the two-dimensional light-emitting unit 103 cannot be recognized by the receiving apparatus 200. This is because the small figure of the two-dimensional light-emitting unit 103 included in the picture taken by the camera 201 has a size of only 8×8 pixels so that each 2×2 LEDs of the two-dimensional light-emitting unit 103 cannot be recognized by the receiving apparatus 200 are projected onto only 1 pixel of the camera 201. That is to say, 1 pixel of the enlarged picture created by the perspective projection unit 202 cannot correspond to 1 LED. Instead, 2×2 pixels of the enlarged picture created by the perspective projection unit 202 represents an average value of brightness of 2×2 LEDs. As a result, it is impossible to recognize a blinking pattern of each LED.

Assume for example that, even though the transmitting apparatus 100 outputs information on a restaurant, the user carrying the receiving apparatus 200 wants to know information on an amusement park. In this case, since the user at a location far away from the transmitting apparatus 100 installed on a street does not know what information is being emitted by the transmitting apparatus 100, the user needs to walk along the street, approaching the transmitting apparatus 100. As the user arrives at a place close to the transmitting apparatus 100, however, the user becomes aware of the fact that the transmitting apparatus 100 is transmitting information on a restaurant instead of information on an amusement park, getting disappointed. If the user at a location far away from the transmitting apparatus 100 can roughly know what information is being emitted by the transmitting apparatus 100 in a way or another, that is, should the user know simple information on what is being emitted by the transmitting apparatus 100 if not details of what is being emitted by the transmitting apparatus 100 in a way or another, the user would have not approached the transmitting apparatus 100.

In this way, in data communication of a two-dimensional blinking pattern, it is not until the user arrives at a position close to the transmitting apparatus 100 so that the receiving apparatus 200 is capable of recognizing each of the 16×16 LEDs completely that the user can obtain information emitted by the receiving apparatus 200. That is to say, if the resolution of the camera 201 employed in the receiving apparatus 200 is not sufficiently high enough for the distance between the receiving apparatus 200 and the transmitting apparatus 100, whole information cannot be obtained.

In order to solve the problem described above, in this embodiment, the space of a two-dimensional blinking pattern output by the two-dimensional light-emitting unit 103 employed in the transmitting apparatus 100 is split into a plurality of spaces having different resolution and, in each of the spaces having different resolution, data is mapped. Thus, even a receiving apparatus 200 with an insufficient resolution due to, for example, its distance from the transmitting apparatus 100 is capable of reading a two-dimensional blinking pattern mapped in a high-resolution space, which is a space having a high resolution. As a result, the user is capable of obtaining information to a certain degree even if the user is at a place separated away from the transmitting apparatus 100 and can make a decision as to whether or not there is a need for approaching the transmitting apparatus 100 to obtain more detailed information.

Figure 5:
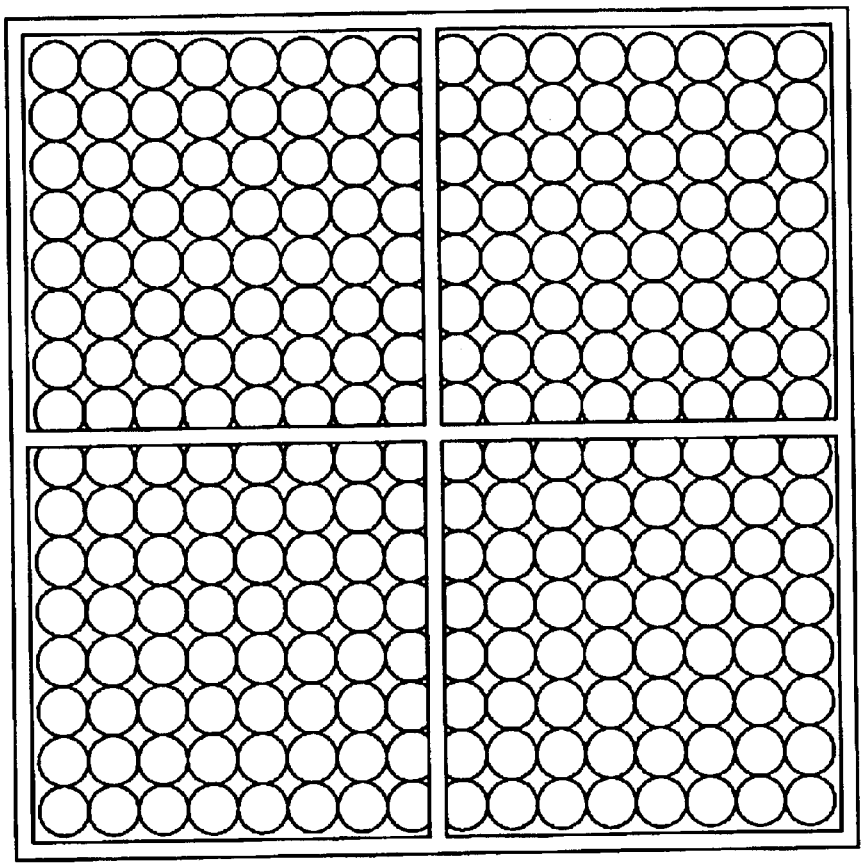
FIG. 5 is a diagram showing the configuration of the two-dimensional light-emitting unit serving as a first resolution space.

The following description explains a method of constructing a resolution space for a case in which the two-dimensional light-emitting unit 103 includes 16×16 LEDs. That is to say, the following description explains an encoding technique adopted by the encoder 101 or a technique of mapping data supplied to the encoder 101 onto the two-dimensional 16×16-LED matrix of the two-dimensional light-emitting unit 103. A first resolution space having a lowest resolution is obtained by dividing the two-dimensional matrix comprising 16×16 LEDs into a total of 4 LED blocks each comprising 8×8 LEDs as shown in FIG. 5. Data supplied to the encoder 101 is mapped onto (or encoded into) the 4 LED blocks, which are obtained by dividing the two-dimensional matrix comprising 16×16 LEDs into two halves in the vertical and horizontal directions. The first resolution space is provided for encoding data having a first resolution, which is typically a 2-bit resolution. Data with a first resolution of 2 bits is encoded into (or mapped onto) a block pattern, which is a pattern consisting of the 4 LED blocks. To put it concretely, data of 00, 01, 10 or 11 is encoded into one of the four block patterns shown in FIG. 6. As shown in the figure, the four block patterns are different from each other in that the position of an off LED block in a pattern is different from the position of an off LED block in any other patterns where an off LED block is an LED block with LEDs thereof or most LEDs thereof are off.

Figure 6:
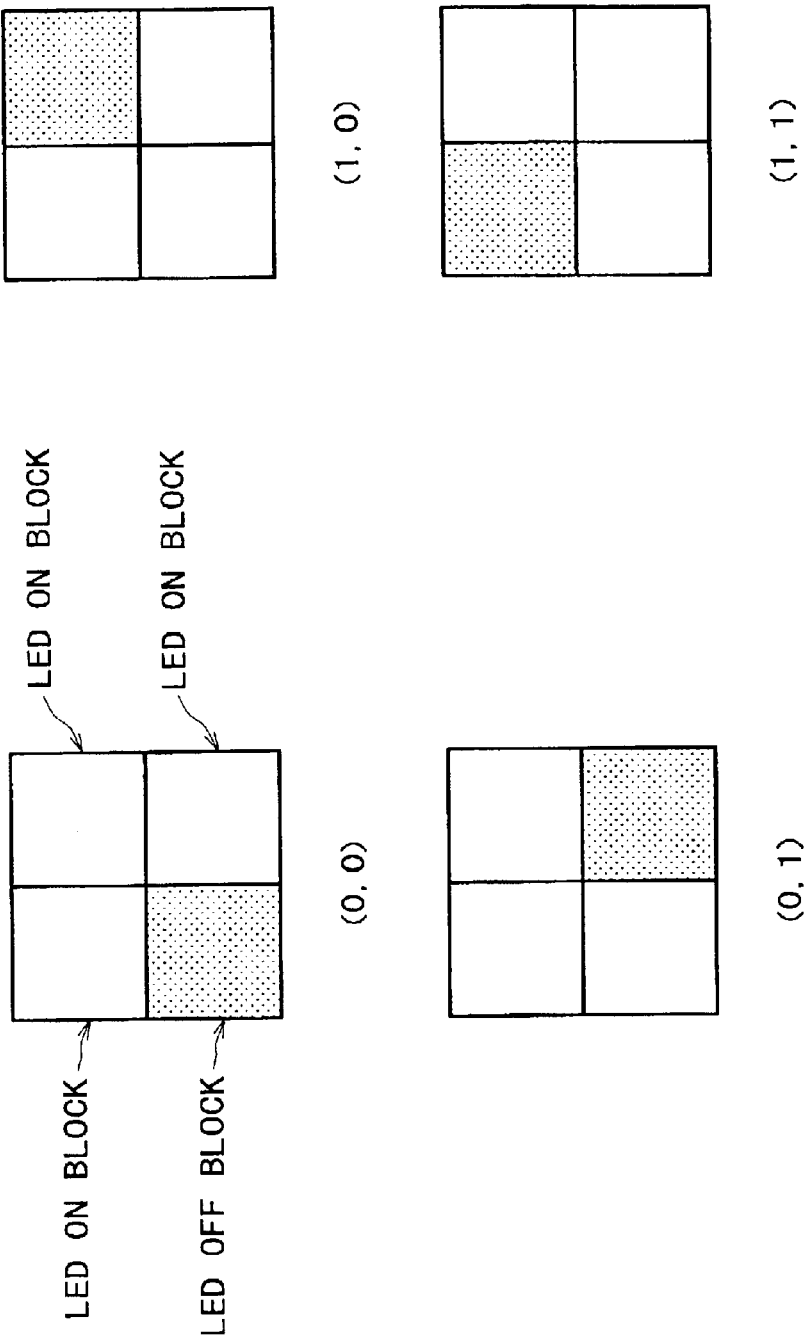
FIG. 6 is a diagram showing a data-mapping method using 4 blocks.
Figure 7:
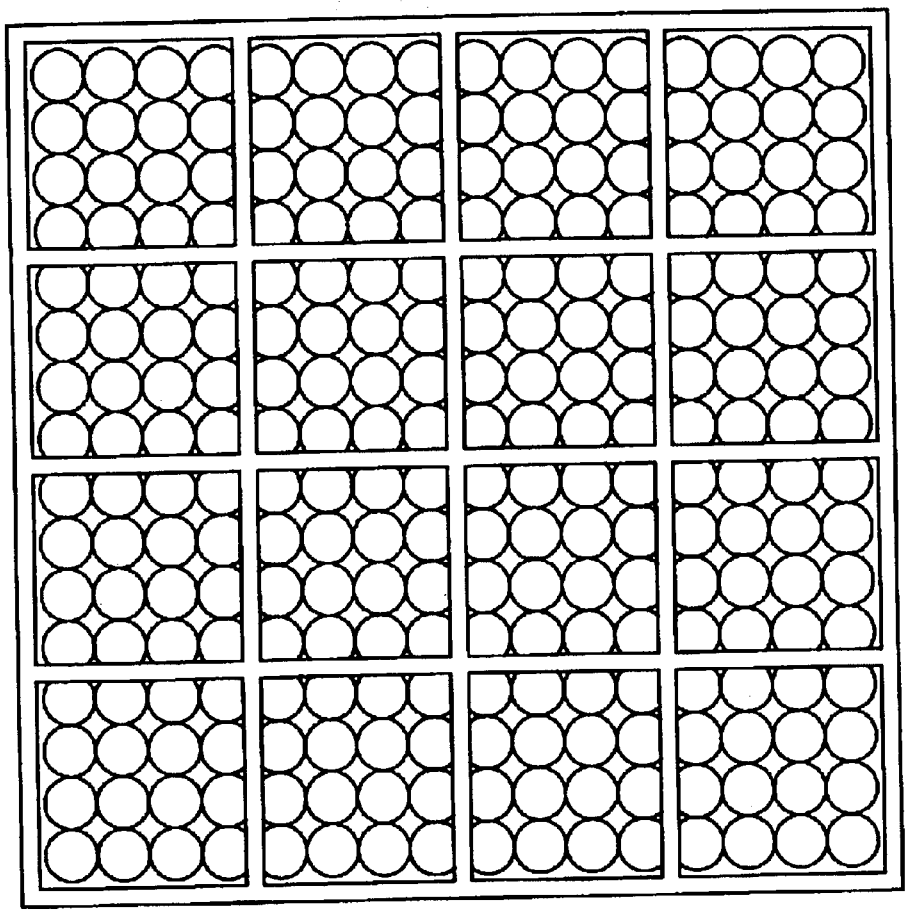
FIG. 7 is a diagram showing the configuration of the two-dimensional light-emitting unit serving as a second resolution space.

A second resolution space is provided for encoding data having a second resolution. The second resolution space having a low resolution is obtained by dividing each LED block comprising 8×8 LEDs as shown in FIG. 5 into 2 LED sub-blocks in the vertical and horizontal directions to form a total of 16 LED sub-blocks each comprising 4×4 LEDs as shown in FIG. 7. Data is mapped onto (encoded into) the 16 LED sub-blocks in the second resolution space. As data with the first resolution, however, the technique for encoding the data into one of the block patterns as shown in FIG. 6 in the first resolution space is still applicable. That is to say, 2-bit data with a value of 00, 01, 10 or 11 is encoded into one of the 4 block patterns shown in FIG. 6 with the position of an off LED block in the pattern determined by the value of the data where an off LED block is an LED block with LEDs thereof or most LEDs thereof are off. With the data encoded into a block pattern in the first resolution space as such, that is, with the data mapped onto the 4 LED blocks in the first resolution space shown in FIG. 5, however, it is still necessary to map data as data having a second resolution onto the 16 LED sub-blocks in the second resolution space shown in FIG. 7.

Figure 8:
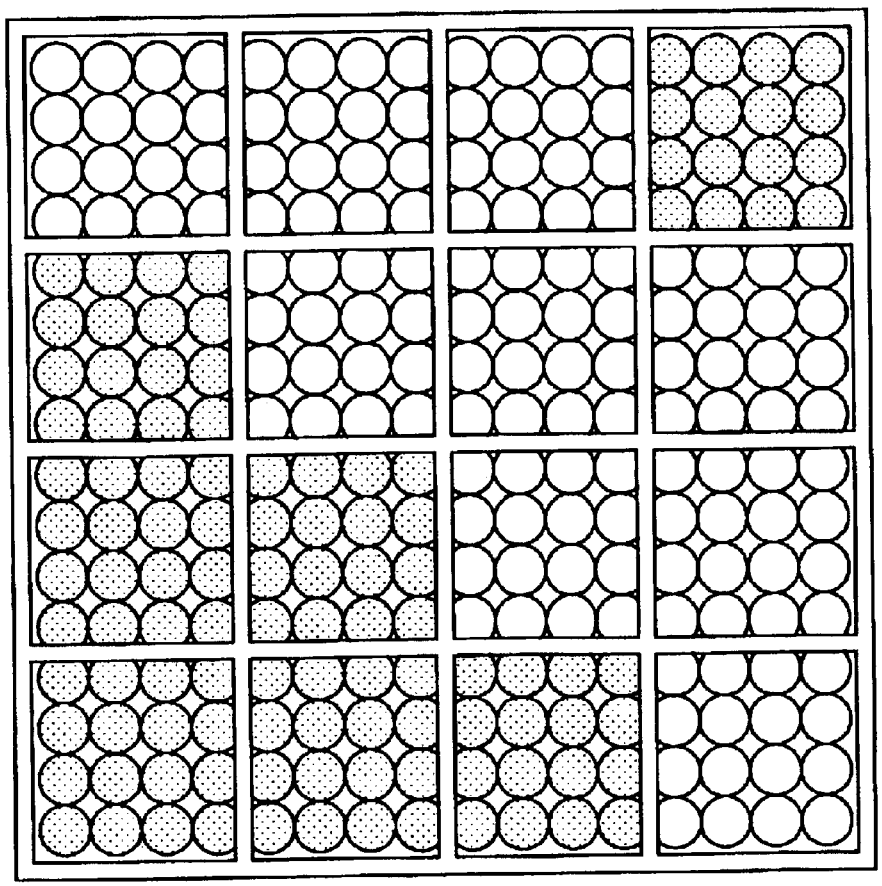
FIG. 8 is a diagram showing a two-dimensional blinking pattern generated by a data-mapping method on the two-dimensional light-emitting unit serving as a second resolution space by maintaining a two-dimensional blinking pattern generated by the data-mapping method on the two-dimensional light-emitting unit serving as a first resolution space.

FIG. 8 is a diagram showing a result of a mapping process of data in the second resolution space. As data of the first resolution, the data has a value of (0, 0). As described above, the data with a value of (0, 0) is first mapped in the first resolution space onto a block pattern having an off LED block on the left lower corner of the block pattern. Then, data is mapped as data having the second resolution in the second resolution space. As shown in the figure, the 4 LED sub-blocks on the left upper corner and the 4 LED sub-blocks on the right lower corner are each a result of mapping of data with a value of (0, 0) and the 4 LED sub-blocks on the right upper corner is a result of mapping of data with a value of (1, 0). Since the 4 LED sub-blocks on the left lower corner are an off LED block with off LEDs obtained as a result of mapping the data in the first resolution space, these 4 LED sub-blocks are not used in the mapping in the second resolution space.

Figure 9:
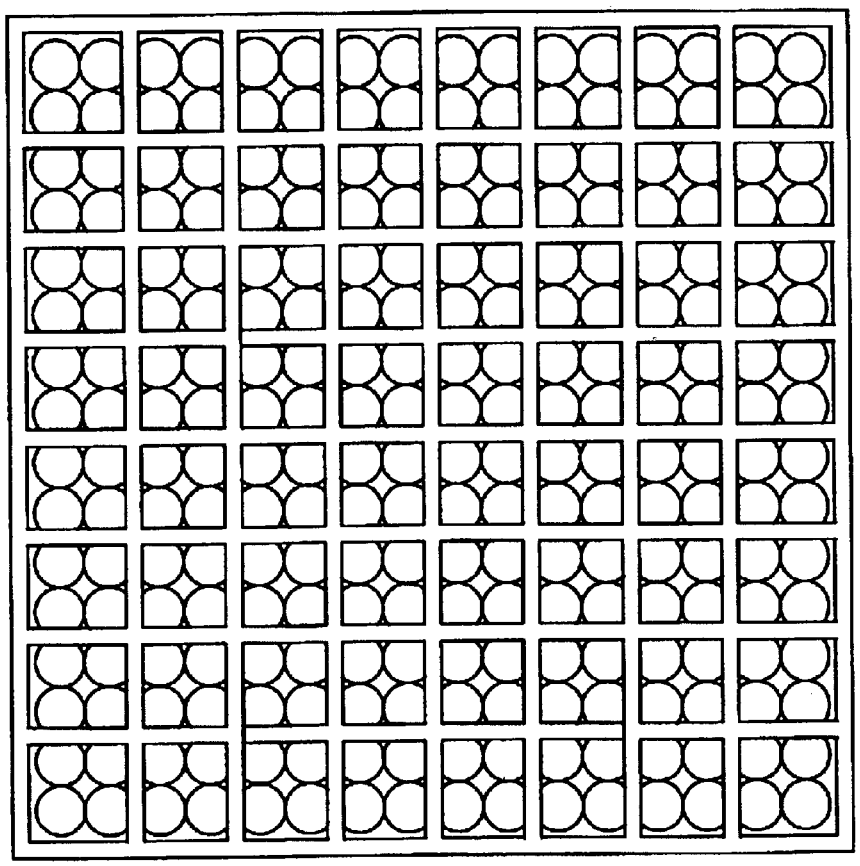
FIG. 9 is a diagram showing the configuration of the two-dimensional light-emitting unit serving as a third resolution space.
Figure 10:
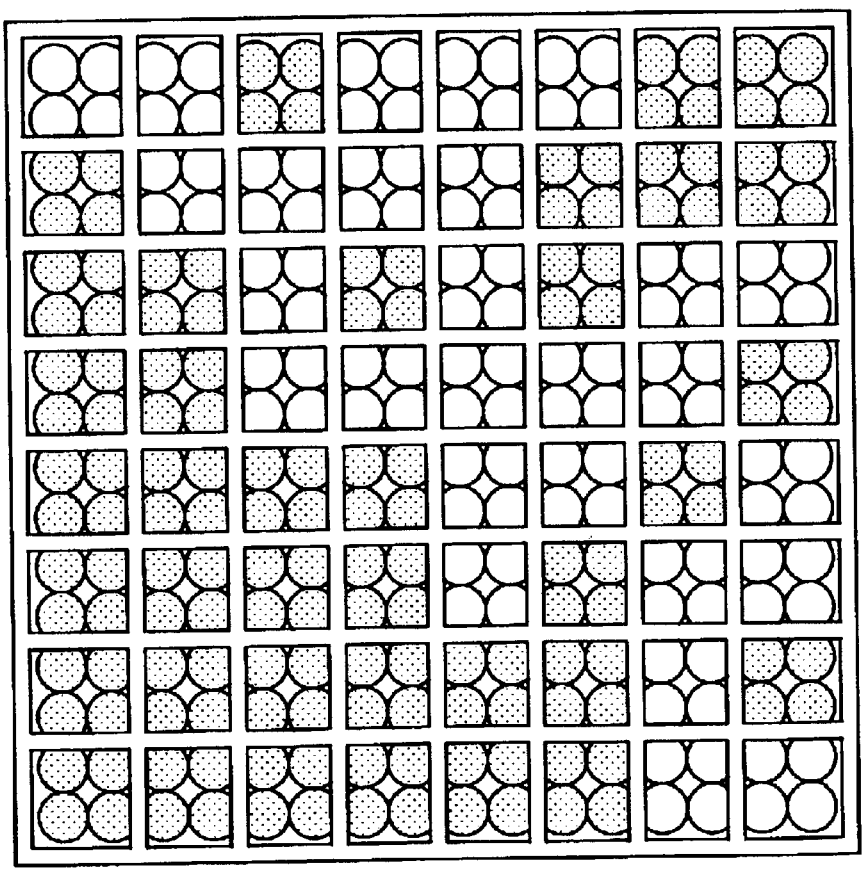
FIG. 10 is a diagram showing a two-dimensional blinking pattern generated by a data-mapping method on the two-dimensional light-emitting unit serving as a third resolution space by maintaining the dimensional blinking patterns generated by the data-mapping methods on the two-dimensional light-emitting unit serving as first and second resolution spaces as shown in FIG. 8.

A third resolution space is provided for encoding data having a third resolution. The third resolution space having a high resolution is obtained by dividing each LED sub-block comprising 4×4 LEDs as shown in FIG. 8 into two LED sub-sub-blocks in the vertical and horizontal directions to form a total of 64 LED sub-sub-blocks each comprising 2×2 LEDs as shown in FIG. 9. Data is mapped onto (encoded into) the 64 LED sub-sub-blocks in the third resolution space. Also in this case, as data of the second resolution, the technique for encoding the data into a block pattern like one shown FIG. 8 in the second resolution space is applicable. That is to say, the data of the second resolution is encoded into a block pattern with the positions of off LED blocks in the pattern determined by the value of the data where an off LED block is a block with LEDs thereof or most LEDs thereof are off. With the data encoded into a block pattern in the second resolution space after an encoding process carried out in the first resolution space as such, that is, with the data mapped onto the 16 LED sub-blocks shown in FIG. 8, however, it is still necessary to map data as data having a third resolution onto the 64 LED sub-sub-blocks in the third resolution space shown in FIG. 9. That is to say, each LED sub-block in the second resolution space is mapped onto 4 LED sub-sub-blocks in the third resolution space to result in a final pattern shown in FIG. 10 in the same way as the data of the first resolution is encoded into one of the 4 patterns each comprising 4 blocks as shown in FIG. 6 in dependence on whether the data has a value or 00, 01, 10 or 11. FIG. 10 is a diagram showing a result of a mapping process in the third resolution space with a result of a mapping process in the first resolution space like any one shown in FIG. 6 and a result of a mapping process in the second resolution space like one shown in FIG. 8 maintained as they are.

Figure 11:
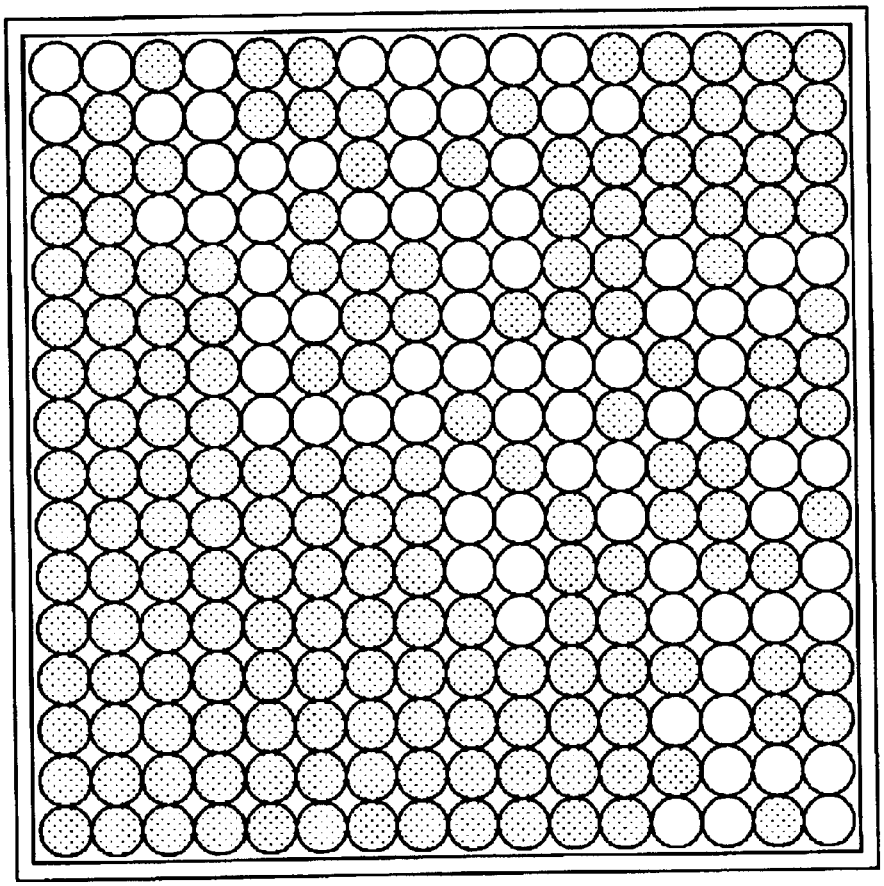
FIG. 11 is a diagram showing a two-dimensional blinking pattern generated by a data-mapping method on the two-dimensional light-emitting unit serving as a fourth resolution space by maintaining the dimensional blinking patterns generated by the data-mapping methods on the two-dimensional light-emitting unit serving as first and second resolution spaces as shown in FIG. 10.

A fourth resolution space is provided for encoding data having a fourth resolution. The fourth resolution space having a highest resolution is obtained by dividing each LED sub-sub-block comprising 2×2 LEDs as shown in FIG. 10 into two LEDs in the vertical and horizontal directions to form a total of 256 LEDs as shown in FIG. 11. By the same token, as data of the third resolution, the technique for encoding the data into a block pattern like one shown FIG. 10 in the third resolution space is applicable. That is to say, the data of the third resolution is encoded into a block pattern with the positions of off LED blocks in the pattern determined by the value of the data where an off LED block is a block with LEDs thereof or most LEDs thereof are off. With the data encoded into a block pattern in the third resolution space after encoding processes carried out in the first and second resolution spaces as such, that is, with the data mapped onto the 64 LED sub-sub blocks shown in FIG. 9, however, it is still necessary to map data as data having a fourth resolution onto the 256 LEDs in the fourth resolution space shown in FIG. 11. That is to say, each LED sub-sub-block in the third resolution space is mapped onto 4 LEDs in the fourth resolution space to result in a final pattern shown in FIG. 11 in the same way as the data of the first resolution is encoded into one of the 4 patterns each comprising 4 blocks as shown in FIG. 6 in dependence on whether the data has a value or 00, 01, 10 or 11. FIG. 11 is a diagram showing a result of a mapping process in the fourth resolution space with a result of a mapping process in the first resolution space like any one shown in FIG. 6, a result of a mapping process in the second resolution space like one shown in FIG. 8 and a result of a mapping process in the third resolution space like one shown in FIG. 10 maintained as they are.

In the following description, input data of the first resolution, input data of the second resolution, input data of the third resolution and input data of the fourth resolution are referred to hereafter as first information, second information, third information and fourth information respectively. To put it in detail, information to be transferred after completion of a mapping process carried out in the first resolution space is referred to hereafter as first information. By the same token, information to be transferred after completion of mapping processes carried out in the first and second resolution spaces is referred to hereafter as second information. In the same way, information to be transferred after completion of mapping processes carried out in the first, second and third resolution spaces is referred to hereafter as third information. Likewise, information to be transferred after completion of mapping processes carried out in the first, second, third and fourth resolution spaces is referred to hereafter as fourth information. In the low-resolution space, information can be transmitted at a low transfer rate. However, the transfer rate must be increased in accordance with a rise in resolution. Information obtained as a result of a mapping process carried out in a space with a low resolution can be read by the receiving apparatus 200 even if the camera 201 has a resolution insufficient for the distance between the transmitting apparatus 100 and the receiving apparatus 200, that is, even if the receiving apparatus 200 is at a location far away from the transmitting apparatus 100. Thus, detailed data to be eventually transmitted, that is, data having a large number of bits, is mapped in the fourth resolution space as the fourth information. In the processes to encode fourth information, first information, second information and third information are also processed in their respective resolution spaces at different data granularities and data lengths. As an alternative, only information of a low resolution is processed so as to allow a user at a far location to understand the information.

By devising an encoding method adopted by the encoder 101 employed in the transmitting apparatus 100 implemented by this embodiment, the first information, the second information, the third information and the fourth information are processed for the spaces of the different resolutions. The first information can be received by using even a camera 201 of the receiving apparatus 200 having a low resolution. That is to say, the fourth information can be received even if the projected image of the two-dimensional light-emitting unit 103 obtained as a result of shooting by the camera 201 of the receiving apparatus 200 is small. The second information cannot be received by using a camera 201 of the receiving apparatus 200 having a low resolution. That is to say, if the projected image of the two-dimensional light-emitting unit 103 obtained as a result of shooting by the camera 201 of the receiving apparatus 200 is small, the second information cannot be received. However, the second information can be received by using a camera 201 of the receiving apparatus 200 having a high resolution to a certain degree. That is to say, if the projected image of the two-dimensional light-emitting unit 103 obtained as a result of shooting by the camera 201 of the receiving apparatus 200 is large to a certain degree, the second information can be received. The third information can be received by only using a camera 201 of the receiving apparatus 200 having a high resolution. That is to say, the third information can be received only if the projected image of the two-dimensional light-emitting unit 103 obtained as a result of shooting by the camera 201 of the receiving apparatus 200 is large. The fourth information can be received by only using a camera 201 of the receiving apparatus 200 having a very high resolution. That is to say, the fourth information can be received only if the projected image of the two-dimensional light-emitting unit 103 obtained as a result of shooting by the camera 201 of the receiving apparatus 200 is very large.

The following description explains a way to find a time-series two-dimensional blinking pattern of the 16×16 LEDs from given first information, given second information, given third information and given fourth information. That is to say, the following description explains a method adopted by the encoder 101 employed in the transmitting apparatus 100 to encode (to map) information in the resolution spaces and a method adopted by the decoder 203 employed in the receiving apparatus 200 to decode the information encoded (mapped) in the resolution spaces. The following description is not limited to a case in which the number of devices (or the number of LEDs) employed in the two-dimensional light-emitting unit 103 is 16×16. Instead, the following description can be applied to any number of devices (or any number of LEDs). However, the following description properly includes some examples in which the number of devices (or the number of LEDs) employed in the two-dimensional light-emitting unit 103 is 16×16.

First of all, some symbols used in the following description are explained.

Symbol Q denotes the number of resolutions at which pieces of information are to be transmitted. The number of such resolutions is also referred to hereafter as the number of hierarchical layers or the number of spaces having different resolutions, from a low resolution to a high resolution. A variable q is used for specifying a resolution space used in a process. The variable q has a value in the range 1 to Q. A q value of 1 is used for referring to a space with the lowest resolution. A q value of 2 is used for referring to a space with a next resolution higher than the lowest resolution. By the same token, a q value of 3 and subsequent q values are each used for referring to a space with a still higher resolution. Finally, a q value of Q is used for referring to a space with the highest resolution. In the example described above, Q=4.

Symbol H denotes the number of LEDs arranged in the horizontal direction. The value of H satisfies the following equation: H1×H2×. . . ×HQ=H where H1, H2, . . . and HQ are each an integer to be determined. Symbol V denotes the number of LEDs arranged in the vertical direction. The value of V satisfies the following equation: V1×V2×. . . ×VQ=V where V1, V2, and VQ are each an integer to be determined. The values of H1 and V1 are each 1 or greater. For any q of at least 2, a value represented by (Hq×Vq) is an integer of at least 2.

If the LEDs employed in the two-dimensional light-emitting unit 103 are divided into rectangular LED blocks each having a width of (Hq+1×Hq+2×. . . ×HQ) LEDs and a height of (Vq+1×Vq+2×. . . ×VQ) LEDs where the width is the number of LEDs arranged in the vertical direction and the height is the number of LEDs arranged in the horizontal direction, there will be resulted in (H1×H2×. . . ×Hq)×(V1×V2×. . . ×Vq) LED blocks. qth information is input information subjected prior to transmission to an encoding (mapping) process carried out in the qth space to generate these (H1×H2×. . . ×Hq)×(V1×V2×. . . ×Vq) rectangular LED blocks. For q=Q, that is, in the Qth resolution space or at the Qth hierarchical layer, the rectangular LED blocks, which result from the encoding (mapping) process prior to transmission, each have a size of 1×1 block. That is to say, each of the rectangular LED blocks includes only 1 LED.

Pay attention to one of rectangular LED blocks each consisting of (Hq×Hq+1×. . . ×HQ)×(Vq×Vq+1×. . . ×VQ) LEDs and resulting from an encoding process to generate (q−1)th information. This rectangular LED block of interest includes Hq×Vq rectangular LED blocks each consisting of (Hq+1×Hq+2×. . . ×HQ)×(Vq+1×Vq+2×. . . ×VQ) LEDs and resulting from an encoding process to generate qth information. A number is assigned to each of these Hq×Vq rectangular LED blocks. The assigned numbers start with the number 1 assigned to the rectangular LED block on the left upper corner. The number 1 is followed by subsequently increasing numbers, that is, the numbers 2, 3 and so on, in the raster scan order. Thus, the number Hq is assigned to the rectangular LED block on the right upper corner and the number {Hq×(Vq−1)+1} is assigned to the rectangular LED block on the left lower corner. Finally, the number Hq×Vq is assigned to the rectangular LED block on the right lower corner. In the same way, a number is assigned to each rectangular LED block resulting from an encoding process to generate first information. By the same token, a number is assigned to each rectangular LED block resulting from an encoding process to generate (q−1)th information. Thus, a qth-hierarchical-layer number assigned to a particular rectangular LED block consisting of (Hq+1×Hq+2×. . . ×HQ)×(Vq+1×Vq+2×. . . ×VQ) LEDs in the two-dimensional light-emitting unit 103 univocally indicates that this particular rectangular LED block is used for generating the qth information.

With the concept of time further introduced, now consider that a rectangular LED block consisting of (Hq+1×Hq+2×. . . ×HQ)×(Vq+1×Vq+2×. . . ×VQ) LEDs in the two-dimensional light-emitting unit 103 at a particular point of time is a rectangular LED block used to generate qth information, that is, information at the qth hierarchical layer. A rectangular LED block at a univocally determined time t is denoted hereafter by notation $S(t, i1, i2, \ldots, iq)$.

Notation i1 is an integer for determining a rectangular LED block at the first hierarchical layer and has a value in the range 1 to H1×V1. By the same token, notation i2 is an integer for determining a rectangular LED block at the second hierarchical layer and has a value in the range 1 to H2×V2. In the same way, subsequent notations i3, i4 and so on are integers for determining respectively rectangular LED blocks at the third hierarchical layer, the fourth hierarchical layer and so on. Finally, notation iq is an integer for determining a rectangular LED block at the qth hierarchical layer and has a value in the range 1 to Hq×Vq.

In particular, for q=Q, a rectangular LED block consisting of (Hq+1×Hq+2×. . . ×HQ)×(Vq+1×Vq+2×. . . ×VQ) LEDs in the two-dimensional light-emitting unit 103 and resulting from an encoding process carried out on the qth information is a block comprising 1×1 LED. Thus, symbol $S(t, i1, i2, \ldots, iQ)$ denotes the blinking state of the LED at a time t.

In the case of a two-dimensional light-emitting unit 103 comprising 16×16 LEDs, H=V=16 whereas H1=H2=H3=H4=V1=V2=V3=V4=2.

Figure 12:
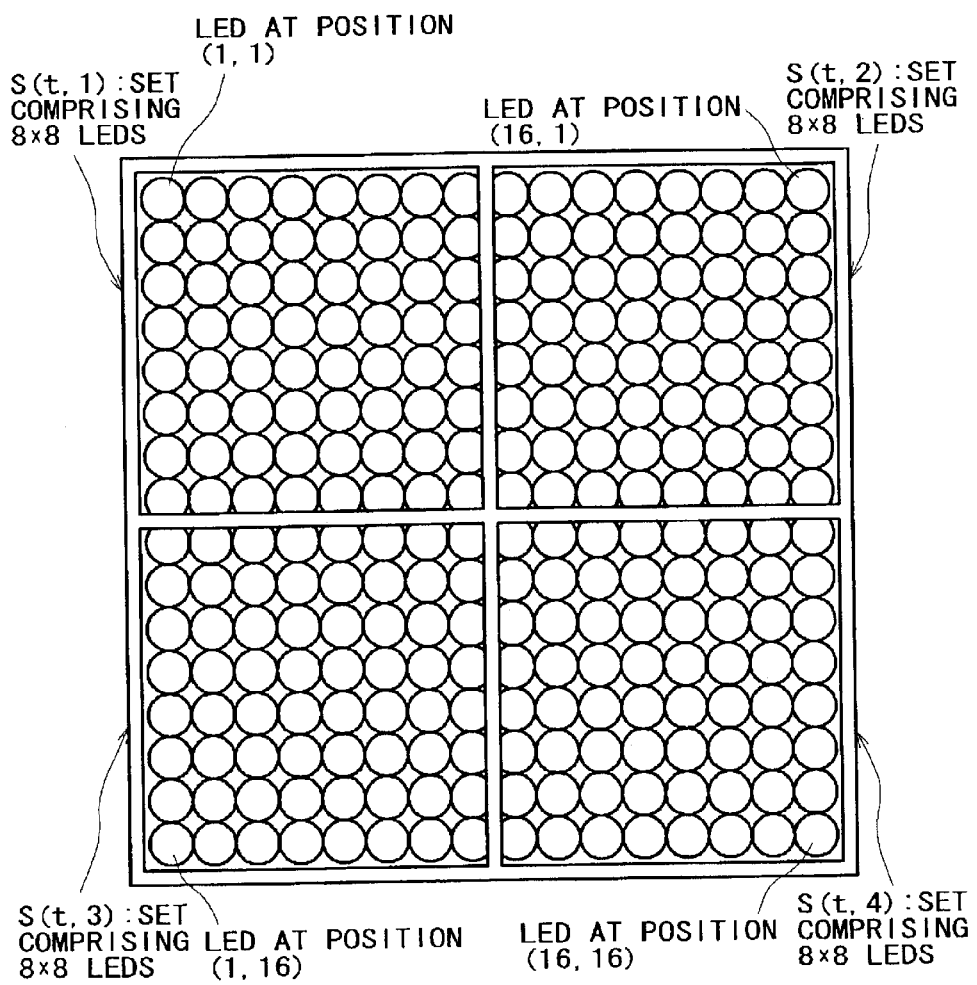
FIG. 12 is a diagram showing definitions of LED blocks S(t, 1), S(t, 2), S(t, 3) and S(t, 4) composing the two-dimensional light-emitting unit serving as the first resolution space in which first information is to be mapped onto a pattern at a time t.

The first information is subjected to an encoding process to generate rectangular LED blocks each consisting of (H2×H3×H4)×(V2×V3×V4) LEDs or 8×8 LEDs. The rectangular LED blocks are regarded as a two-dimensional optical signal representing data transmitted as a two-dimensional blinking pattern. The number of such rectangular LED blocks in the two-dimensional light-emitting unit 103 is H1×V1=2×2=4. A number is assigned to each of the rectangular LED blocks. The assigned numbers are numbers 1 to 4. FIG. 12 is a diagram showing a definition of the 4 rectangular LED blocks S(t, 1), S(t, 2), S(t, 3) and S(t, 4), which are obtained as a result of an encoding process carried out on the input first information at a time t.

Figure 13:
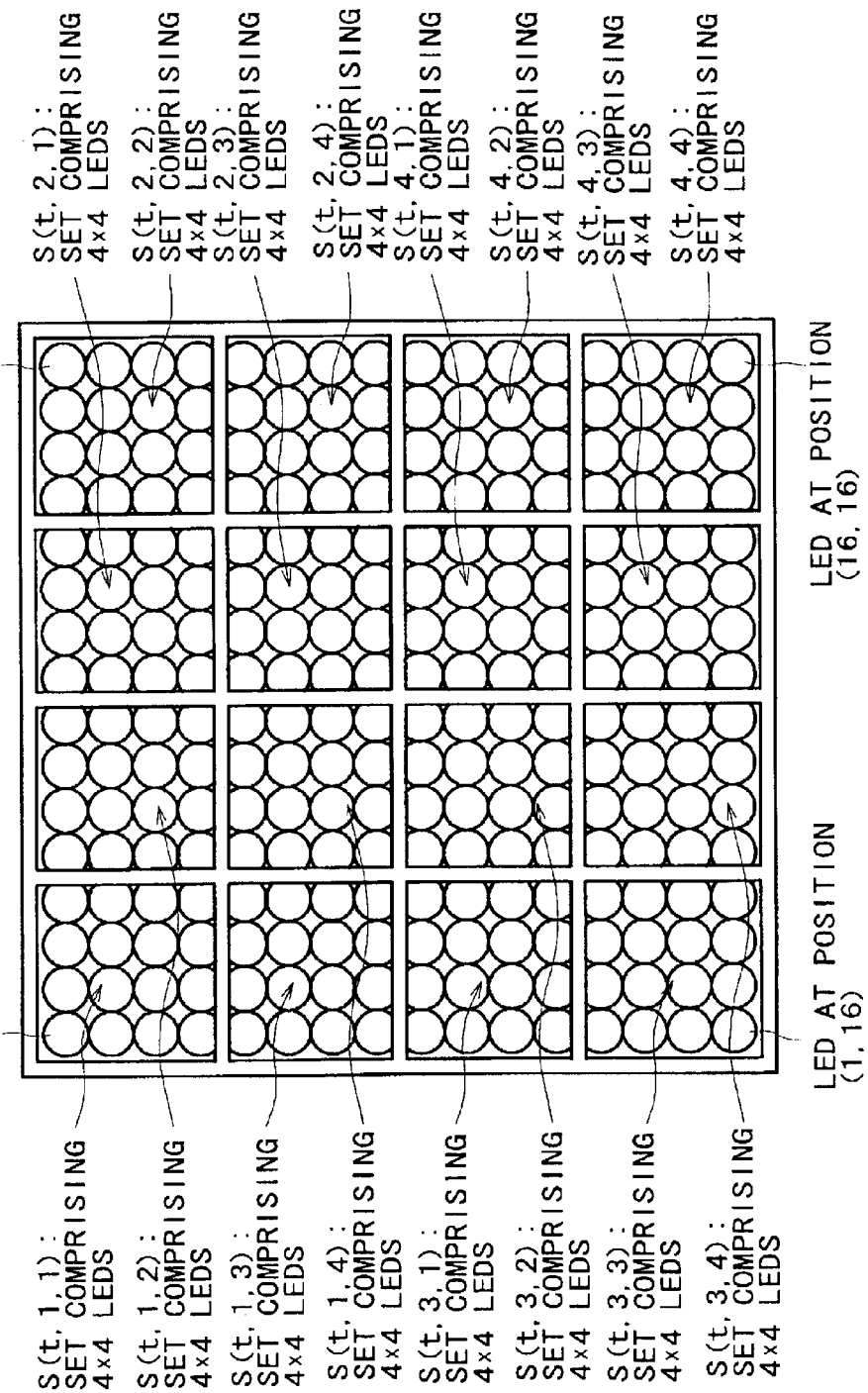
FIG. 13 is a diagram showing definitions of LED blocks S(t, 1, 1), S(t, 1, 2) and so on composing the two-dimensional light-emitting unit serving as the second resolution space in which second information is to be mapped onto a pattern at a time t.

The 4 rectangular LED blocks S(t, 1), S(t, 2), S (t, 3) and S(t, 4) representing the first information being transmitted each consist of 8×8 LEDs as described above and each include H2×V2=2×2 =4 rectangular LED blocks, which are each composed of (H3×H4)×(V3×V4)=4×4 LEDs and used for transmitting the second information. By the same token, a number is assigned to each of the rectangular LED blocks. The assigned numbers are numbers 1 to 4. FIG. 13 is a diagram showing a definition of the 16 (=4×4) rectangular LED blocks S (t, 1, 1), S(t, 1, 2) and so on, which represent the second information being transmitted at a time t.

Figure 14:
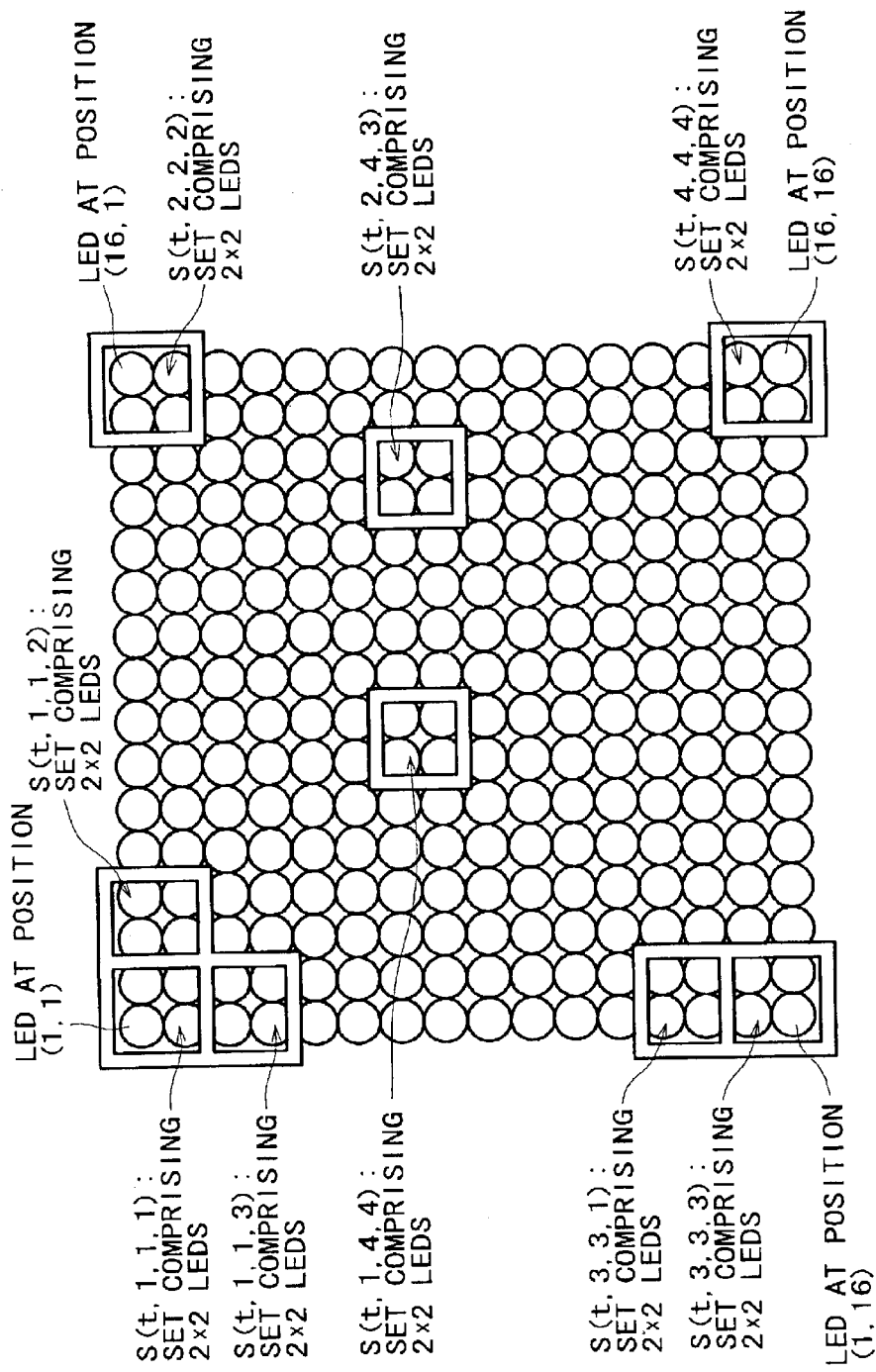
FIG. 14 is a diagram showing definitions of LED blocks S(t, 1, 1, 1), S(t, 1, 1, 2) and so on composing the two-dimensional light-emitting unit serving as the third resolution space in which third information is to be mapped onto a pattern at a time t.

The 16 rectangular LED blocks S(t, 1, 1), S(t, 1, 2) and so on representing the second information being transmitted each consist of 4×4 LEDs as described above and each include H3×V3=2×2=4 rectangular LED blocks, which are each composed of H4×V4=2×2 LEDs and used for transmitting the third information. By the same token, a number is assigned to each of the rectangular LED blocks. The assigned numbers are numbers 1 to 4. FIG. 14 is a diagram showing a definition of the 64 (=4×16) rectangular LED blocks S(t, 1, 1, 1), S(t, 1, 1, 2) and so on, which are obtained as a result of an encoding process carried out on the third information at a time t. However, only some of the 64 rectangular LED blocks are marked explicitly due to a limited area of the page.

Figure 15:
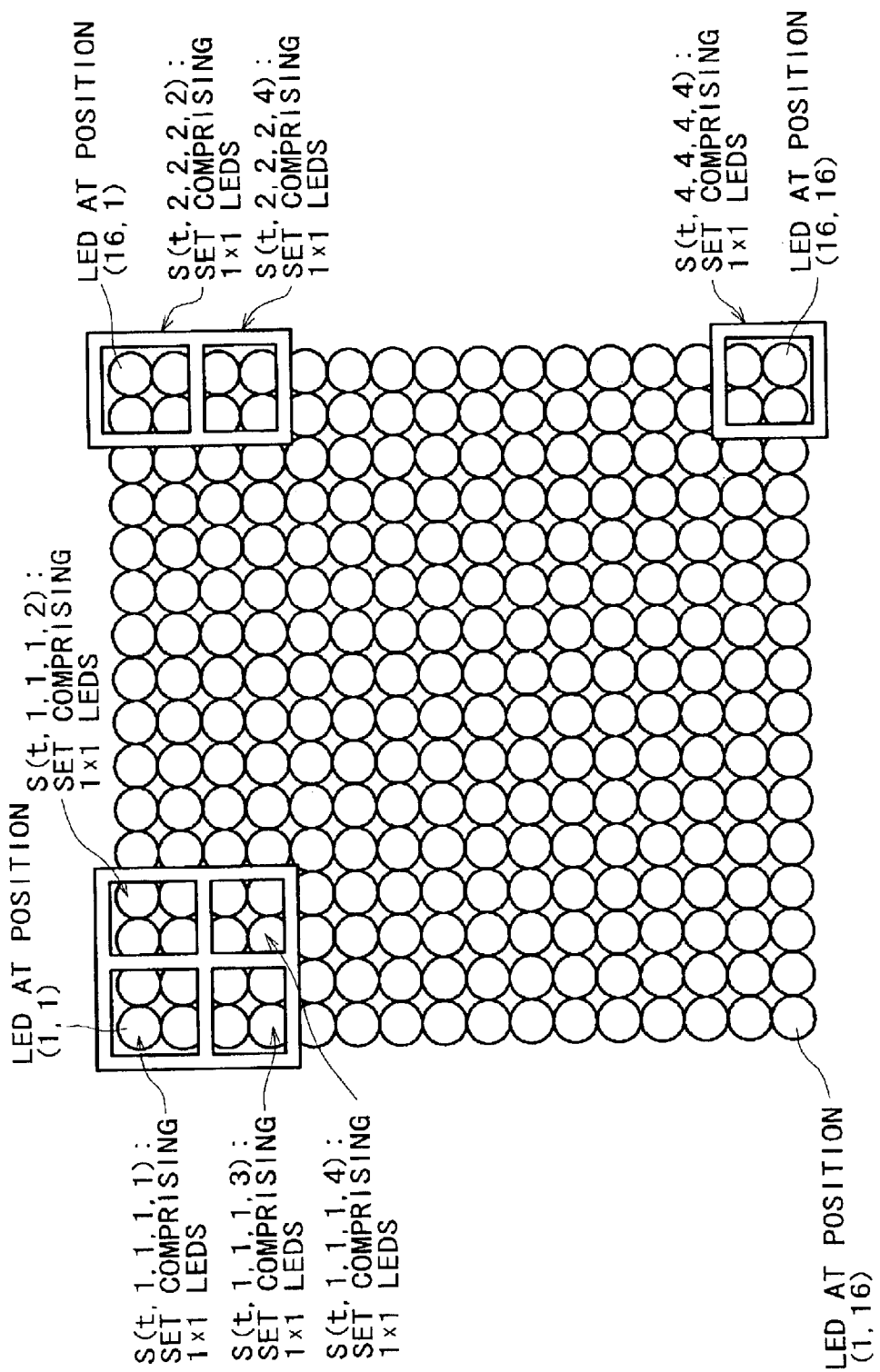
FIG. 15 is a diagram showing definitions of LED blocks S(t, 1, 1, 1, 1), S(t, 1, 1, 1, 2) and so on composing the two-dimensional light-emitting unit serving as the fourth resolution space onto which fourth information is to be mapped onto a pattern at a time t.

The 64 rectangular LED blocks S(t, 1, 1, 1), S(t, 1, 1, 2) and so on for representing the third information being transmitted each consist of 2×2 LEDs as described above and each include H4×V4=2×2=4 rectangular LED blocks, which are each composed of 1×1 LED and used for transmitting the fourth information. By the same token, a number is assigned to each of the rectangular LED blocks. The assigned numbers are numbers 1 to 4. FIG. 15 is a diagram showing a definition of the 256 (=4×64) rectangular LED blocks S(t, 1, 1, 1, 1), S(t, 1, 1, 1, 2) and so on, which are obtained as a result of an encoding process carried out on the fourth information at a time t. However, only some of the 256 rectangular LED blocks are marked explicitly due to a limited area of the page.

An encoding process carried out by the encoder 101 employed in the transmitting apparatus 100 is a process of creating of a time-series two-dimensional light-emitting pattern on the two-dimensional light-emitting unit 103 from pieces of information at the first to the Qth hierarchical layers. Different time-series two-dimensional light-emitting patterns are generated from the pieces information, which are received from the input terminal 102. That is to say, the encoding process is a process to determine an LED blinking pattern of rectangular LED blocks S(t, i1, i2, . . . , iQ) at a time t.

Now, let us introduce a variable R(t, i1, i2, . . . , iq), which has a value of either 0 or 1. For q other than Q, the variable is denoted by one of notations R(t, i1), R (t, i1, i2) and R(t, i1, i2, . . . , iq−1). The variable for q other than Q is a variable used for merely an internal intermediate process. For q=Q, on the other hand, the variable is denoted by notation R(t, i1, i2, . . . , iQ), which has a value of 1 meaning that the only LED in the rectangular LED block indicated by S(t, i1, i2, iQ) is to be turned on at a time t or a value of 0 meaning that the only LED in the rectangular LED block indicated by S(t, i1, i2, . . . , iQ) is to be turned off at a time t. Thus, the encoding process carried out by the encoder 101 employed in the transmitting apparatus 100 is a process of determining whether the value of the variable R(t, i1, i2, . . . , iQ) is 0 or 1 on the basis of information at the first to Qth hierarchical layers. As described above, the pieces of information at the first to Qth hierarchical layers are received from the input terminal 102.

It is to be noted that, as will be described later, the variables R(t, i1), R(t, i1, i2). . . and R(t, i1, i2, . . . , iQ−1) for q other than Q are variables related to the rectangular LED blocks S(t, i1), S(t, i1, i2), . . . , and S(t, i1, i2, . . . , iQ−1) respectively and each explained as a variable used for merely an internal intermediate process.

First of all, the variable R(t, i1) is determined from the first information. Then, the variable R(t, i1, i2) is determined from the second information and the variable R(t, i1). Subsequently, the variable R(t, i1, i2, i3) is determined from the third information and the variable R(t, i1, i2). Thereafter, the variable R(t, i1, i2, . . . , iQ−1, iQ) is determined from the Qth information and the variable R(t, i1, i2, . . . , iQ−1) in the same way.

As described above, in the encoder 101 employed in the transmitting apparatus 100 implemented by this embodiment, the variable R(t, i1, i2, . . . , iq) is determined from the qth information and the variable R(t, i1, i2, . . . , iq−1), where q=1, 2, Q, by adoption of a predetermined mapping method. The decoder 203 employed in the receiving apparatus 200 adopts the same mapping method as the encoder 101 to restore data obtained as a result of the encoding process carried out by the transmitting apparatus 100 to the original information. The mapping method is set typically to satisfy the following conditions.

Condition 1

In the case of R(t, i1, i2, . . . , iq−1)=1, a combination pattern of {R(t, i1, i2, . . . , iq−1, 1), R(t, i1, i2, . . . , iq−1, 2), . . . , R(t, i1, i2, . . . , iq−1, Hq×Vq)} for input data consisting of Nq bits is determined. The number of elements included in the combination pattern of {R(t, i1, i2, . . . , iq−1, 1), R(t, i1, i2, . . . , iq−1, 2), . . . , R (t, i1, i2, . . . , iq−1, Hq×Vq)} is Hq×Vq. For input data consisting of any Nq bits, the number of elements having a value of 1 and the number of elements having a value of 0 are each fixed. The ratio of the number of elements having a value of 1 to the number of elements having a value of 0 has a fixed value of Uq: (1−Uq). That is to say, the number of elements having a value of 1 is Uq×(Hq×Vq). On the other hand, the number of elements having a value of 0 is (1−Uq)×(Hq×Vq). In addition, if the value of the input data consisting of Nq bits changes, the combination pattern of {R(t, i1, i2, iq−1, 1), R(t, i1, i2, . . . , iq−1, 2), . . . , R(t, i1, i2, . . . , iq−1, Hq×Vq)} also changes as well.

In this case, Nq is a constant. The input data consisting of Nq bits is data, which is included in qth information and has Nq bits. In particular, for Nq=0, the combination pattern of {R(t, i1, i2, . . . , iq−1, 1), R(t, i1, i2, . . . , iq−1, 2), R(t, i1, i2, . . . , iq−1, Hq×Vq)} is a specific pattern at all the times.

In the case of R(t, i1, i2, . . . , iq−1)=1, a relation used to determine a combination pattern of {R(t, i1, i2, . . . , iq−1, 1), R(t, i1, i2, . . . , iq−1, 2), R(t, i1, i2, . . . , iq−1, Hq×Vq)} for the input data consisting of Nq bits is referred to hereafter as a qth positive-case mapping table.

Condition 2

In the case of $R(t, i1, i2, \ldots, iq-1)=0$, a combination pattern of $\{R(t, i1, i2, \ldots, iq-1, 1), R(t, i1, i2, \ldots, iq-1, 2), \ldots, R(t, i1, i2, \ldots, iq-1, Hq \times Vq)\}$ for input data consisting of Mq bits is determined. The number of elements included in the combination pattern of $\{R(t, i1, i2, \ldots, iq-1, 1), R(t, i1, i2, \ldots, iq-1, 2), \ldots, R(t, i1, i2, \ldots, iq-1, Hq \times Vq)\}$ is $Hq \times Vq$. The ratio of the number of elements having a value of 1 to the number of elements having a value of 0 has a fixed value of $Zq: (1-Zq)$. That is to say, the number of elements having a value of 1 is $Zq \times (Hq \times Vq)$. On the other hand, the number of elements having a value of 0 is $(1-Zq) \times (Hq \times Vq)$. In addition, if the value of the input data consisting of Mq bits changes, the combination pattern of $\{R(t, i1, i2, \ldots, iq-1, 1), R(t, i1, i2, \ldots, iq-1, 2), \ldots, R(t, i1, i2, \ldots, iq-1, Hq \times Vq)\}$ also changes as well.

In this case, Mq is a constant. The input data consisting of Mq bits is data, which is included in qth information and has Mq bits. In particular, for Mq=0, the combination pattern of $\{R(t, i1, i2, \ldots, iq-1, 1), R(t, i1, i2, \ldots, iq-1, 2), \ldots, R(t, i1, i2, \ldots, iq-1, Hq \times Vq)\}$ is a specific pattern at all the times.

In the case of $R(t, i1, i2, \ldots, iq-1)=0$, a relation used to determine a combination pattern of $\{R(t, i1, i2, \ldots, iq-1, 1), R(t, i1, i2, \ldots, iq-1, 2), R(t, i1, i2, \ldots, iq-1, Hq \times Vq)\}$ for the input data consisting of Mq bits is referred to hereafter as a qth negative-case mapping table.

Condition 3

For any value of q, the value of either Nq or Mq is at least 1.

Condition 4

For any value of q, the value of Uq is greater than the value of Zq, that is, the relation Uq>Zq holds true.

For q=1, however, there is no hierarchical layer higher than the first hierarchical layer. In this case, the mapping table satisfies condition 1, ignoring condition 2. That is to say, the mapping table satisfies condition 1' described as follows:

Condition 1'

In the case of $R(t, i1, i2, \ldots, iq-1)=1$, a combination pattern of $\{R(t, 1), R(t, 2), \ldots, R(t, H1 \times V1)\}$ for input data consisting of Nq bits (that is, N1 bits) is determined. The number of elements included in the combination pattern of $\{R(t, 1), R(t, 2), \ldots, R(t, H1 \times V1)\}$ is $H1 \times V1$. For input data consisting of any N1 bits, the number of elements having a value of 1 and the number of elements having a value of 0 are each fixed. The ratio of the number of elements having a value of 1 to the number of elements having a value of 0 has a fixed value of $U1:(1-U1)$. That is to say, the number of elements having a value of 1 is $U1 \times (H1 \times V1)$. On the other hand, the number of elements having a value of 0 is $(1-U1) \times (H1 \times V1)$. In addition, if the value of the input data consisting of N1 bits changes, the combination pattern of $\{R(t, 1), R(t, 2), \ldots, R(t, H1 \times V1)\}$ also changes as well. In this case, N1 is a constant. The input data consisting of N1 bits is data, which is included in first information and has N1 bits. It is to be noted that N1 has a value of at least 1.

In the case of $R(t, i1, i2, \ldots, iq-1)=1$, a relation used to determine a combination pattern of $\{R(t, 1), R(t, 2), \ldots, R(t, H1 \times V1)\}$ for the input data consisting of N1 bits is referred to hereafter as a first positive-case mapping table.

In order to make the explanation easy to understand, condition 1' is given as a condition for keeping uniformity with other hierarchical layers. There is no special reason as to why this property must be satisfied.

There is a plurality of conceivable mapping methods that satisfy conditions 1, 2, 3, 4 and 1'. One of the methods is selected to be adopted as a method common to the encoder 101 and the decoder 203.

By adoption of a mapping method that satisfies conditions 1, 2, 3, 4 and 1' described above, $R(t, i1), R(t, i1, i2), \ldots, R(t, i1, i2, \ldots, iQ)$ are determined from pieces of information with resolutions ranging from the first resolution to the Qth one.

Now, consider a ratio of the number of ON LEDs in a rectangular LED block indicated by $S(t, i1, i2, \ldots, iq)$ at a time t to the total number of all LEDs in the same rectangular LED block.

Assume that, for a value of q (where the value of q is $2, \ldots, Q$), and for any value of i1 (where the value of i1 is $1, 2, \ldots, H1 \times V1$), for any value of i2 (where the value of i2 is $1, 2, \ldots, H2 \times V2$), and for any value of iq (where the value of iq is $1, 2, \ldots, Hq \times Vq$) and at any time t (where $t=1, 2, \ldots, T$), for $R(t, i1, i2, \ldots, iq)=1$, the ratio of the number of ON LEDs in a rectangular LED block indicated by $S(t, i1, i2, \ldots, iq)$ at a time t to the total number of all LEDs in the same rectangular LED block is set in advance. Let symbol $F1(q)$ denote this ratio and let the total number of all LEDs in the rectangular LED block indicated by $S(t, i1, i2, \ldots, iq)$ on the two-dimensional light-emitting unit 103 be $(Hq+1 \times Hq+2 \times \ldots \times HQ) \times (Vq+1 \times Vq+2 \times \ldots \times VQ)$. In this case, the number of ON LEDs in the rectangular LED block indicated by $S(t, i1, i2, \ldots, iq)$ is $F1(q) \times (Hq+1 \times Hq+2 \times \ldots \times HQ) \times (Vq+1 \times Vq+2 \times \ldots \times VQ)$. Also assume that, for $R(t, i1, i2, \ldots, iq)=0$, at the time t, the ratio of the number of ON LEDs in a rectangular LED block indicated by $S(t, i1, i2, \ldots, iq)$ to the total number of all LEDs in the same rectangular LED block is set in advance. Let symbol $F0(q)$ denote this ratio and let the total number of all LEDs in the rectangular LED block indicated by $S(t, i1, i2, \ldots, iq)$ on the two-dimensional light-emitting unit 103 be $(Hq+1 \times Hq+2 \times \ldots \times HQ) \times (Vq+1 \times Vq+2 \times \ldots \times VQ)$. In this case, the number of ON LEDs in the rectangular LED block indicated by $S(t, i1, i2, \ldots, iq)$ is $F0(q) \times (Hq+1 \times Hq+2 \times \ldots \times HQ) \times (Vq+1, Vq+2 \times \ldots \times VQ)$. Further assume that the relation $F1(q)>F0(q)$ holds true.

By making the assumptions as described above, for $R(t, i1, i2, \ldots, iq-1)=1$, as is obvious from condition 1 described above, the ratio of the number of ON LEDs in a rectangular LED block indicated by $S(t, i1, i2, \ldots, iq)$ at a time t to the total number of all LEDs in the same rectangular LED block is $Uq \times F1(q)+(1-Uq) \times F0(q)=F0(q)+Uq \times (F1(q)-F0(q))$. Let symbol $F1(q-1)$ denote this ratio. In the case of $R(t, i1, i2, \ldots, iq-1)=0$, as is obvious from condition 2 described above, the ratio of the number of ON LEDs in a rectangular LED block indicated by $S(t, i1, i2, \ldots, iq-1)$ to the total number of all LEDs in the same rectangular LED block at a time t is $Zq \times F1(q)+(1-Zq) \times F0(q)=F0(q)+Zq \times (F1(q)-F0(q))$. Let symbol $F0(q-1)$ denote this ratio.

From the assumption that the relation $F1(q)>F0(q)$ holds true and from condition 4 described above, it is obvious that the relation $F1(q-1)>F0(q-1)$ also holds true as well.

As described earlier, $S(t, i1, i2, \ldots, iQ)$ indicates an LED at a time t. $R(t, i1, i2, \ldots, iQ)=1$ indicates that this LED is ON. Thus, the ratio $F1(Q)$ of the number of ON LEDs to the total number of all LEDs for the LED indicated by $S(t, i1, i2, \ldots, iQ)$ at a time t is 1. On the other hand, $R(t, i1, i2, \ldots, iQ)=0$ indicates that this LED is OFF. Thus, the ratio $F1(Q)$ of the number of ON LEDs to the total number of all LEDs for the LED indicated by $S(t, i1, i2, \ldots, iQ)$ at a time t is 0. That is to say, for q=Q, $F1(q)=1$ but $F0(q)=0$.

The above description suggests that it is possible to find $F1(Q-1), F0(Q-1), F1(Q-2), F0(Q-2), \ldots$ and $F1(1), F0$ (0) in a recursive manner and it is obvious that the relations F1 (Q−1)>F0 (Q−1), F1 (Q−2)>F0 (Q−2), . . . and F1 (1)>F0 (0) hold true. As described above, F1 (q) is the ratio of the number of ON LEDs, in a rectangular LED block indicated by S(t, i1, i2, . . . , iq) at a time t to the total number of all LEDs in the same rectangular LED block for R(t, i1, i2, . . . , iq)=1. On the other hand, F0 (q) is the ratio of the number of ON LEDs in a rectangular LED block indicated by S(t, i1, i2, . . . , iq) at a time t to the total number of all LEDs in the same rectangular LED block for R(t, i1, i2, . . . , iq)=0.

Figure 16:
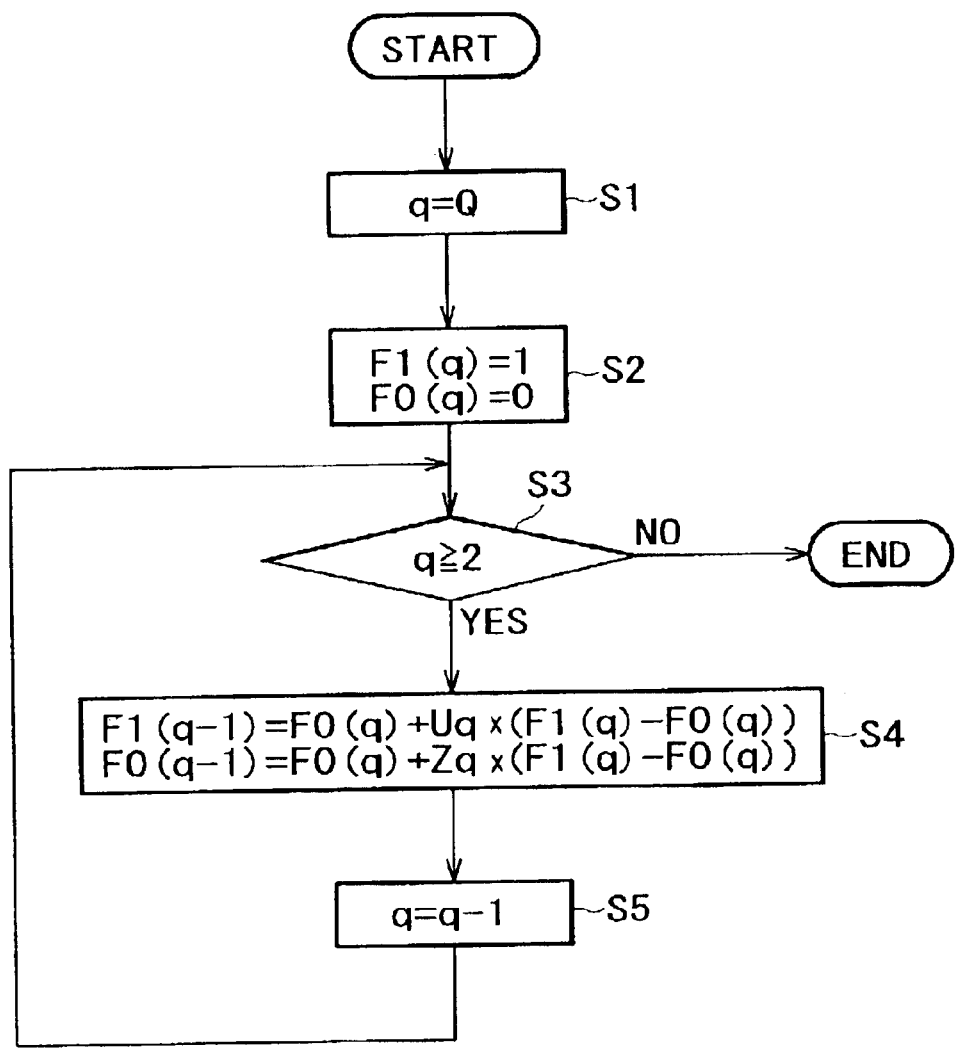
FIG. 16 shows a flowchart representing the procedure of a process to find F1 (q) and F0 (q)

FIG. 16 shows a flowchart representing a processing procedure for finding F1 (q) and F0 (q).

As shown in the figure, the flowchart begins with a step S1 at which the variable q indicating the level of a hierarchical layer is set at Q. Then, at the next step S2, F1 (q) is set at 1 whereas F0 (q) is set at 0.

Subsequently, the flow of the processing goes on to the next step S3 to form a judgment as to whether or not the value of q is at least equal to 2. If the value of q is at least equal to 2, the flow of the processing goes on to a step S4. If the value of q is equal to 1, on the other hand, the execution of the processing routine is ended.

At the step S4, the value of an expression {F0 (q)+Uq×(F1 (q)−F0 (q))} is computed and used as the value of F1 (q−1). Then, the value of an expression {F0 (q)+Zq×(F1 (q)−F0 (q))} is also computed and used as the value of F0 (q−1).

Subsequently, at the next step S5, the value of q is decremented by 1. Then, the flow of the processing goes back to the step S3 to repeat the processes of the steps S3 to S5. These processes are carried out repeatedly till the value of q is found smaller than 2 at the step S3.

The descriptions given above are summarized as follows. The number of devices (or the number of LEDs) employed in the two-dimensional light-emitting unit 103 is fixed. To be more specific, the number of LEDs arranged in the horizontal direction is H and the number of LEDs arranged in the vertical direction is V. In addition, H1, H2, and HQ that satisfy H1×H2×. . . ×HQ=H as well as V1, V2, . . . and VQ that satisfy V1×V2×. . . ×VQ=V are set. Furthermore, constants U1, U2, U3 . . . and UQ as well as constants Z2, Z3, . . . and ZQ are also set. Moreover, constants N1, N2, N3 . . . and NQ as well as constants M2, M3, . . . and MQ are set as well. In addition, mapping methods that satisfy conditions 1, 2, 3, 4 and 1' described above are set. The mapping methods that satisfy conditions 1, 2, 3, 4 and 1' described above are a first positive-case mapping table, a second positive-case mapping table, a third positive-case mapping table, . . . , a Qth positive-case mapping table, a second negative-case mapping table, a third negative-case mapping table and a Qth negative-case mapping table. After these mapping tables are set, values of F1 (1), F0 (1), F1 (2), F0 (2), . . . , F1 (Q) and F0 (Q) are also found in processing represented by the flowchart shown in FIG. 16. These values and the mapping tables are given to the encoder 101 of the transmitting apparatus 100 and the decoder 203 of the receiving apparatus 200 in advance so as to establish a state of matching between the transmitting apparatus 100 and the receiving apparatus 200.

It is to be noted that, as described above, F1 (q) is the ratio of the number of ON LEDs in a rectangular LED block indicated by S(t, i1, i2, . . . , iq) at a time t to the total number of all LEDs in the same rectangular LED block for R(t, i1, i2, . . . , iq)=1. On the other hand, F0 (q) is the ratio of the number of ON LEDs in a rectangular LED block indicated by S(t, i1, i2, . . . , iq) at a time t to the total number of all LEDs in the same rectangular LED block for R(t, i1, i2, . . . , iq)=0. Also as described above, these ratios are set at values fixed at all the times independently of input information with resolutions ranging from the first resolution to the Qth resolution. In addition, the relation F1 (q)>F0 (q) holds true.

FIG. 17 shows a flowchart representing the procedure of processing carried out by the encoder 103 employed in the transmitting apparatus 100.

As shown in the figure, the flowchart begins with a step S11 at which the variable q indicating the level of a hierarchical layer is set at 1. Then, at the next step S12, the values of {R(t, i1, i2, . . . , iq−1, 1), R(t, i1, i2, . . . , iq−1, 2), . . . , R(t, i1, i2, . . . , iq−1, Hq×Vq)} are determined. Details of the process carried out at the step S12 will be described later by referring to flowcharts shown in FIGS. 18 to 20.

Subsequently, the flow of the processing goes on to the next step S13 to form a judgment as to whether or not the value of q is smaller than Q. If the value of q is smaller than Q, indicating that a hierarchical layer at a higher frequency (a higher resolution) still exists, the flow of the processing goes on to a step S14. If the value of q is not smaller than Q, on the other hand, the flow of the processing goes on to a step S15.

At the step S14, the value of q is incremented by 1. Then, the flow of the processing goes back to the step S12 to repeat the processes of the steps S12 to S14. These processes are carried out repeatedly till the value of q is found no longer smaller than Q at the step S13.

At the step S15, the two-dimensional light-emitting unit 103 is driven to emit a beam in accordance with the value of R(t, i1, i2, . . . , iQ−1, iQ), which has been determined at the step S12. To put it in detail, an LED indicated by S(t, i1, i2, . . . , iQ−1, iQ) is turned on if the value of R(t, i1, i2, . . . , iQ−1, iQ) is 1 or the LED indicated by S(t, i1, i2, . . . , iQ−1, iQ) is turned off if the value of R(t, i1, i2, . . . , iQ−1, iQ) is 0 at times t where t=1, 2, . . . T. This process is carried out for all LEDs in the two-dimensional light-emitting unit 103 to generate a two-dimensional blinking pattern before the execution of the whole processing routine is ended.

It is to be noted that the time T is assumed to be such a time that a period of time between the time 0 and the time T is long enough for transmitting pieces of information having resolutions ranging from the first resolution to the Qth one. In addition, the bit rate varies from hierarchical layer to hierarchical layer so that it is quite within the bounds of possibility that information of a particular hierarchical layer such as the qth information is all transmitted earlier than the time T. That is to say, it is quite within the bounds of possibility that the transmission of the qth information is completed earlier than transmission of information of hierarchical layers other than this particular hierarchical layer. In this case, dummy data lasting at the time T is added to the tail of the qth information. The qth information and the dummy data are then encoded, and the transmission processing, that is, the operation to output a two-dimensional blinking pattern, is continued.

Figure 18:
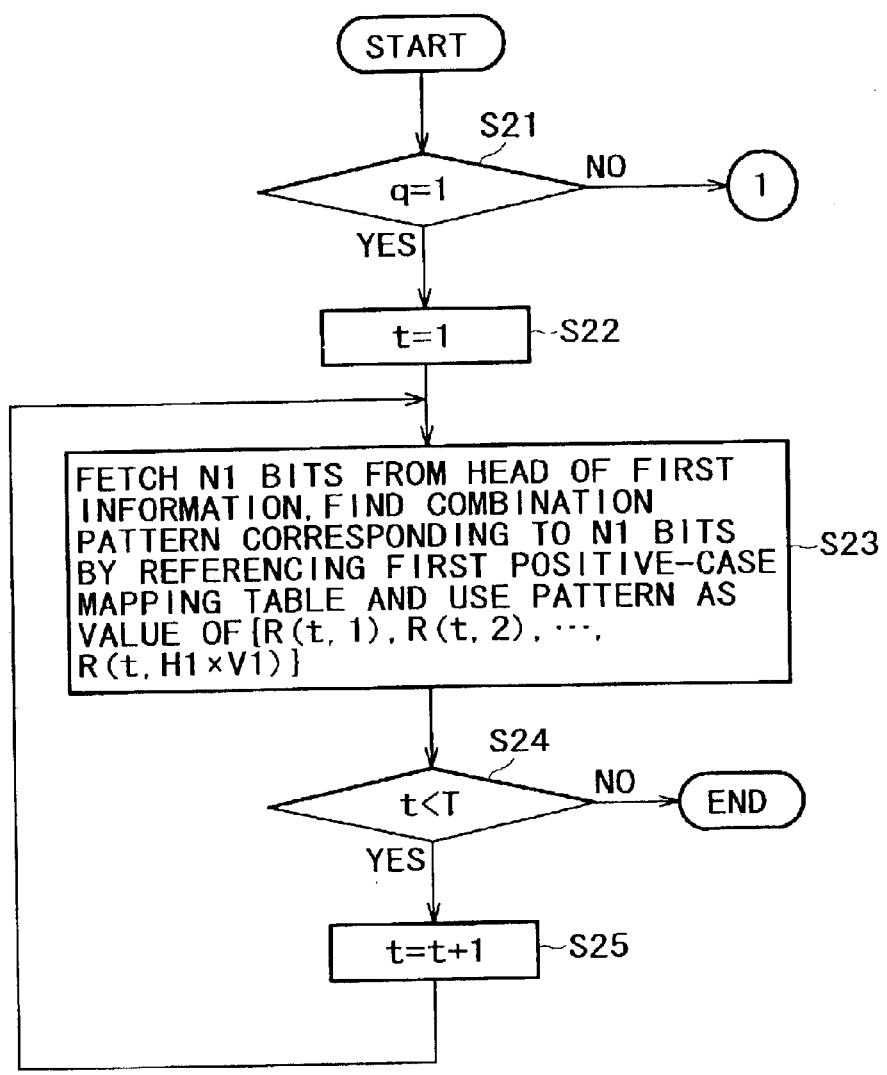
FIG. 18 shows a flowchart representing the procedure of details of a process carried out at a step S12 of the flowchart shown in FIG. 17.
Figure 19:
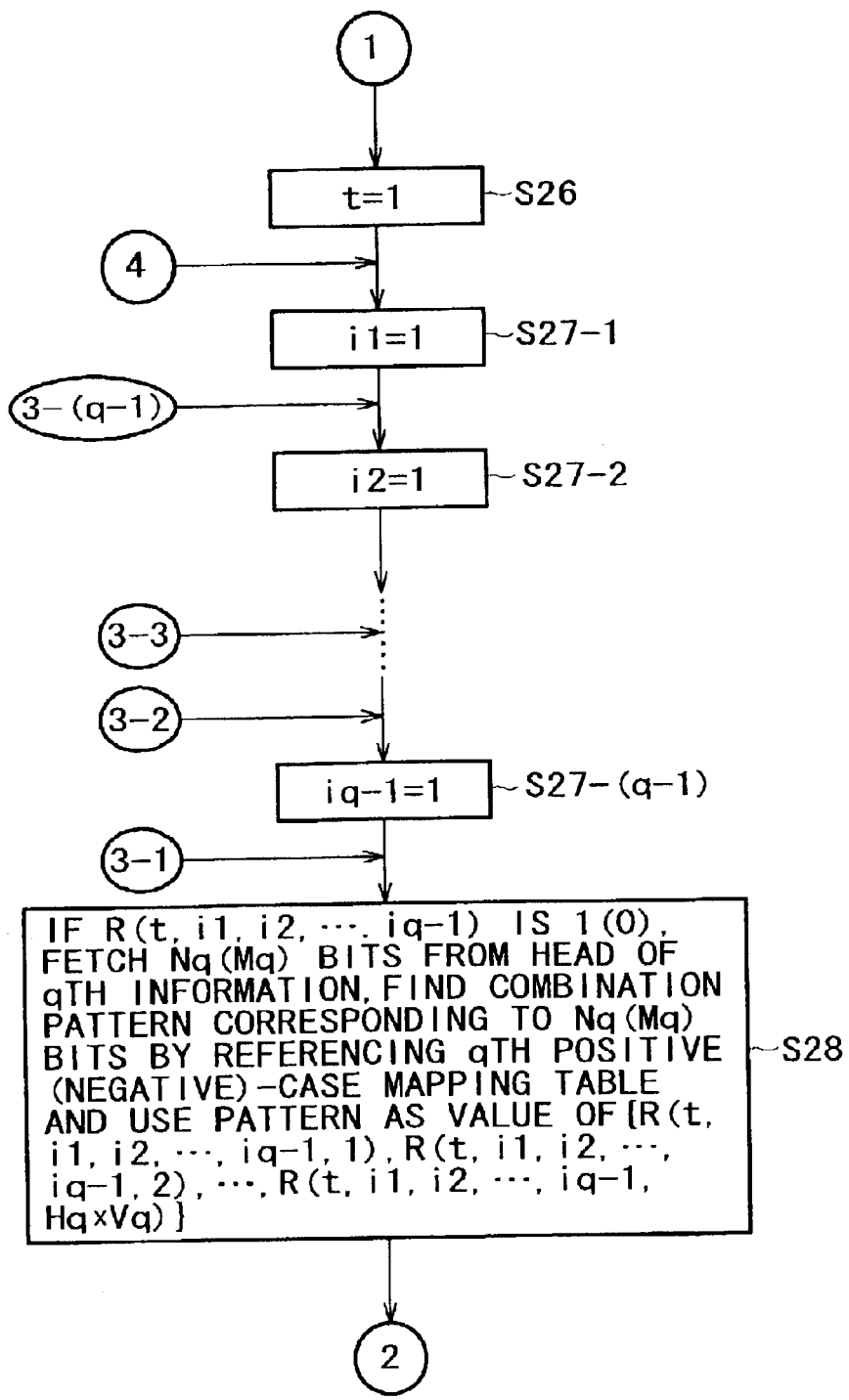
FIG. 19 shows a continuation flowchart representing the procedure of details of the process carried out at a step S12.
Figure 20:
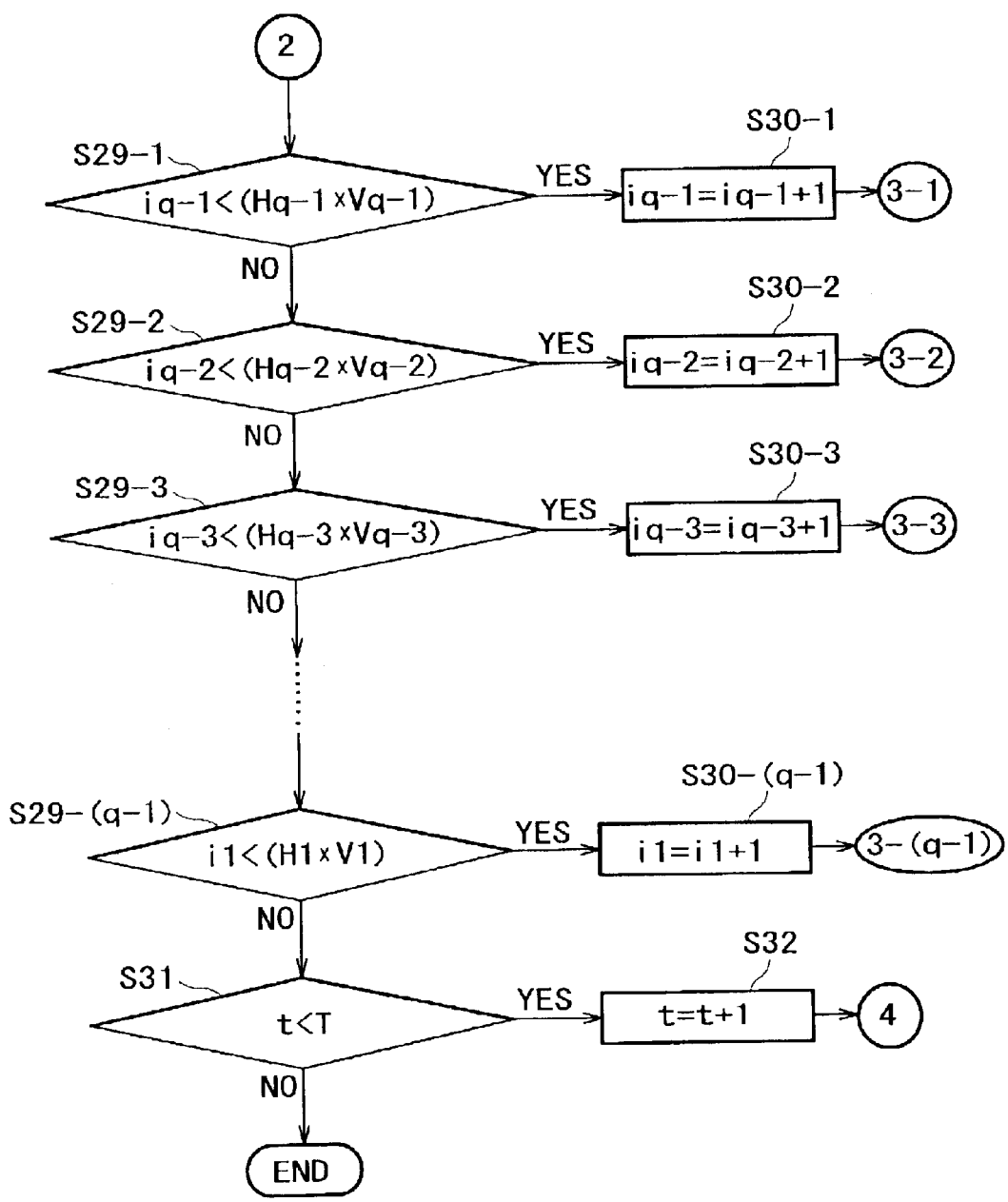
FIG. 20 shows a further continuation flowchart representing the procedure of details of the process carried out at a step S12.

FIGS. 18 to 20 show the aforementioned flowcharts of subroutines representing details of the processing carried out at the step S12 to determine the values of {R (t, i1, i2, . . . , iq−1, 1), R(t, i1, i2, . . . , iq−1, 2), . . . , R(t, i1, i2, . . . , iq−1, Hq×Vq)} from the qth information for a given hierarchical layer q. It is to be noted that, as is obvious from the flowchart shown in FIG. 17, prior to this stage, all values of R(t, i1, i2, . . . , iq−1) for t, i1, i2, . . . and iq−1 have already been determined.

As shown in FIG. 18, the flowchart begins with a step S21 to form a judgment as to whether or not the value of q is equal to 1. If the value of q is equal to 1, the flow of the processing goes on to a step S22. If the value of q is not equal to 1, on the other hand, the flow of the processing goes on to a step S26 of the flowchart shown in FIG. 19.

At the step S22, the variable t representing a time is set at 1. Then, at the next step S23, N1 bits are fetched from the head of the first information and a combination pattern corresponding to the N1 bits is found by referencing the first positive-case mapping table. Then, the combination pattern is used as a value of $\{R(t, 1), R(t, 2), \ldots, R(t, H1 \times V1)\}$. That is to say, values of $\{R(t, 1), R(t, 2), \ldots, R(t, H1 \times V1)\}$ are set. Subsequently, the N1 bits fetched from the head of the first information are discarded and the bits following the N1 bits are shifted to the head of the first information.

Then, the flow of the processing goes on to the next step S24 to form a judgment as to whether or not the variable t representing a time is earlier than the time T. If the time t is earlier than the time T, the flow of the processing goes on to a step S25. If the time t is not earlier than the time T, on the other hand, the execution of this processing routine is ended. This is because, in this case, $R(t, i1)$ has been set for all values of t (that is, for t=1, 2, ..., T) and for all values of i1 (that is, for i1=1, 2, ..., H1×V1).

At the step S25, the variable t representing a time is incremented by 1 in order to prepare for a process for the next time. Then, the flow of the processing goes back to the step S23.

At the step S26, the variable t representing a time is set at 1. Then, at the next step S27-1, the variable i1 is set at 1. By the same token, at the next step S27-2, the variable i2 is set at 1 and so on. Finally, at a step S27-(q-1), the variable iq-1 is set at 1.

Then, at the next step S28, the value of $R(t, i1, i2, \ldots, iq-1)$ specified by the present values of t, i1, i2, ..., iq-1 is checked.

To put it in detail, if $R(t, i1, i2, \ldots, iq-1)$ is 1, Nq bits are fetched from the head of the qth information and a combination pattern corresponding to the Nq bits is found by referencing the qth positive-case mapping table. Then, the combination pattern is used as the value of $\{R(t, i1, i2, \ldots, iq-1, 1), R(t, i1, i2, \ldots, iq-1, 2), \ldots, R(t, i1, i2, \ldots, iq-1, Hq \times Vq)\}$. That is to say, values of $R(t, i1, i2, \ldots, iq-1, 1), R(t, i1, i2, \ldots, iq-1, 2), \ldots, R(t, i1, i2, \ldots, iq-1, Hq \times Vq)$ are set. Subsequently, the Nq bits fetched from the head of the qth information are discarded and the bits following the Nq bits are shifted to the head of the qth information.

It is to be noted that, in accordance with condition 1 described above, for Nq=0, the value of $\{R(t, i1, i2, \ldots, iq-1, 1), R(t, i1, i2, \ldots, iq-1, 2), R(t, i1, i2, \ldots, iq-1, Hq \times Vq)\}$ is represented by a specific pattern at all the times. In this case, $R(t, i1, i2, \ldots, iq-1, 1), R(t, i1, i2, \ldots, iq-1, 2), \ldots, R(t, i1, i2, \ldots, iq-1, Hq \times Vq)$ are set at values represented by this specific pattern and the bits at the head of the qth information are not discarded.

In the case of $R(t, i1, i2, \ldots, iq-1)=0$, on the other hand, Mq bits are fetched from the head of the qth information and a combination pattern corresponding to the Mq bits is found by referencing the qth negative-case mapping table. Then, the combination pattern is used as the value of $\{R(t, i1, i2, \ldots, iq-1, 1), R(t, i1, i2, \ldots, iq-1, 2), \ldots, R(t, i1, i2, \ldots, iq-1, Hq \times Vq)\}$. That is to say, values of $R(t, i1, i2, \ldots, iq-1, 1), R(t, i1, i2, \ldots, iq-1, 2), \ldots, R(t, i1, i2, \ldots, iq-1, Hq \times Vq)$ are set. Subsequently, the Mq bits fetched from the head of the qth information are discarded and the bits following the Mq bits are shifted to the head of the qth information.

It is to be noted that, in accordance with condition 2 described above, for Mq=0, the value of $\{R(t, i1, i2, \ldots, iq-1, 1), R(t, i1, i2, \ldots, iq-1, 2), R(t, i1, i2, \ldots, iq-1, Hq \times Vq)\}$ is represented by a specific pattern at all the times. In this case, $R(t, i1, i2, \ldots, iq-1, 1), R(t, i1, i2, \ldots, iq-1, 2), \ldots, R(t, i1, i2, \ldots, iq-1, Hq \times Vq)$ are set at values represented by this specific pattern and the bits at the head of the qth information are not discarded.

Then, the flow of the processing goes on to the next step S29-1 of the flowchart shown in FIG. 20 to form a judgment as to whether or not the value of iq-1 is smaller than (Hq-1×Vq-1). If the value of iq-1 is smaller than (Hq-1×Vq-1), the flow of the processing goes on to a step S30-1. If the value of iq-1 is not smaller than (Hq-1×Vq-1), on the other hand, the flow of the processing goes on to a step S29-2.

At the step S30-1, the value of iq-1 is incremented by 1. Then, the flow of the processing goes back to the step S28.

At the step S29-2, the value of iq-2 is compared with (Hq-2×Vq-2) to form a judgment as to whether or not the value of iq-2 is smaller than (Hq-2×Vq-2). If the value of iq-2 is smaller than (Hq-2×Vq-2), the flow of the processing goes on to a step S30-2. If the value of iq-2 is not smaller than (Hq-2×Vq-2), on the other hand, the flow of the processing goes on to a step S29-3.

At the step S30-2, the value of iq-2 is incremented by 1. Then, the flow of the processing goes back to the step S27-(q-1).

At the step S29-3, the value of iq-3 is compared with (Hq-3×Vq-3) to form a judgment as to whether or not the value of iq-3 is smaller than (Hq-3×Vq-3). If the value of iq-3 is smaller than (Hq-3×Vq-3), the flow of the processing goes on to a step S30-3. If the value of iq-3 is not smaller than (Hq-3×Vq-3), on the other hand, the flow of the processing goes on to a step S29-4.

At the step S30-3, the value of iq-3 is incremented by 1. Then, the flow of the processing goes back to the step S27-(q-2).

Thereafter, the same process as the step S29-3 is carried out repeatedly at each of the subsequent steps S29-4, S29-5 and so on. At a step S29-(q-1), the value i1 is compared with (H1×V1) to form a judgment as to whether or not the value i1 is smaller than (H1×V1). If the value i1 is smaller than (H1×V1), the flow of the processing goes on to a step S30-(q-1). If the value i1 is not smaller than (H1×V1), on the other hand, the flow of the processing goes on to a step S31. It is to be noted that steps S29-4 to S29-(q-2) and steps S30-4 to S30-(q-2) are omitted from the flowchart in order to prevent the flowchart from being crowded with identical steps.

At the step S30-(q-1), the value of i1 is incremented by 1. Then, the flow of the processing goes back to the step S27-2.

At the step S31, the variable t representing a time is compared with the time T to form a judgment as to whether or not the variable t is earlier than the time T. If the variable t representing a time is earlier than the time T, the flow of the processing goes on to a step S32. If the variable t representing a time is not earlier than the time T, on the other hand, the execution of this whole processing routine is ended. This is because the values of $R(t, i1, i2, \ldots, iq-1, iq)$ for all the values of t (that is, for t=1, 2, ..., T), all the values of i1 (that is, for i1=1, 2, ..., H1×V1), all the values of i2 (that is, for i2=1, 2, ..., H2×V2), ... and all the values of iq (that is, for iq=1, 2, ..., Hq×Vq) have been set.

At the step S32, the variable t representing a time is incremented by 1 in order to prepare for a process for the next time. Then, the flow of the processing goes back to the step S27-1.

By referring to the flowcharts shown in FIG. 17 and FIGS. 18 to 20, the above description has explained the procedure of the processing carried out by the encoder 101 to create a time-series two-dimensional light-emitting pattern on the two-dimensional light-emitting unit 103 from pieces of information ranging from the first information to the Qth information which are input via the input terminal 102.

The following description explains a process carried out by the decoder 203 employed in the receiving apparatus 200 to restore a two-dimensional blinking pattern to the original information.

As has already been explained earlier, if the receiving apparatus 200 is located at a long distance from the transmitting apparatus 100, the camera 201 employed in the receiving apparatus 200 is not capable of taking a picture of a two-dimensional blinking pattern, which is displayed on the two-dimensional light-emitting unit 103, at a sufficient resolution. In such a case, a picture obtained as a result of a transformation process carried out by the perspective projection unit 202 employed in the receiving apparatus 200 is a more or less blurring picture. The picture obtained as a result of the transformation process has a width of H pixels and a height of V pixels. If it is possible to detect a two-dimensional blinking pattern originated from H1×V1 rectangular LED blocks each consisting of (H2×H3×...×HQ)×(V2×V3×...×VQ) LEDs, the decoder 203 is capable of decoding the two-dimensional blinking pattern to generate the first information. If it is possible to further detect a two-dimensional blinking pattern originated from (H1×H2)×(V1×V2) rectangular LED blocks each consisting of (H3×H4×...×HQ)×(V3×V4×...×VQ) LEDs, the decoder 203 is capable of decoding the two-dimensional blinking pattern to generate the second information. Thereafter, a two-dimensional blinking pattern of a higher resolution needs to be detected to generate information of the same resolution. The degree of the two-dimensional blinking pattern resolution is determined by the blurring state of the H×V picxels obtained as a result of a transformation process carried out by the perspective projection unit 202 employed in the receiving apparatus 200, where symbol H is the picture width expressed in terms of pixels and symbol V is the picture height expressed in terms of pixels.

Figure 21:
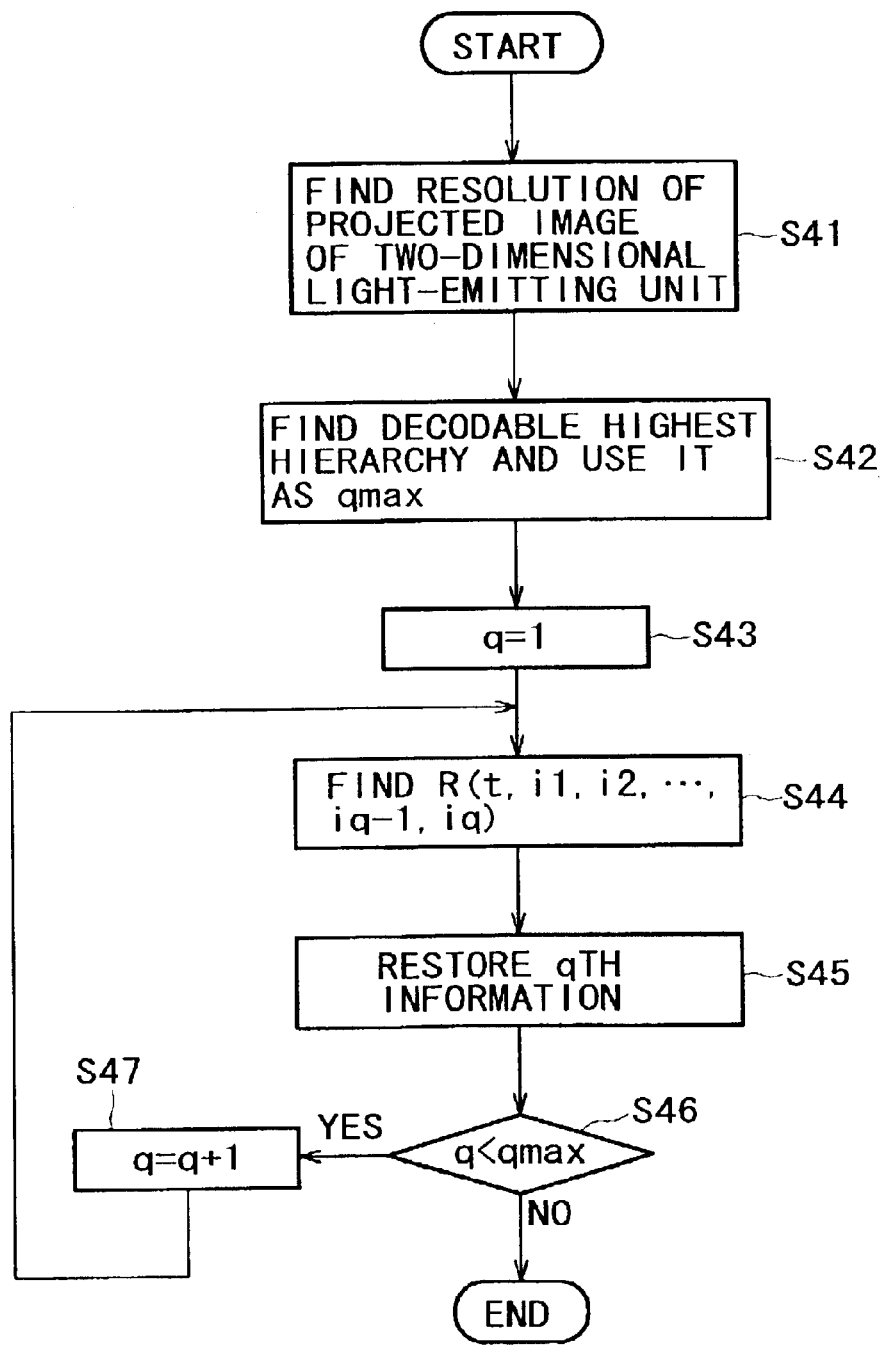
FIG. 21 shows a flowchart representing the procedure of a process carried out by a decoder of a receiving apparatus to decode a two-dimensional blinking pattern.

FIG. 21 shows a flowchart representing the procedure of processing carried out by the decoder 203 employed in the receiving apparatus 200 to decode a two-dimensional blinking pattern.

As shown in the figure, the flowchart begins with a step S41 to examine the true resolution of an H×V pixels obtained as a result of a transformation process carried out by the perspective projection unit 202 employed in the receiving apparatus 200, where symbol H is the picture width expressed in terms of pixels and symbol V is the picture height expressed in terms of pixels.

As numerical values for expressing a resolution, symbol G0 is used as an identifiable unit in the horizontal direction and symbol G1 is used as an identifiable unit that in the vertical direction. Assume for example that a picture taken by the camera 201 employed in the receiving apparatus 200 includes a picture of a projected image of the two-dimensional light-emitting unit 1031. The picture of a projection image of the two-dimensional light-emitting unit 103 had original dimensions of approximately (H/3) pixels×(V/4) pixels. The perspective projection unit 202 transforms the picture of a projection image of the two-dimensional light-emitting unit 103 into a picture consisting of H×V pixels. That is to say, the original picture taken by the camera 201 is enlarged by a factor of three times in the horizontal direction and a factor of four times in the vertical direction. Accordingly, the true resolution of the resulting H-pixel×V-pixel picture obtained as a result of the transformation process carried out by the perspective projection unit 202 employed in the receiving apparatus 200 is the same as the resolution of the projected image picture having dimensions of approximately (H/3) pixels×(V/4) pixels. In other words, the receiving apparatus 200 is not capable of recognizing the blinking state of each LED of the two-dimensional blinking pattern emitted by the two-dimensional light-emitting unit 103, which consists of H×V LEDs. What the receiving apparatus 200 is capable of doing is recognition of an average amount of emission by 3×4 LEDs or the number of ON LEDs among the 3×4 LEDs. In this state, the units G0 and G1 are said to have values of 3 and 4 respectively. In some cases, the units G0 and G1 had better be set at typical values of 5 and 7 respectively to provide a margin to a certain degree in dependence on the performance of the lens of the camera 201 and the performance of the perspective projection unit 202.

Then, the flow of the processing goes on to the next step S42 to determine the depth of the hierarchy or the largest number of a hierarchical layer at which the decoding process can be carried out. To put it concretely, a process is carried out at the step S42 to find a smallest value of q that satisfies relations of (Hq+1×Hq+2×...×HQ)≧G0 and (Vq+1×Vq+2×...×VQ)≧-G1. This smallest value of q is denoted by symbol qmax. It is to be noted that, for G0=G1-1, qmax=Q.

Then, at the next step S43, the variable q representing the hierarchical layer is set at 1. Subsequently, at the next step S44, the value of R(t, i1, i2, ..., iq-1, iq) is found. The procedure of a process carried out at the step S44 will be explained in detail later.

Then, at the next step S45, the two-dimensional blinking pattern is restored to the qth information. Details of a method to restore a two-dimensional blinking pattern to the qth information will be described later.

Subsequently, the flow of the processing goes on to the next step S46 to form a judgment as to whether or not the value of q is smaller than qmax. If the value of q is smaller than qmax, the flow of the processing goes on to a step S47 in order to prepare for restoring process at the next hierarchical layer. If the value of q is not smaller than qmax, on the other hand, the execution of the entire processing routine is ended.

At the step S47, the value of q is incremented by 1. Then, the flow of the processing goes back to the step S44.

Figure 22:
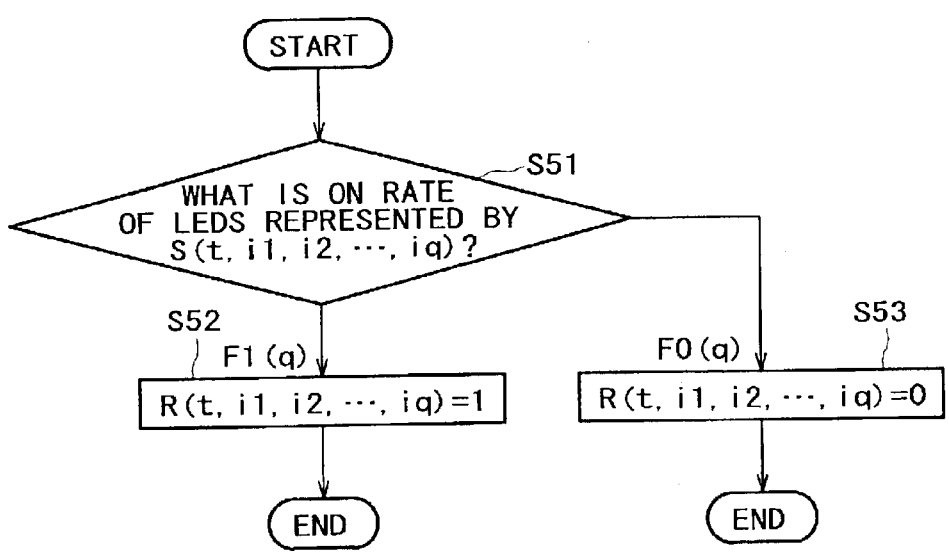
FIG. 22 shows a flowchart representing the procedure of details of a process to determine R(t, i1, i2, . . . , iq−1, iq) from a shot picture of the two-dimensional light-emitting unit.

FIG. 22 shows a flowchart representing a detailed procedure of processing carried out at the step S44 of the flowchart shown in FIG. 21 to determine a value of R(t, i1, i2, ..., iq, iq-1) from a projected picture of the two-dimensional light-emitting unit 103 for a given value of q. Speaking accurately, the projected picture is a H-pixel×V-pixel picture obtained as a result of an affine transformation process carried out by the perspective projection unit 202 on a picture taken by the camera 201. That is to say, the projected picture is a picture generated by the perspective projection unit 202 as a result of the transformation process.

As shown in the figure, the flowchart begins with a step S51 to form a judgment as to whether the ratio of the number of ON LEDs in a rectangular LED block indicated by S(t, i1, i2, ..., iq) at a time t to the total number of all LEDs in the same rectangular LED block is equal to F1 (q) or F0 (q).

If the ratio of the number of ON LEDs in a rectangular LED block indicated by S(t, i1, i2, ..., iq) at a time t to the total number of all LEDs in the same rectangular LED block is equal to F1 (q), the flow of the processing goes on to a step S52. If the ratio of the number of ON LEDs in a rectangular LED block indicated by S (t, i1, i2, . . . , iq) at a time t to the total number of all LEDs in the same rectangular LED block is equal to F0 (q), on the other hand, the flow of the processing goes on to a step S53. In actuality, however, due to existence of a noise, at the step S51, the ratio is examined to determine whether the ratio is at least equal to {F1 (q) +F0 (q)}/2 or smaller than {F1 (q)+F0 (q)}/2.

At the step S52, R(t, i1, i2, . . . , iq) is set at 1 before the execution of the whole processing routine is ended.

At the step S53, on the other hand, R(t, i1, i2, . . . , iq) is set at 0 before the execution of the whole processing routine is ended.

It is to be noted that the processing routine represented by the flowchart shown in FIG. 22 is executed for all values of t (that is, for t=1, 2, . . . , T), for all values of i1 (that is, for i1=1, 2, . . . , H1×V1) for all values of i2 (that is, for i2=1, 2, . . . , H2×V2) and for all values of iq (that is, for iq=1, 2, . . . , Hq×Vq).

Since F1 (q) is a ratio of the number of ON LEDs in a rectangular LED block indicated by S(t, i1, i2, . . . , iq) at a time t to the total number of all LEDs in the same rectangular LED block for R(t, i1, i2, . . . , iq)=1 while F0 (q) is a ratio of the number of ON LEDs in a rectangular LED block indicated by S(t, i1, i2, . . . , iq) at a time t to the total number of all LEDs in the same rectangular LED block for R(t, i1, i2, . . . , iq)=0, it is easy for a person skilled in the art to understand that a method represented by the flowchart shown in FIG. 22 to find a value of R(t, i1, i2, . . . , iq) is a proper method.

Figure 23:
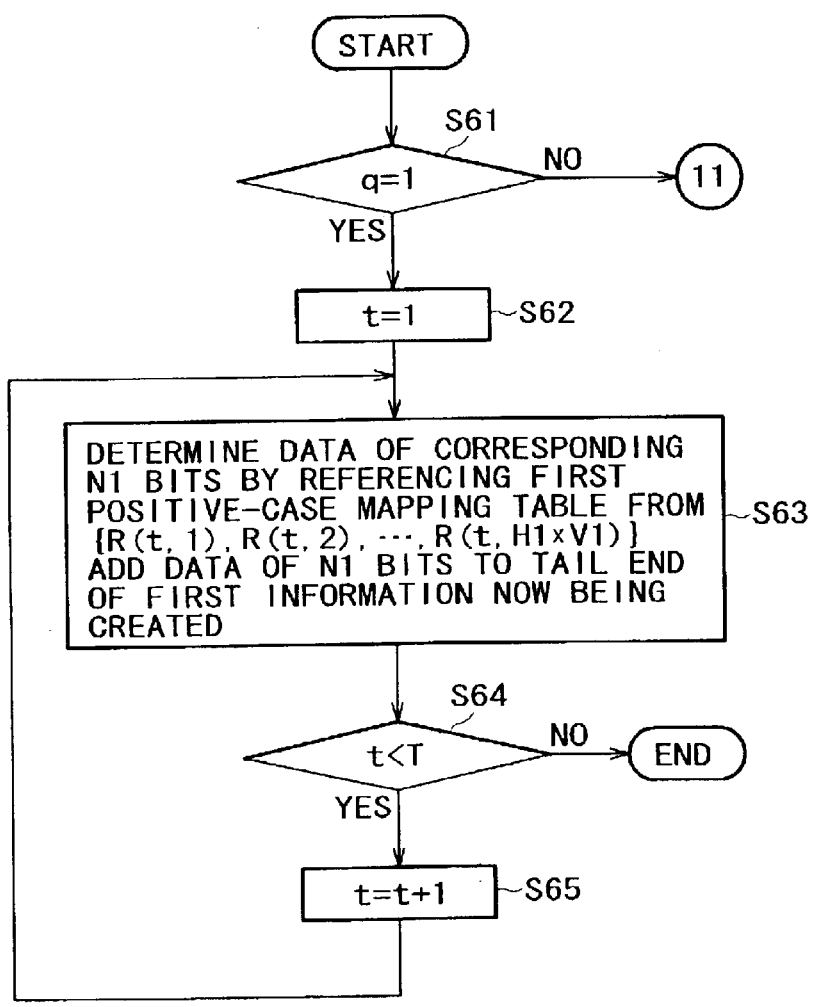
FIG. 23 shows a flowchart representing the procedure of details of a process shown in FIG. 21 to determine qth information from R(t, i1, i2, . . . , iq−1, iq) for a given value of q.
Figure 24:
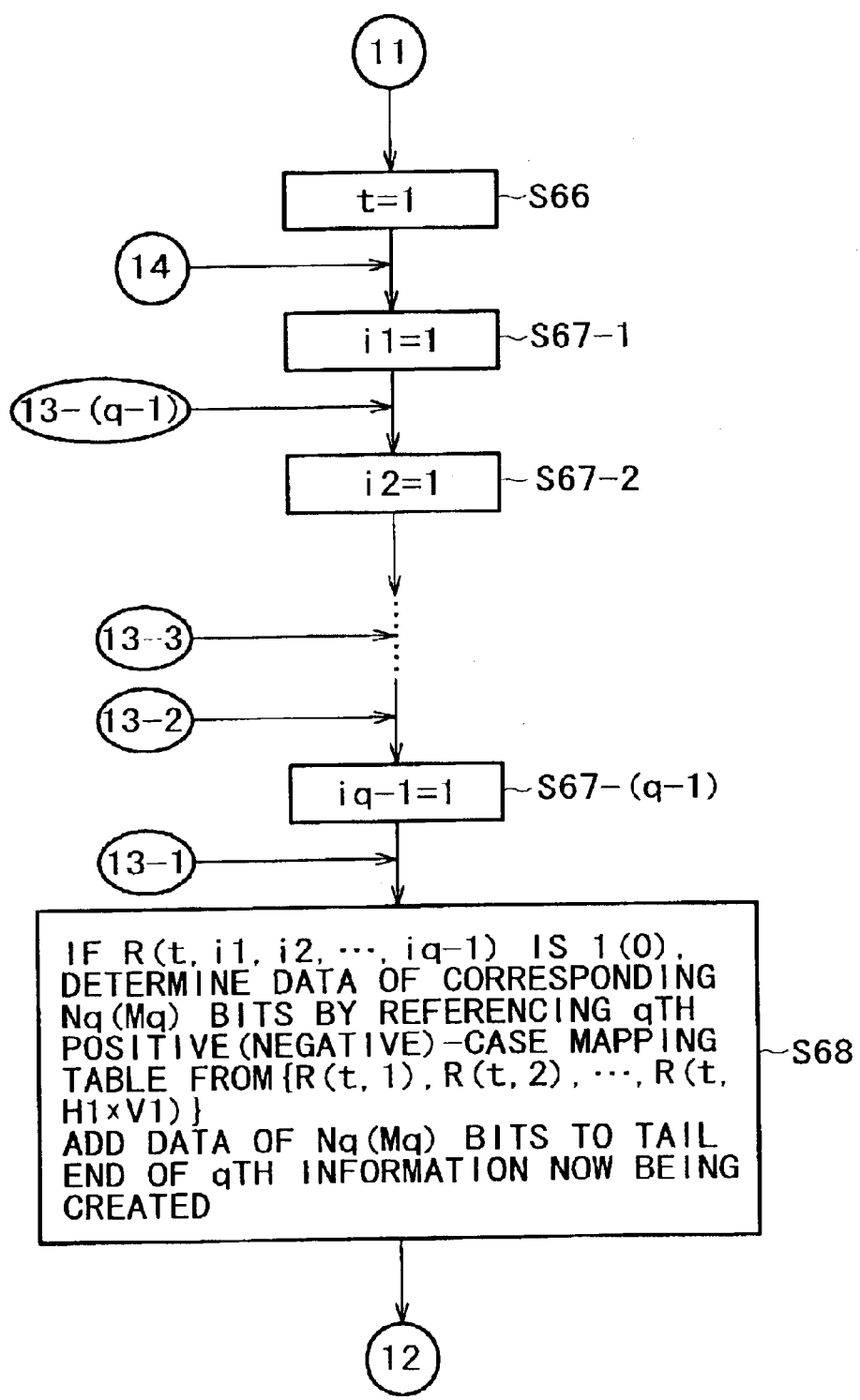
FIG. 24 shows a continuation flowchart representing the procedure of details of the process to determine qth information from R(t, i1,i2, . . . , iq−1, iq) for a given value of q.
Figure 25:
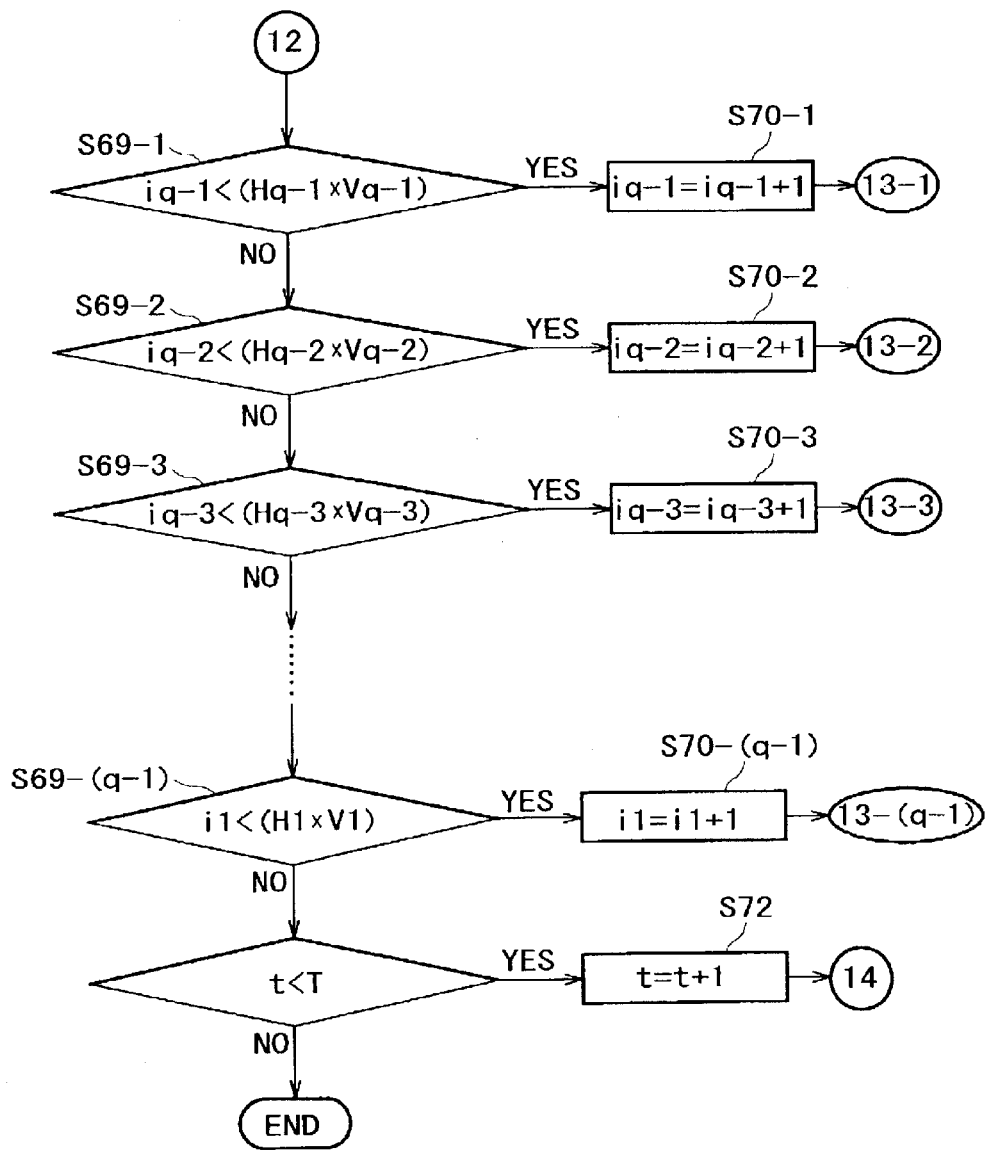
FIG. 25 shows a further continuation flowchart representing the procedure of details of the process to determine qth information from R(t, i1, i2, . . . , iq−1, iq) for a given value of q.

FIGS. 23 to 25 show flowcharts representing a detailed procedure of processing carried out at the step S45 to find the qth information from R(t, i1, i2, . . . , iq-1, iq) for a given value of q. It is to be noted that, as is obvious from the processing procedure represented by the flowchart shown in FIG. 21, prior to this stage, all values of R(t, i1, i2, . . . , iq-1) for t, i1, i2, . . . , iq-1 have already been determined.

The flowchart shown in FIG. 23 begins with a step S61 to form a judgment as to whether or not the value of q is equal to 1. If the value of q is equal to 1, the flow of the processing goes on to a step S62. If the value of q is not equal to 1, on the other hand, the flow of the processing goes on to a step S66 of the flowchart shown in FIG. 24.

At the step S62, the variable t representing a time is set at 1. Then, at the next step S63, data of the corresponding N1 bits of the first information is determined by referencing the first positive-case mapping table from {R(t, 1), R(t, 2), . . . , R(t, H1×V1)}, and added to a tail end of a memory (not shown) employed in the receiving apparatus 200 but shown in none of the figures. The memory is used as storage means for storing the first information by adding such data to its tail from time to time.

Then, the flow of the processing goes on to the next step S64 to form a judgment as to whether or not the variable t representing a time is earlier than the time T. If the time t is earlier than the time T, the flow of the processing goes on to a step S65. If the time t is not earlier than the time T, on the other hand, the execution of the whole processing routine is ended. This is because, in this case, R(t, i1) has been restored to the first information for all values of t (that is, for t=1, 2, . . . , T) and for all values of i1 (that is, for i1=1, 2, . . . H1×V1).

At the step S65, the variable t representing a time is incremented by 1 in order to prepare for a process for the next time. Then, the flow of the processing goes back to the step S63.

At the step S66, the variable t representing a time is set at 1. Then, at the next step S67-1, the variable i1 is set at 1. By the same token, at the next step S67-2, the variable i2 is set at 1 and so on.

Thereafter, the same process as the step S67-1 or S67-2 is carried out at each of the subsequent steps. Finally, at a step S67-(q-1), the variable iq-1 is set at 1. The flow of the processing then goes on to a step S68. It is to be noted that the steps S67-3 and S67-(q-2) are not shown in FIG. 24 to prevent the flowchart shown in the figure from becoming crowded with identical steps.

Then, at the next step S68, the value of R(t, i1, i2, . . . , iq-1) specified by the present values of t, i1, i2, . . . and iq-1 is checked.

To put it in detail, if R(t, i1, i2, . . . , iq-1) is 1, data of corresponding Nq bits of the qth information is determined from the combination pattern of {R(t, i1, i2, . . . , iq-1, 1), R(t, i1, i2, . . . , iq-1, 2), . . . , R(t, i1, i2, . . . , iq-1, Hq×Vq)} by referencing the qth positive-case mapping table, and added to a tail end of a memory (not shown) employed in the receiving apparatus 200 but shown in none of the figures. The memory is used as storage means for storing the qth information by adding data to the tail from time to time.

It is to be noted that, in accordance with condition 1 described above, for Nq=0, data of the qth bit is not included and, hence, none is added to a tail end of the memory for storing the qth information by adding such data to its tail from time to time. By the way, in this case, the value of {R(t, i1, i2, . . . , iq-1, 1), R(t, i1, i2, . . . , iq-1, 2), . . . , R(t, i1, i2, . . . , iq-1, Hq×Vq)} should be represented by a specific pattern at all the times.

In the case of R(t, i1, i2, . . . , iq-1)=0, on the other hand, data of corresponding Mq bits of the qth information is determined referencing the first negative-case mapping table from the combination pattern of {R(t, i1, i2, . . . , iq-1, 1), R(t, i1, i2, . . . , iq-1, 2), . . . , R(t, i1, i2, . . . , iq-1, Hq×Vq)}, and added to a tail end of the memory employed in the receiving apparatus 200 to be used as storage means for storing the qth information by adding such data to its tail from time to time.

It is to be noted that, in accordance with condition 2 described above, for Mq=0, data of the qth bit is not included and, hence, none is added to a tail end of the memory for storing the qth information by adding such data to its tail from time to time. By the way, in this case, the value of {R(t, i1, i2, . . . , iq-1, 1), R(t, i1, i2, . . . , iq-1, 2), R(t, i1, i2, . . . , iq-1, Hq×Vq)} should be represented by a specific pattern at all the times.

Then, the flow of the processing goes on to the next step S69-1 of the flowchart shown in FIG. 20 to form a judgment as to whether or not the value of iq-1 is smaller than (Hq-1×Vq-1). If the value of iq-1 is smaller than (Hq-1×Vq-1), the flow of the processing goes on to a step S70-1. If the value of iq-1 is not smaller than (Hq-1×Vq-1), on the other hand, the flow of the processing goes on to a step S69-2.

At the step S70-1, the value of iq-1 is incremented by 1. Then, the flow of the processing goes back to the step S68.

At the step S69-2, the value of iq-2 is compared with (Hq-2×Vq-2) to form a judgment as to whether or not the value of iq-2 is smaller than (Hq-2×Vq-2). If the value of iq-2 is smaller than (Hq-2×Vq-2), the flow of the processing goes on to a step S70-2. If the value of iq-2 is not smaller than (Hq-2×Vq-2), on the other hand, the flow of the processing goes on to a step S69-3.

At the step S70-2, the value of iq-2 is incremented by 1. Then, the flow of the processing goes back to the step S67-(q-1).

At the step S69-3, the value of iq-3 is compared with (Hq-3×Vq-13) to form a judgment as to whether or not the value of iq−3 is smaller than (Hq−3×Vq−3). If the value of iq−3 is smaller than (Hq−3×Vq−3), the flow of the processing goes on to a step S70-3. If the value of iq−3 is not smaller than (Hq−3×Vq−3), on the other hand, the flow of the processing goes on to a step S69-4.

At the step S70-3, the value of iq−3 is incremented by 1. Then, the flow of the processing goes back to the step S67-(q−2).

Thereafter, the same process as the step S69-3 is carried out repeatedly at each of the subsequent steps S69-4, S69-5 and so on. At a step S69-(q−1), the value i1 is compared with (H1×V1) to form a judgment as to whether or not the value i1 is smaller than (H1×V1). If the value i1 is smaller than (H1×V1), the flow of the processing goes on to a step S70-(q−1). If the value i1 is not smaller than (H1×V1), on the other hand, the flow of the processing goes on to a step S71. It is to be noted that steps S69-4 to S69-(q−2) and steps S70-4 to S70-(q−2) are omitted from the flowchart in order to prevent the flowchart from being crowded with identical steps.

At the step S70-(q−1), the value of i1 is incremented by 1. Then, the flow of the processing goes back to the step S67-2.

At the step S71, the variable t representing a time is compared with the time T to form a judgment as to whether or not the variable t is earlier than the time T. If the variable t representing a time is earlier than the time T, the flow of the processing goes on to a step S72. If the variable t representing a time is not earlier than the time T, on the other hand, the execution of the whole processing routine is ended. This is because $R(t, i1, i2, \ldots, iq-1, iq)$ for all the values of t (that is, for t=1, 2, . . . , T), all the values of i1 (that is, for i1=1, 2, . . . H1×V1), all the values of i2 (that is, for i2=1, 2, . . . H2×V2), and all the values of iq (that is, for iq=1, 2, . . . , Hq×Vq) have been restored to the qth information.

At the step S72, the variable t representing a time is incremented by 1 in order to prepare for a process for the next time. Then, the flow of the processing goes back to the step S67-1.

By referring to the flowcharts shown in FIGS. 21 and 22 as well as FIGS. 23 to 25, the above description has explained a method of the processing carried out by the decoder 203 to restore an input time-series two-dimensional light-emitting pattern generated by the two-dimensional light-emitting unit 103 to information, which can be any one of pieces of information ranging from the first information to the qmaxth information.

It is to be noted that, in the processing procedure described above, in order to identify an hierarchical layer at which an input time-series two-dimensional light-emitting pattern can be decoded, at the step S41, a recognition unit G0 in the vertical direction and a recognition unit G1 in the horizontal direction are introduced. Then, the flow of the processing goes on to the next step S42 to determine the depth of the hierarchy or the largest number of a hierarchical layer at which the decoding process can be carried out. In the case of a transmission in which parity bits for correction of errors are added to information at each hierarchical layer, the receiving apparatus 200 is capable of determining how many errors are included in information of each hierarchical layer. If the receiving apparatus 200 detects too many errors at a specific hierarchical layer in such a system, the receiving apparatus 200 may discontinue the decoding process for hierarchical layers higher than the specific hierarchical layer. That is to say, the receiving apparatus 200 may determine a highest hierarchical layer at which the decoding process is to be carried out.

The following description explains details of an actual implementation of the two-dimensional light-emitting unit 103 comprising 16×16 devices or 16×16 LEDs.

As described above, the following quantities have values as follows: H=V=16, Q=4, H1=V1=H2=V2=H3=V3=H4=V4=2. In this case, for N1=N2=N3=N4=2, M1=M2=M3=M4=2, U1=U2=U3=U4=0.75 and Z1=Z2=Z3=Z4=0.25, an example of the mapping method satisfying conditions 1, 2, 3, 4 and 1' described above is given below. To be more specific, examples of the first positive-case mapping table, the second positive-case mapping table, the third positive-case mapping table, the fourth positive-case mapping table, the second negative-case mapping table, third negative-case mapping table and the fourth negative-case mapping table are given as follows.

Example of the qth positive-case mapping table where q=2, 3 and 4

In the case of $R(t, i1, i2, \ldots, iq-1)=1$, for 2-bit input data, a combination pattern of $\{R(t, i1, i2, \ldots, iq-1, 1), R(t, i1, i2, \ldots, iq-1, 2), R(t, i1, i2, \ldots, iq-1, 3), R(t, i1, i2, \ldots, iq-1, 4)\}$ is determined. For example, in the case of input data having a value of 00, the combination pattern is $\{0, 1, 1, 1\}$. In the case of input data having a value of 01, 10 or 11, on the other hand, the combination pattern is $\{1, 0, 1, 1\}$, $\{1, 1, 0, 1\}$ or $\{1, 1, 1, 0\}$ respectively. This relation is referred to hereafter as the qth positive-case mapping table.

Example of the qth negative-case mapping table where q=2, 3 and 4

In the case of $R(t, i1, i2, \ldots, iq-1)=0$, for 2-bit input data, a combination pattern of $\{R(t, i1, i2, \ldots, iq-1, 1), R(t, i1, i2, \ldots, iq-1, 2), R(t, i1, i2, \ldots, iq-1, 3), R(t, i1, i2, \ldots, iq-1, 4)\}$ is determined. For example, in the case of input data having a value of 00, the combination pattern is $\{1, 0, 0, 0\}$. In the case of input data having a value of 01, 10 or 11, on the other hand, the combination pattern is $\{0, 1, 0, 0\}$, $\{0, 0, 1, 0\}$ or $\{0, 0, 0, 1\}$ respectively. This relation is referred to hereafter as the qth negative-case mapping table.

Example of the first positive-case mapping table

For 2-bit input data, a combination pattern of $\{R(t, 1), R(t, 2), R(t, 3), R(t, 4)\}$ is determined. For example, in the case of 2-bit input data having a value of 0, the combination pattern is $\{0, 1, 1, 1\}$. In the case of 2-bit input data having a value of 1, 2 or 3, on the other hand, the combination pattern is $\{1, 0, 1, 1\}$, $\{1, 1, 0, 1\}$ or $\{1, 1, 1, 0\}$ respectively. This relation is referred to hereafter as the first positive-case mapping table.

In this case, the following values are used: F1 (4) =1, F0 (4)=0, F1 (3)=¾, F0 (3)=¼, F1 (2)=10/16, F0 (2)=6/16, F1 (1)=36/64, F0 (1)=28/64.

The data communication system provided by the present invention uses an optical signal conveying a two-dimensional blinking pattern as data transmission media. As described above, the two-dimensional light-emitting unit 103 is driven so as to always result in a relation of F1 (q) >F0 (q). That is to say, for $R(t, i1, i2, \ldots, iq)=1$, the ratio F1 (q) of the number of ON LEDs in a rectangular LED block indicated by $S(t, i1, i2, \ldots, iq)$ to the total number of all LEDs in the same rectangular LED block at a time t is different from the ratio F0 (q) of the number of ON LEDs in a rectangular LED block indicated by $S(t, i1, i2, \ldots, iq)$ to the total number of all LEDs in the same rectangular LED block at a time t for $R(t, i1, i2, \ldots, iq)=0$.

Thus, in the receiving apparatus 200, the average brightness of LEDs in a rectangular LED block indicated by $S(t, i1, i2, \ldots, iq)$ at a time t is found and examined to form a judgment as to whether the average brightness is F1 (q) or F0 (q) or whether the average brightness is greater or smaller than $\{F1\ (q)+F0\ (q)\}/2$ in order to find the value of R(t, i1, i2, ..., iq) where the average brightness is defined as a ratio of the number of ON LEDs in a rectangular LED block indicated by S(t, i1, i2, ..., iq) at a time t to the total number of all LEDs in the same rectangular LED block at the same time t.

As a mapping method resulting in a relation of F1 (q)>F0 (q), a method satisfying conditions 1, 2, 3, 4 and 1' has been explained. It is needless to say that a mapping method satisfying other conditions can also be adopted. For example, it is possible to adopt a mapping method satisfying conditions described as follows.

Condition 11

In the case of R(t, i1, i2, ..., iq-1)=1, a combination pattern of {R(t, i1, i2, ..., iq-1, 1), R(t, i1, i2, ..., iq-1, 2), ..., R(t, i1, i2, ..., iq-1, Hq×Vq)} for input data consisting of Lq bits is determined. The number of elements included in the combination pattern of (R (t, i1, i2, ..., iq-1, 1), R(t, i1, i2, ..., iq-1, 2), ..., R (t, i1, i2, ..., iq-1, Hq×Vq)} for the input data consisting of Lq bits is Hq×Vq. At least one of the Hq×Vq elements has a value of 1. In addition, if the input data consisting of Lq bits changes, the combination pattern of {R(t, i1, i2, ..., iq-1, 1), R(t, i1, i2, ..., iq-1, 2), ..., R(t, i1, i2, ..., iq-1, Hq×Vq)} for the input data consisting of Lq bits also changes as well.

In this case, symbol Lq denotes a constant of at least 1. The input data consisting of Lq bits is Lq-bit data included in the qth information. A relation used to determine a combination pattern of {R(t, i1, i2, ..., iq-1, 1), R(t, i1, i2, ..., iq-1, 2), ..., R(t, i1, i2, ..., iq-1, Hq×Vq)} for the input data consisting of Lq bits is referred to hereafter as a qth positive-case mapping table.

Condition 12

In the case of R(t, i1, i2, ..., iq-1)=0, the values of {R(t, i1, i2, ..., iq-1, 1), R(t, i1, i2, ..., iq-1, 2), ..., R(t, i1, i2, ..., iq-1, Hq×Vq)} are all 0. Thus, the qth information is not transmitted by using {R (t, i1, i2, ..., iq-1, 1), R(t, i1, i2, ..., iq-1, 2), R (t, i1, i2, ..., iq-1, Hq×Vq)} for the input data consisting of Lq bits is Hq×Vq.

For q=1, however, there is no hierarchical layer above the first hierarchical layer. In such a case, condition 12 is ignored and condition 11 is used as a mapping table. That is to say, the mapping table satisfies condition 11' described as follows.

Condition 11' (for q=1)

A combination pattern of {R(t, 1), R(t, 2), R(t, H1×V1)} for input data consisting of Lq bits (that is, L1 bits) is determined. The number of elements included in the combination pattern of {R(t, 1), R(t, 2), ..., R (t, H1×V1)} for the input data consisting of L1 bits is H1×V1. At least one of the H1×V1 elements has a value of 1. In addition, if the input data consisting of L1 bits changes, the combination pattern of {R(t, 1), R(t, 2), ..., R(t, H1×V1)} for the input data consisting of L1 bits also changes as well.

In this case, symbol L1 denotes a constant of at least 1. The input data consisting of L1 bits is L1-bit data included in the first information. A relation used to determine a combination pattern of {R(t, 1), R(t, 2) ..., R(t, H1×V1)} for the input data consisting of L1 bits is referred to hereafter as a first positive-case mapping table.

There is a plurality of conceivable mapping methods that satisfy conditions 11, 12 and 11'. One of the methods is selected to be adopted as a method common to the encoder 101 and the decoder 203.

By adoption of a mapping method that satisfies conditions 11, 12 and 11' described above, R(t, i1), R (t, i1, i2), ..., R(t, i1, i2, ..iQ) are determined from pieces of information with resolutions ranging from the first resolution to the Qth one.

Now, consider a ratio of the number of ON LEDs in a rectangular LED block indicated by S (t, i1, i2, ... iq) at a time t to the total number of all LEDs in the same rectangular LED block.

For a value of q (where the value of q is 1, ..., Q-1), and for any value of i1 (where the value of i1 is 1, 2, ..., H1×V1), for any value of i2 (where the value of i2 is 1, 2, ..., H2×V2), and for any value of iq (where the value of iq is 1, 2, ..., Hq×Vq) and at any time t (where t=1, 2, ..., T), R(t, i1, i2, ..., iq, iq+1) is all 0 in accordance with condition 12 provided that R(t, i1, i2, ..., iq) is 0. Thus, if R(t, i1, i2, ..., iq) is 0 at all the times t, the value of R(t, i1, i2, ..., iQ) is 0 at all the times for any value of iq+1 (where the value of iq+1 is 1, 2, ..., Hq+1×Vq+1), for any value of iq+2 (where the value of iq+2 is 1, 2, ..., Hq+2×Vq+2), ... and for any value of iQ (where the value of iQ is 1, 2, ..., HQ×VQ). A ratio of the number of ON LEDs in the rectangular LED block indicated by S (t, i1, i2, ..., iq) to the total number of all LEDs in the same rectangular LED block is 0 at all the times t. Let symbol F0 (q) denote the value of this ratio.

For a value of q (where the value of q is 1, ..., Q-1), and for any value of i1 (where the value of i1 is 1, 2, ..., H1×V1), for any value of i2 (where the value of i2 is 1, 2, ..., H2×V2), ... and for any value of iq (where the value of iq is 1, 2, ..., Hq×Vq) and at any time t (where t=1, 2, ..., T), at least one of the values of R(t, i1, i2, ..., iq, iq+1) is 1 in accordance with condition 11 provided that R(t, i1, i2, ..., iq) is 1. Thus, at least one of the values of R(t, i1, i2, ..., iq, iq+1, iq+2) is 1 in accordance with condition 11 provided that at least one of the values of R(t, i1, i2, ..., iq, iq+1) is also 1 as well.

The reasoning described above is repeated as follows. If R(t, i1, i2, ..., iq) is 1, R(t, i1, i2, ..., iQ) is 1 for a value of q (where the value of q is 1, ..., Q-1), and for at least a value of iq+1 (where the value of iq+1 is 1, 2, ..., Hq+1×Vq+1), for at least a value of iq+2 (where the value of iq+2 is 1, 2, ..., Hq+2×Vq+2), ... and for at least a value of iQ (where the value of iQ is 1, 2, ..., HQ×VQ). This means that, at a time t, 1×1 LED indicated by S (t, i1, i2, ..., iQ) is ON. In other words, if R(t, i1, i2, ..., iq) is 1 the ratio of the number of ON LEDs in the rectangular LED block indicated by S (t, i1, i2, ..., iq) to the total number of all LEDs in the same rectangular LED block at the time t is not always fixed. However, the ratio is certainly at least greater than 0. Let symbol F1 (q) denote the value of the ratio.

Thus, even if a mapping method satisfying such a condition is determined, a relation of F1 (q)>F0(q) holds true. In addition, since F0(q)=0, the receiving apparatus 200 is capable of forming a judgment on R(t, i1, i2, ..., iq) in dependence on whether the ratio of the number of ON LEDs in the rectangular LED block indicated by S (t, i1, i2, ..., iq) to the total number of all LEDs in the same rectangular LED block at the time t is equal to 0 or greater than 0.

In this case, the processing carried out by the encoder 101 employed in the transmitting apparatus 100 is about the same as the processing described earlier by referring to the flowcharts shown in FIGS. 17 and 18 to 20. In this case, however, the encoder 101 carries out processes corresponding to but different from the processes carried out at the steps S23 and S28.

In this case, in the process corresponding to the step S23, L1 bits are fetched from the head of the first information and a combination pattern corresponding to the L1 bits is found by referencing a first-case mapping table. Then, the combination pattern is used as a value of {R(t, 1), R(t, 2), ..., R(t, H1×V1)}. That is to say, values of {R(t, 1), R(t, 2), . . . , R(t, H1×V1)} are set. Subsequently, the L1 bits fetched from the head of the first information are discarded and the bits following the L1 bits are shifted to the head of the first information.

In the process corresponding to the step S28, the value of R(t, i1, i2, . . . , iq−1) specified by the present values of t, i1, i2, . . . , and iq−1 is also examined.

To put it in detail, if R(t, i1, i2, . . . , iq−1) is 1, Lq bits are fetched from the head of the qth information and a combination pattern corresponding to the Lq bits is found by referencing the qth-case mapping table. Then, the combination pattern is used as the value of {R(t, i1, i2, . . . , iq−1, 1), R(t, i1, i2, . . . , iq−1, 2), . . . , R(t, i1, i2, . . . , iq−1, Hq×Vq)}. That is to say, values of R(t, i1, i2, . . . , iq−1, 1), R(t, i1, i2, . . . , iq−1, 2), . . . , R(t, i1, i2, . . . , iq−1, Hq×Vq) are set. Subsequently, the Lq bits fetched from the head of the qth information are discarded and the bits following the Lq bits are shifted to the head of the qth information.

In the case of R(t, i1, i2, . . . , iq−1)=0, on the other hand, the values of R(t, i1, i2, . . . , iq−1, 1), R(t, i1, i2, . . . , iq−1, 2), . . . , and R(t, i1, i2, . . . , iq−1, Hq×Vq) are all set at 0. The bits at the head of the qth information are not discarded.

In addition, in this case, the processing carried out by the decoder 203 employed in the receiving apparatus 200 is about the same as the processing described earlier by referring to the flowcharts shown in FIGS. 21, 22 and 23 to 25. In this case, however, the decoder 203 carries out processes corresponding to but different from the processes carried out at the steps S51, S63 and S68.

In this case, in the process corresponding to the step S51, the ratio of the number of ON LEDs in the rectangular LED block indicated by S (t, i1, i2, . . . , iq) to the total number of all LEDs in the same rectangular LED block at the time t is examined to form a judgment as to whether or not the ratio is equal of 0. If the ratio of the number of ON LEDs in a rectangular LED block indicated by S (t, i1, i2, . . . , iq) at a time t to the total number of all LEDs in the same rectangular LED block is not equal of 0, the flow of the processing goes on to a step S52. If the ratio of the number of ON LEDs in a rectangular LED block indicated by S (t, i1, i2, . . . , iq) at a time t to the total number of all LEDs in the same rectangular LED block is equal of 0, on the other hand, the flow of the processing goes on to a step S53.

In addition, in the process corresponding to the step S63, data of the corresponding L1 bits of the first information is determined by referencing the first-case mapping table from {R(t, 1), R(t, 2), . . . , R(t, H1×V1)} and added to a tail end of a memory employed in the receiving apparatus 200 but shown in none of the figures. The memory is used as storage means for storing the first information by adding such data to its tail from time to time.

Furthermore, in the process corresponding to the step S68, the value of R(t, i1, i2, . . . , iq−1) specified by the present values of t, i1, i2, . . . , iq−1 is examined.

To put it in detail, if R(t, i1, i2, . . . , iq−1) is 1, data of corresponding Lq bits of the qth information is determined from the combination pattern of {R(t, i1, i2, . . . , iq−1, 1), R(t, i1, i2, . . . , iq−1, 2), . . . , R(t, i1, i2, . . . , iq−1, Hq×vq)} by referencing the qth-case mapping table, and added to a tail end of a memory employed in the receiving apparatus 200 but shown in none of the figures. The memory is used as storage means for storing the qth information by adding such data to its tail from time to time.

In the case of R(t, i1, i2, . . . , iq−1)=0, on the other hand, the combination pattern of {R(t, i1, i2, . . . , iq−1, 1), R(t, i1, i2, . . . , iq−1, 2), . . . , R(t, i1, i2, . . . , iq−1, Hq×vq)} is 0 at all the times and, since the information of the qth bit is not included, none is added to a tail end of the memory for storing the qth information as described above.

In this way, by adopting a mapping method satisfying conditions 11, 12 and 11' described above, the receiving apparatus 200 is capable of receiving information at hierarchical layers ranging from the first layer to the qmaxth one. The received information is among information transmitted by the transmitting apparatus 100 at hierarchical layers ranging from the first layer to the Qth one.

The following description explains details of a typical implementation of the two-dimensional light-emitting unit 103 comprising 16×16 devices or 16×16 LEDs. As described above, the following quantities have values as follows: H=V=16, Q=4, H1=V1=H2=V2=H3=V3=H4=V4=2. In this case, for L1=L2=L3=L4=3, an example of the mapping method satisfying conditions 11, 12 and 11' is given below. To be more specific, examples of the first-case mapping table, the second-case mapping table, the third-case mapping-table and the fourth-case mapping table are given as follows.

Example of the qth-Case Mapping Table Where q=2, 3 and 4

In the case of R(t, i1, i2, . . . , iq−1)=1, for 3-bit input data, a combination pattern of {R(t, i1, i2, . . . , iq−1, 1), R(t, i1, i2, . . . , iq−1, 2), R(t, i1, i2, . . . , iq−1, 3), R(t, i1, i2, . . . , iq−1, 4)} is determined. For example, in the case of 3-bit input data having a value of 0, the combination pattern is {0, 1, 1, 1}. In the case of 3-bit input data having a value of 1, 2, 3, 4, 5, 6 or 7, on the other hand, the combination pattern is {1, 0, 1, 1}, {1, 1, 0, 1}, {1, 1, 1, 0}, {0, 0, 1, 1}, {1, 1, 0, 0}, {0, 1, 0, 1} or {1, 0, 1, 0} respectively. This relation is referred to hereafter as the qth-case mapping table.

Example of the First-Case Mapping Table

For 3-bit input data, a combination pattern of {R (t, 1), R(t, 2), R(t, 3), R(t, 4)} is determined. For example, in the case of 3-bit input data having a value of 0, the combination pattern is {0, 1, 1, 1}. In the case of 3-bit input data having a value of 1, 2, 3, 4, 5, 6 or 7, on the other hand, the combination pattern is {1, 0, 1, 1}, {1, 1, 0, 1}, {1, 1, 1, 0}, {0, 0, 1, 1}, {1, 1, 0, 0}, {0, 1, 0, 1} or {1, 0, 1, 0} respectively. This relation is referred to hereafter as the first-case mapping table.

In this case, the following relations hold true: F1 (4)>0, F0(4)=0, F1(3)>0, F0(3)=0, F1(2)>0, F0(2)=0, F1(1)>0, F0(1)=0.

The description given above has explained embodiments according to the present invention for implementing mapping methods satisfying conditions 1, 2, 3, 4 and 1' described above and a mapping method satisfying conditions 11, 12 and 11' described above. However, essentials of the present invention are not limited to these mapping methods. Any mapping method can be adopted as long as the mapping method results in a difference between the ratio of the number of ON LEDs in a rectangular LED block indicated by S (t, i1, i2, . . . , iq) at a time t to the total number of all LEDs in the same rectangular LED block for R(t, i1, i2, . . . , iq)=1 and the ratio of the number of ON LEDs in the same rectangular LED block at a time t to the total number of all LEDs in the same rectangular LED block for R(t, i1, i2, . . . , iq)=0. There are mapping methods other than the mapping methods described above. Due to space limitations, however, explanation of the other mapping methods is omitted. By adoption of any of the mapping methods described above, the receiving apparatus 200 is capable of receiving information at hierarchical layers ranging from the first layer to the qmaxth one. The received information is among information transmitted by the transmitting apparatus 100 at hierarchical layers ranging from the first layer to the qth one. The value of qmax is determined by the resolution of the camera 201 employed in the receiving apparatus 200.

In a digital communication, in general, data to be transmitted is encoded by the transmitting apparatus 100 so that the data can be received by the receiving apparatus 200 in a stable manner. To put it in detail, the time-series two-dimensional blinking pattern R(t, i1, i2, . . . , iQ) generated by the encoder 101 is further put in a blinking state by using Manchester codes. In accordance with the Manchester codes, a time unit is further divided into two half units (0.5 unit). If the time-series two-dimensional blinking pattern R(t, i1, i2, . . . , iQ) generated by the encoder 101 has a value of 1 for a time t, a value of 1 representing an ON state is generated during the first half unit of the time t and a value of 0 representing an OFF state is generated during the second half unit of the time t. If the time-series two-dimensional blinking pattern R(t, i1, i2, . . . , iQ) generated by the encoder 101 has a value of 0 for a time t, on the other hand, a value of 0 representing an OFF state is generated during the first half unit of the time t and a value of 1 representing an ON state is generated during the second half unit of the time t.

By using the Manchester codes as described above, the luminance of each LED always changes while the two-dimensional light-emitting unit 103 is transmitting valid data. Thus, by examining changes in luminance along the time series, the receiving apparatus 200 is capable of receiving and, hence, recognizing a blinking pattern. It is needless to say that the camera 201 employed in the receiving apparatus 200 is required to have a capability of carrying out a high-speed operation to take a picture repeatedly at time intervals equal to the aforementioned half unit. To put it concretely, it is necessary to take a picture at each of the times t (=0.5, 1, 1.5, 2, 2.5, 3, 35, . . . , T).

By adoption of the configuration described above, the transmitting apparatus 100 transmits information on a restaurant or information on an amusement park as first information. Subsequently, the transmitting apparatus 100 transmits information on business hours as second information. Then, the transmitting apparatus 100 transmits information on fees as third information. Finally, the transmitting apparatus 100 transmits information on discounts for members as fourth information.

Let a person be walking along a street, on which the transmitting apparatus 100 is installed, and carry the transmitting apparatus 100. In this case, the receiving apparatus 200 is capable of receiving first information while the user is still at a location far away from the transmitting apparatus 100. If the user is interested in the information, the user approaches the transmitting apparatus 100 to make the receiving apparatus 200 capable of receiving second information. If the user wants to know more detailed information, the user further approaches the transmitting apparatus 100 to make the receiving apparatus 200 capable of receiving third information and fourth information. Of course, if the user is not interested in the first information received while the user is still at a location far away from the transmitting apparatus 100, the user does not need to move from the present location to approach the transmitting apparatus 100.

As described above, a person receiving information is capable of receiving at least rough information as first information even if the person is at a location far away from the transmitting apparatus 100. Thus, the person is capable of forming a judgment as to whether to approach the transmitting apparatus 100 in order to obtain more detailed information or not to approach the transmitting apparatus 100 because the person regards the received information as information not necessary for the person.

In addition, the present invention can be applied to transmission and reception of computer-graphic data. As the first information, the transmitting apparatus 100 transmits contour information of a three-dimensional virtual body. Examples of the contour information are polygon information and wire-frame information. In addition, as the second information, the transmitting apparatus 100 transmits low-frequency components of a pattern or a texture pasted on each polygon. A low-frequency component is a component obtained as a result of a Fourier transformation process carried out on a texture. Furthermore, as the third information, the transmitting apparatus 100 transmits intermediate-frequency components of a pattern or a texture pasted on each polygon. An intermediate-frequency component is also a component obtained as a result of a Fourier transformation process carried out on a texture. Finally, as the fourth information, the transmitting apparatus 100 transmits high-frequency components of a pattern or a texture pasted on each polygon. A high-frequency component is also a component obtained as a result of a Fourier transformation process carried out on a texture.

Normally, an ordinary person will probably orient the camera 201 employed in the receiving apparatus 200 to the right front surface of a transmitting apparatus 100, which serves as a source transmitting information of interest to the person. With the camera 201 oriented as such, a source transmitting information of no interest to the person will probably appear as a picture on an edge of the screen of the camera 201 even if the picture of such a source is taken by the camera 201. With the camera 201 oriented to the right front surface of a source transmitting information of interest to the person, the person sees the right front surface of the two-dimensional light-emitting unit 103, and the receiving apparatus 200 is capable of receiving all the first information, the second information, the third information and the fourth information. That is to say, the receiving apparatus 200 is capable of receiving all data of a computer graphic so that, on the basis of information on contours of a three-dimensional virtual body and information on fine textures of the three-dimensional virtual body, the three-dimensional virtual body can be displayed on a monitor employed in the receiving apparatus 200. The monitor itself is shown in none of the figures though.

The picture appearing on an edge of the screen of the camera 201, that is, a picture of the source transmitting information of no interest to the person, is like a picture taken from a position in a slanting direction with respect to the source. Thus, a projected image of this picture is small in comparison with a picture of an object of shooting right in front of the camera 201. In the case of a picture appearing on an edge of the screen of the camera 201, only first information, second information and third information can be received by the receiving apparatus 200. In this case, a restoration process carried out by the receiving apparatus 200 results in only the original three-dimensional virtual body seen on the monitor of the receiving apparatus 200 as a picture with no texture high-frequency components or a picture with textures thereof blurring to a certain degree. If a picture of an information-transmitting source is taken from a position in a more slanting direction, only first information and second information can be received. In this case, a restoration process carried out by the receiving apparatus 200 results in only the original three-dimensional virtual body seen on the monitor of the receiving apparatus 200 as a picture with neither texture high-frequency components nor texture intermediate-frequency components or a picture with textures thereof blurring to a high degree. If a picture of an information-transmitting source is taken from a position in a much more slanting direction, only first information can be received. In this case, a restoration process carried out by the receiving apparatus 200 results in only a wire frame (or contours) of the original three-dimensional virtual body seen on the monitor of the receiving apparatus 200. The above description tells the reader that, in the case of information of interest to the person carrying the receiving apparatus 200, more detailed information can be received making it possible to display details of the original three-dimensional virtual body but information of no interest is displayed just roughly. That is to say, an object of shooting is displayed with a degree of minuteness determined by the depth of the interest in the object as an image appearing on the monitor exactly as intended by the person carrying the receiving apparatus 200.

A transmission from the two-dimensional light-emitting unit 103 comprising 16×16 LEDs has been described in detail. It is to be noted, however, that essentials of the present invention are not limited to such a configuration of the two-dimensional light-emitting unit 103. For example, the present invention can also be applied to a two-dimensional light-emitting unit 103 comprising only 9×9 LEDs. In addition, 3×3 LEDs can be used as a set and a two-dimensional light-emitting unit 103 can be constructed to include 3×3 sets each composed of 3×3 LEDs. In this case, it is possible to transmit two different kinds of information, that is, first information and second information. That is to say, the first information is transmitted as a blanking pattern comprising 3×3 blinking units each composed of 3×3 LEDs, where a blinking unit is a rectangular LED block described above. On the other hand, the second information is transmitted as a blanking pattern comprising (3×3)×(3×3)blinking units each composed of 1×1 LED. In this case, the following quantity values are used: H=V=9, Q=2 and H1=H2=V1=V2=3.

In addition, as an extreme case, H=1 is also conceivable. To put it concretely, 1×32 LEDs may be also available. In this case, the light-emitting unit had rather be appropriately referred to as a one-dimensional light-emitting unit than a two-dimensional light-emitting unit.

So far, an embodiment of the present invention has been explained by using the 16×16-LED configuration of the two-dimensional light-emitting unit 103 as an example. The following description explains another embodiment for transmitting two different kinds of information, that is, first information and second information, by using a two-dimensional light-emitting unit 103 comprising 2×2 LEDs.

The first information is transmitted as a blinking pattern comprising a blinking unit composed of 2×2 LEDs, that is, as a blinking unit composed of all LEDs included in the two-dimensional light-emitting unit 103. On the other hand, the second information is transmitted as a blinking pattern comprising 4 blinking units each composed of 1×1 LED. That is to say, the following quantity values are used: Q=2, H1=V1=1 and H2=V2=2. For a value of q other than 1, the mapping method satisfies conditions 11 and 12. For a value of q equal to 1, on the other hand, condition 11' is replaced with condition 11".

Condition 11" (for q=1)

A combination pattern of $\{R(t, 1), R(t, 2), \ldots, R(t, H1 \times V1)\}$ for input data consisting of Lq bits (that is, L1 bits) is determined. If the input data consisting of L1 bits changes, the combination pattern of $\{R(t, 1), R(t, 2), \ldots, R(t, H1 \times V1)\}$ for the input data consisting of L1 bits also changes as well. L1 is a constant of at least 1. The input data consisting of L1 bits is L1-bit data included in the first information. A relation for determining a combination pattern of $\{R(t, 1), R(t, 2), \ldots, R(t, H1 \times V1)\}$ for the input data consisting of L1 bits is referred to as a first-case mapping table.

It is to be noted that, in the example shown above, the following quantity values are used: L1=1 and L2=3. In addition, the first-case mapping prescribed in condition 11" described above is a table setting $\{R(t, 1)\}$ at 1 for 1-bit input data of 1 or at 0 for 1-bit input data of 0. The second-case mapping prescribed in condition 11 described above is a table setting $\{R(t, 1, 1), R(t, 1, 2), R(t, 1, 3), R(t, 1, 4)\}$ at $\{0, 0, 1, 1\}$, $\{0, 1, 1, 0\}$, $\{1, 1, 0, 0\}$, $\{1, 0, 0, 1\}$, $\{1, 1, 1, 0\}$, $\{1, 1, 0, 1\}$, $\{1, 0, 1, 1\}$ or $\{0, 1, 1, 1\}$ for 3-bit input data of 0, 1, 2, 3, 4, 5, 6 or 7 respectively.

Figure 26:
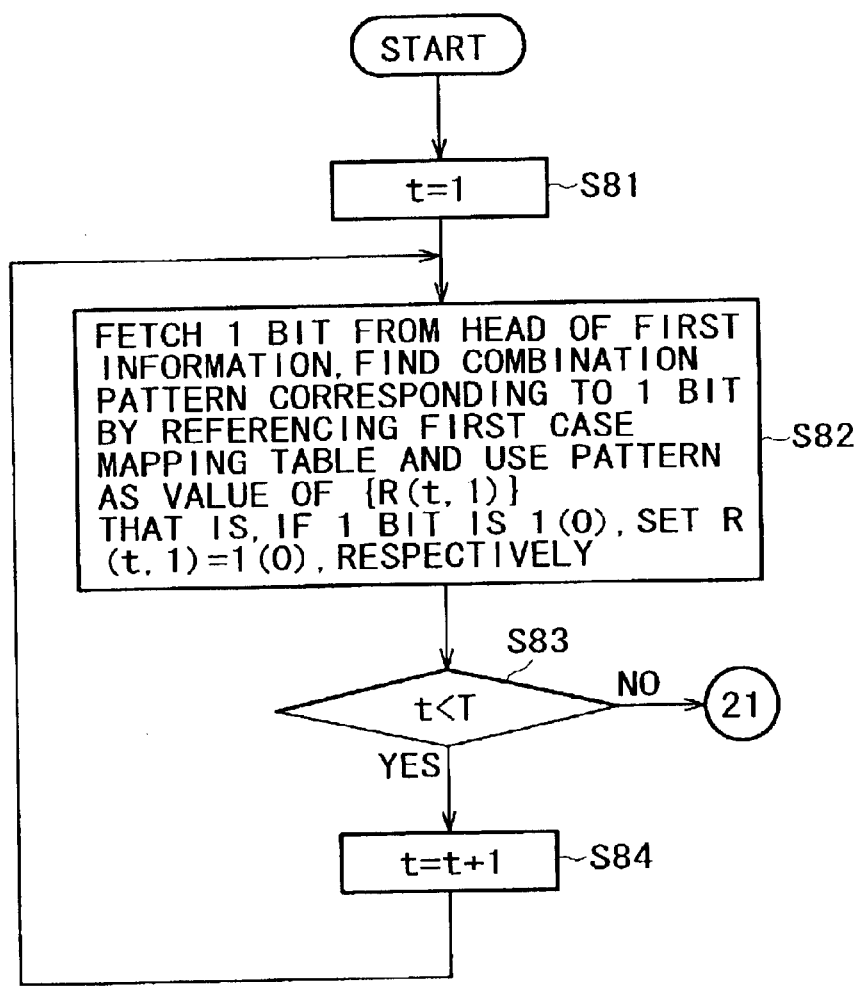
FIG. 26 shows a flowchart representing the procedure of a process carried out by the decoder employed in the receiving apparatus.
Figure 27:
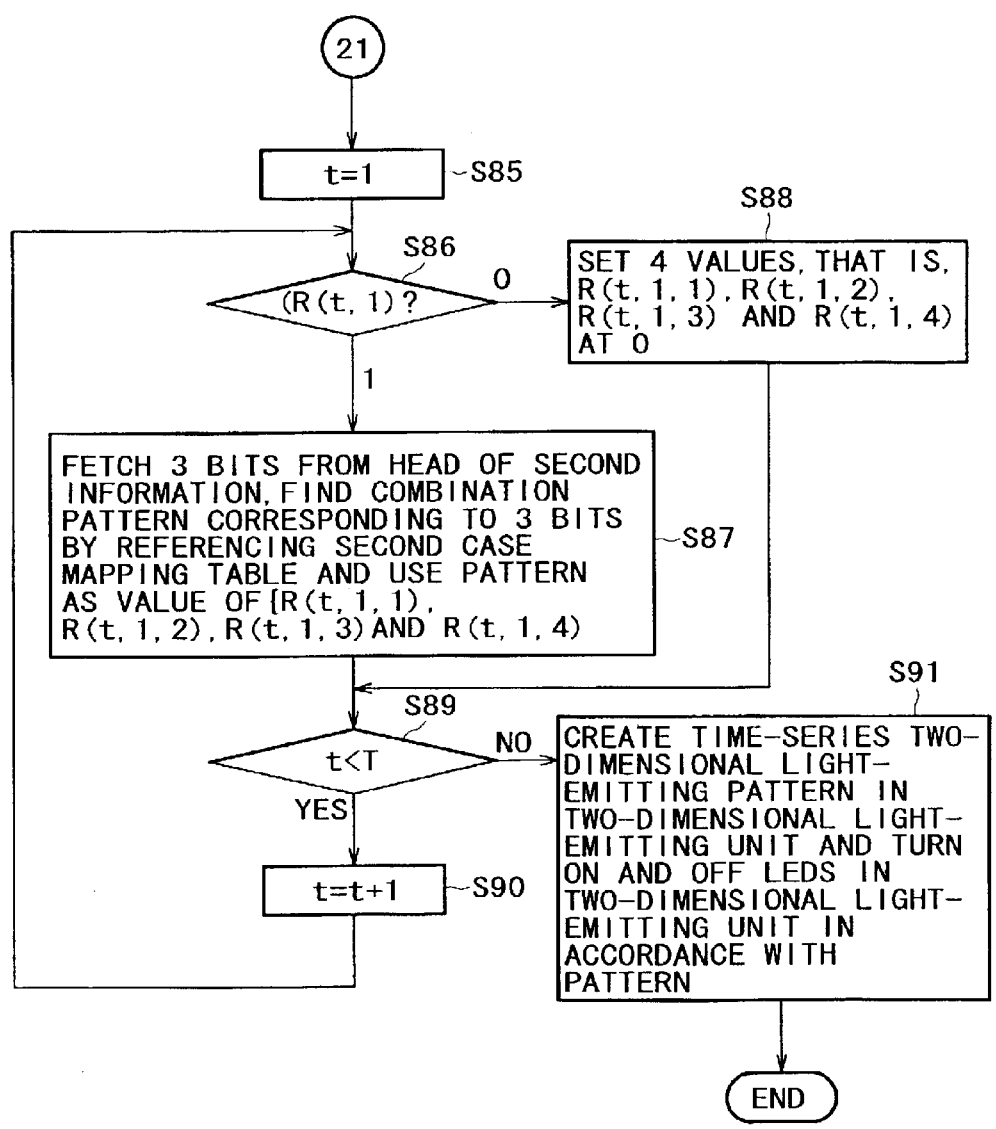
FIG. 27 shows a continuation flowchart representing the procedure of the process carried out by the decoder of the receiving apparatus.

FIGS. 26 and 27 show flowcharts representing the procedure of processing carried out by the decoder 203 employed in the receiving apparatus 200.

The flowchart shown in FIG. 26 begins with a step S81 at which the variable t representing a time is set at 1. Then, at the next step S82, 1 bit is fetched from head of the first information and a combination pattern corresponding to the fetched 1 bit is found by referencing the first-case mapping table and used as the value of R{(t, 1)}. That is, if 1 bit is 1 or 0, R(t, 1) is set at 1 or 0 respectively. It is to be noted that that the fetched 1 bit is discarded from the head of the first information and bits following the 1 bit are shifted to the head of the first information.

Subsequently, the flow of the processing goes on to the next step S83 to form a judgment as to whether or not the time t is earlier than the time T. If the time t is earlier than the time T, the flow of the processing goes on to a step S84. If the time t is not earlier than the time T, on the other hand, the flow of the processing goes on to a step S85. This is because, for all values of t (that is, for t=1, 2, . . . , T), R(t, 1) has been set.

At the step S84, the value of t is incremented by 1 to prepare for a process for the next time. Then, the flow of the processing goes back to the next step S82.

At the step S85, the variable t representing a time is again set at 1. Then, the flow of the processing goes on to the next step S86.

At the step S86, the value of R(t, 1) found at the step S82 is examined to form a judgment as to whether the value of R(t, 1) is 1 or 0. If the value of R(t, 1) is 1, the flow of the processing goes on to a step S87. If the value of R(t, 1) is 0, on the other hand, the flow of the processing goes on to a step S88.

At the step S87, 3-bit data is extracted from the second information and $\{R(t, 1, 1), R(t, 1, 2), R(t, 1, 3), R(t, 1, 4)\}$ is set at $\{0, 0, 1, 1\}$, $\{0, 1, 1, 0\}$, $\{1, 1, 0, 0\}$, $\{1, 0, 0, 1\}$, $\{1, 1, 1, 0\}$, $\{1, 1, 0, 1\}$, $\{1, 0, 1, 1\}$ or $\{0, 1, 1, 1\}$ for 3-bit data of 0, 1, 2, 3, 4, 5, 6 or 7 respectively. Then, the flow of the processing goes on to a step S89.

At the step S88, $\{R(t, 1, 1), R(t, 1, 2), R(t, 1, 3), R(t, 1, 4)\}$ is set at $\{0, 0, 0, 0\}$. That is to say, all values of R(t, 1, i) where (i=1 to 4) are set at 0. Then, the flow of the processing goes on to the next step S89.

At the step S89, the value of t is compared with the time T to form a judgment as to whether or not the time t is earlier than the time T. If the time t is earlier than the time T, the flow of the processing goes on to a step S90. If the time t is not earlier than the time T, on the other hand, the flow of the processing goes on to a step S91. This is because R(t, 1, 1), R(t, 1, 2), R(t, 1, 3) and R(t, 1, 4) have been set for all values of t (that is, for t=1, 2, ..., T)

At the step S90, the value of t is incremented by 1 to prepare for a process for the next time. Then, the flow of the processing goes back to the next step S86.

At the step S91, for R(t, 1, 1) having a value of 1, an LED at a position with coordinates of (1, 1) is turned on at a time t where t=1, 2, ..., T. In the case of R(t, 1, 1) having a value of 0, on the other hand, an LED at a position with coordinates of (1, 1) is turned off at a time t where t=1, 2, ..., T. By the same token, an LED at a position with coordinates of (1, 2) is turned on or off at a time t where t=1, 2, ..., T in dependence on whether R(t, 1, 2) has a value of 1 or 0. In the same way, an LED at a position with coordinates of (2, 1) is turned on or off at a time t where t=1, 2, ..., T in dependence on whether R(t, 1, 3) has a value of 1 or 0. Likewise, an LED at a position with coordinates of (2, 2) is turned on or off at a time t where t=1, 2, ..., T in dependence on whether R(t, 1, 4) has a value of 1 or 0.

After a two-dimensional blinking pattern is output in this way, the execution of the whole processing routine is ended.

By following the processing procedure described above, the two-dimensional light-emitting unit 103 comprising 2×2 LEDs emits a time-series two-dimensional light-emitting pattern. The light-emitting pattern generated in this way includes at least 2 or 3 turned-on LEDs in a blinking unit, which is considered as a set consisting of 2×2 LEDs or all LEDs composing the two-dimensional light-emitting unit 103, for R(t, 1) having a value of 1 as determined on the basis of the first information. That is to say, in terms of a rate, the blinking unit is put in an on state at a rate of at least 0.5 where the rate is defined as a ratio of the number of ON LEDs in the blinking unit to the number of all LEDs in the blinking unit. In the case of R(t, 1) having a value of 0 as determined on the basis of the first information, on the other hand, the light-emitting pattern includes 0 turned-on LEDs in a blinking unit, which is considered as a set consisting of 2×2 LEDs or all LEDs composing the two-dimensional light-emitting unit 103 as described above. That is to say, in terms of a rate, the blinking unit is put in an on state at a rate of 0. On the basis of these relations, the receiving apparatus 200 is capable of determining the value of R(t, 1) by examining the average brightness of the 2×2 LEDs or all LEDs composing the two-dimensional light-emitting unit 103 at a time t and using the average brightness as a criterion for determining the value of R(t, 1). To put it concretely, the value of R(t, 1) is determined to be 1 for an average brightness value of at least 0.5 or determined to be 0 for an average brightness value of 0. Then, the first information is recovered in a restoration process by setting 1 bit of first information at 1 if the value of R(t, 1) corresponding to the bit is 1 or setting 1 bit of first information at 0 if the value of R (t, 1) corresponding to the bit is 0.

In the case of second information, from a light-emitting pattern of the 4 LEDs at a time t is restored to 3 bits of the second information.

Figure 28:
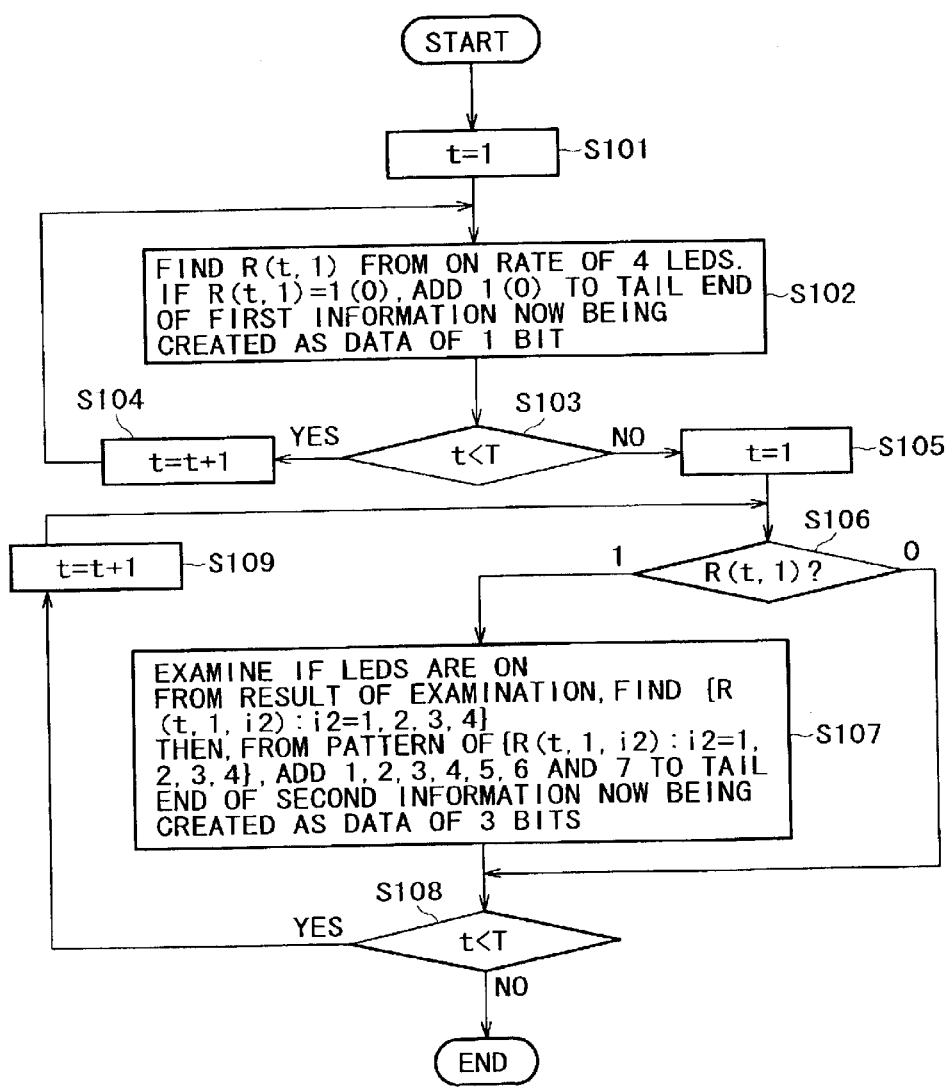
FIG. 28 shows another flowchart representing the procedure of the process carried out by the decoder of the receiving apparatus.

FIG. 28 shows a flowchart representing the procedure of a decoding process carried out by the decoder 203 employed in the receiving apparatus 200. The decoder 203 carries out the decoding process based on the facts described above.

As shown in the figure, the flowchart begins with a step S101 at which the variable t representing a time is set at 1. Then, at the next step S102, an average brightness value of the 4 LEDs composing the two-dimensional light-emitting unit 103 is found and used for determining an ON ratio, which is used for finding the value of R(t, 1). To put it in detail, if the ON ratio of the LEDs is at least 0.5, the value of R(t, 1) is inferred to be 1. If the ON ratio of the LEDs is equal to 0, on the other hand, the value of R(t, 1) is inferred to be 0. In the case of R(t, 1)=1, a bit with a value of 1 is added to the tail end of a memory for storing first information by adding such a bit to the tail from time to time. In the case of R(t, 1)=0, on the other hand, a bit with a value of 0 is added to the tail end of the memory. In actuality, instead of finding the value of the average brightness to be used for determining an ON ratio of the 4 LEDs, the number of ON LEDs is counted to calculate an ON ratio.

Then, the flow of the processing goes on to the next step S103 to form a judgment as to whether or not the time t is earlier than the time T. If the time t is earlier than the time T, the flow of the processing goes on to a step S104. If the time t is not earlier than the time T, on the other hand, the flow of the processing goes on to a step S105. This is because R(t, 1) has been set for all values of t (that is, for t=1, 2, ... and T)

At the step S104, the value of t is incremented by 1 to prepare for a process for the next time. Then, the flow of the processing goes back to the next step S102.

At the step S105, the variable t representing a time is again set at 1. Then, the flow of the processing goes on to the next step S106 to form a judgment as to whether the value of R(t, 1) found at the step S102 is 1 or 0. If the value of R(t, 1) found at the step S102 is 1, the flow of the processing goes on to a step S107. If the value of R(t, 1) found at the step S102 is 0, on the other hand, the flow of the processing goes on to a step S108.

At the step S107, each of the 4 LEDs is checked to form a judgment as to whether the LED is ON or OFF. The result of the judgment is used in a process to restore the received two-dimensional blinking pattern to the 3 bits of the second information. To put it concretely, the two-dimensional blinking pattern is restored to the 3 bits of the second information in accordance with the following procedure.

If {the LED at a position with coordinates of (1, 1), the LED at a position with coordinates of (1, 2), the LED at a position with coordinates of (2, 1) and the LED at a position with coordinates of (2, 2)} is {OFF, OFF, ON, ON}, {R(t, 1, 1), R(t, 1, 2), R(t, 1, 3), R(t, 1, 4)} is set at {0, 0, 1, 1}. In this case, 3-bits having a value of 0 are added to the tail end of a memory for storing the second information by adding such bits to the tail from time to time. The memory is shown in none of the figures.

If {the LED at a position with coordinates of (1, 1), the LED at a position with coordinates of (1, 2), the LED at a position with coordinates of (2, 1) and the LED at a position with coordinates of (2, 2)} is {OFF, ON, ON, OFF}, {R(t, 1, 1), R(t, 1, 2), R(t, 1, 3), R(t, 1, 4)} is set at {0, 1, 1, 0}. In this case, 3 bits having a value of 1 are added to the tail end of the memory for storing the second information by adding such bits to the tail from time to time.

If {the LED at a position with coordinates of (1, 1), the LED at a position with coordinates of (1, 2), the LED at a position with coordinates of (2, 1) and the LED at a position with coordinates of (2, 2)} is {ON, ON, OFF, OFF}, {R(t, 1, 1), R(t, 1, 2), R(t, 1, 3), R(t, 1, 4)} is set at {1, 1, 0, 0}. In this case, 3 bits having a value of 2 are added to the tail end of the memory for storing the second information by adding such bits to the tail from time to time.

If {the LED at a position with coordinates of (1, 1), the LED at a position with coordinates of (1, 2), the LED at a position with coordinates of (2, 1) and the LED at a position with coordinates of (2, 2)} is {ON, OFF, OFF, ON}, {R(t, 1, 1), R(t, 1, 2), R(t, 1, 3), R(t, 1, 4)} is set at {1, 0, 0, 1}. In this case, 3 bits having a value of 3 are added to the tail end of the memory for storing the second information by adding such bits to the tail from time to time.

If {the LED at a position with coordinates of (1, 1), the LED at a position with coordinates of (1, 2), the LED at a position with coordinates of (2, 1) and the LED at a position with coordinates of (2, 2)) is {ON, ON, ON, OFF}, {R(t, 1, 1), R(t, 1, 2), R(t, 1, 3), R(t, 1, 4)} is set at {1, 1, 1, 0}. In this case, 3 bits having a value of 4 are added to the tail end of the memory for storing the second information by adding such bits to the tail from time to time.

If {the LED at a position with coordinates of (1, 1), the LED at a position with coordinates of (1, 2), the LED at a position with coordinates of (2, 1) and the LED at a position with coordinates of (2, 2)} is {ON, ON, OFF, ON}, {R(t, 1, 1), R(t, 1, 2), R(t, 1, 3), R(t, 1, 4)} is set at {1, 1, 0, 1}. In this case, 3 bits having a value of 5 are added to the tail end of the memory for storing the second information by adding such bits to the tail from time to time.

If {the LED at a position with coordinates of (1, 1), the LED at a position with coordinates of (1, 2), the LED at a position with coordinates of (2, 1) and the LED at a position with coordinates of (2, 2)} is {ON, OFF, ON, ON}, {R(t, 1, 1), R(t, 1, 2), R(t, 1, 3), R(t, 1, 4)} is set at {1, 0, 1, 1}. In this case, 3 bits having a value of 6 are added to the tail end of the memory for storing the second information by adding such bits to the tail from time to time.

If {the LED at a position with coordinates of (1, 1), the LED at a position with coordinates of (1, 2), the LED at a position with coordinates of (2, 1) and the LED at a position with coordinates of (2, 2)} is {OFF, ON, ON, ON}, {R(t, 1, 1), R(t, 1, 2), R(t, 1, 3), R(t, 1, 4)} is set at {0, 1, 1, 1}. In this case, 3 bits having a value of 7 are added to the tail end of the memory for storing the second information by adding such bits to the tail from time to time.

At the step S108, the value of t is compared with the time T to form a judgment as to whether or not the time t is earlier than the time T. If the time t is earlier than the time T, the flow of the processing goes on to a step S109. If the time t is not earlier than the time T, on the other hand, the execution of the whole processing routine is ended. This is because R(t, 1, 1) R(t, 1, 2), R(t, 1, 3) and R(t, 1, 4)have been set for all values of t (that is, for t=1, 2, . . . , T).

At the step S109, the value of t is incremented by 1 to prepare for a process for the next time. Then, the flow of the processing goes back to the next step S106.

Of course, it is possible to determine the degree of average brightness for the 4 LEDs, that is the number of ON LEDs among the 4 LEDs. If it is not possible to determine the status of each LED, however, only the first information can be obtained as a result of restoration. In this case, the processing carried out at the step S107 does not have any meaning and the second information cannot be obtained as a result of restoration.

By having the encoder 101 carry out the processing represented by the flowcharts shown in FIGS. 26 and 27 and having the decoder 203 carry out the processing represented by the flowchart shown in FIG. 28 as described above, the first information and the second information are transmitted from the transmitting apparatus 100 to the receiving apparatus 200.

The following description explains an embodiment according to the present invention for implementing a process for encoding data to be transmitted optically and a process for decoding the transmitted data by satisfying conditions 1, 2, 3, 4 and 1' or conditions 11, 12 and 11', which have been described before. To be more specific, the following description explains typical applications, which vary from hierarchical layer to hierarchical layer and also vary along the time series.

In accordance with the optical transmission provided by the present invention, a person carrying the receiving apparatus 200 is capable of receiving first information even if a picture of the two-dimensional light-emitting unit 103 is taken from a location far away from the transmitting apparatus 100. If a picture of the two-dimensional light-emitting unit 103 is taken from a location far away from the transmitting apparatus 100, however, it is quite within the bounds of possibility that, as a whole, the quantity of light of the picture taken by the camera 201 is not sufficient. Thus, in some cases, the exposure time (required for taking a picture) must be lengthened. In accordance with the description given above, the camera 201 takes a picture at predetermined time intervals, that is, at times t where t =1, 2, . . . , T. If the exposure time in the course of shooting by using the camera 201 is taken into consideration, however, it is quite within the bounds of possibility that a sufficient quantity of light is not obtained unless a picture is taken at doubled time intervals, that is, at times t where t=2, 4, 6, 8 and so on. Of course, there will be no problem if the person carrying the receiving apparatus 200 moves to a location sufficiently close to the transmitting apparatus 100. Thus, for the qth information (where q is a very large number) that cannot be obtained unless the person carrying the receiving apparatus 200 moves to a location close to the transmitting apparatus 100 as described above, it is possible to consider the transmission of the qth information by assuming that the picture is taken by using the camera 201 at the predetermined time intervals, that is, at times t where t=1, 2, . . . , T.

The following description explains a typical application in which the exposure time is taken into consideration in optical transmission according to the present invention.

Let notation P (1) denote the time interval for the first information. That is to say, the receiving apparatus 200 is capable of restoring a picture taken at time intervals of P (1) to the original first information. By the same token, let notation P (q) denote the time interval for the qth information, that is, time interval for information of the qth hierarchical layer. In this case, for any value of q (where q=1, 2, . . . , Q), P(q) is an integer of at least 1. In addition, for any value of q (where q=1, 2, . . . , Q−1), P(q) is a multiple of P(q+1). Of course, P(q) may equal to P(q+1). P(Q) is 1.

The mapping method satisfying conditions 1, 2, 3, 4 and 1' is improved to a mapping method satisfying the following conditions.

Condition 21

Let t' be a multiple of P(q). In this case of R (t', i1, i2, . . . , iq−1)=1, a combination pattern of {R (t', i1, i2, . . . , iq−1, 1), R(t', i1, i2, . . . , iq−1, 2), . . . , R(t', i1, i2, . . . , iq−1, Hq×Vq)} for input data consisting of Nq bits is determined. The number of elements included in the combination pattern of {R(t', i1, i2, . . . , iq−1, 1), R(t', i1, i2, . . . , iq−1, 2), . . . , R (t', i1, i2, . . . , iq−1, Hq×Vq)} is Hq×Vq. For input data consisting of any Nq bits, the number of elements having a value of 1 and the number of elements having a value of 0 are each fixed. The ratio of the number of elements having a value of 1 to the number of elements having a value of 0 has a fixed value of Uq: (1−Uq). That is to say, the number of elements having a value of 1 is Uq×(Hq×Vq). On the other hand, the number of elements having a value of 0 is (1−Uq)×(Hq×Vq). In addition, if the value of the input data consisting of Nq bits changes, the combination pattern of {R(t', i1, i2, . . . , iq−1, 1), R(t', i1, i2, . . . , iq−1, 2), . . . , R(t', i1, i2, . . . , iq−1, Hq×vq)} also changes as well.

In this case, Nq is a constant. The input data consisting of Nq bits is data, which is included in qth information and has Nq bits. In particular, for Nq=0, the combination pattern of $\{R(t', i1, i2, \ldots, iq-1, 1), R(t', i1, i2, \ldots, iq-1, 2), \ldots, R(t', i1, i2, \ldots, iq-1, Hq \times Vq)\}$ is a specific pattern at all the times. In the case of R(t', i1, i2, ..., iq-1)=1, a relation used to determine a combination pattern of $\{R(t', i1, i2, \ldots, iq-1, 1), R(t', i1, i2, \ldots, iq-1, 2), \ldots, R(t', i1, i2, \ldots, iq-1, Hq \times vq)\}$ for the input data consisting of Nq bits is referred to hereafter as a qth positive-case mapping table taking the exposure time into consideration. Then, the set value of R(t', i1, i2, ..., iq-1, iq) is copied to the values of all R(t'-P(q)+1, i1, i2, ..., iq-1, iq), R (t'-P(q)+2, i1, i2, ..., iq-1, iq), ... and R(t'-1, i1, i2, ..., iq-1, iq). For P(q)=1, however, there is no copy destination. Thus, it is not necessary to carry out a copy operation.

Condition 22

Also let t' be a multiple of P(q). In the case of R(t', i1, i2, ..., iq-1)=0, a combination pattern of $\{R (t', i1, i2, \ldots, iq-1, 1), R(t', i1, i2, \ldots, iq-1, 2), \ldots, R(t', i1, i2, \ldots, iq-1, Hq \times Vq)\}$ for input data consisting of Mq bits is determined. The number of elements included in the combination pattern of $\{R(t', i1, i2, \ldots, iq-1, 1), R(t', i1, i2, \ldots, iq-1, 2), \ldots, R (t', i1, i2, \ldots, iq-1, Hq \times Vq)\}$ is Hq×Vq. For input data consisting of any Mq bits, the number of elements having a value of 1 and the number of elements having a value of 0 are each fixed. The ratio of the number of elements having a value of 1 to the number of elements having a value of 0 has a fixed value of Zq: (1−Zq). That is to say, the number of elements having a value of 1 is Zq×(Hq×Vq). On the other hand, the number of elements having a value of 0 is (1−Zq)×(Hq×Vq). In addition, if the value of the input data consisting of Mq bits changes, the combination pattern of $\{R(t', i1, i2, \ldots, iq-1, 1), R(t', i1, i2, \ldots, iq-1, 2), \ldots, R(t', i1, i2, \ldots, iq-1, Hq \times Vq)\}$ also changes as well.

In this case, Mq is a constant. The input data consisting of Mq bits is data, which is included in qth information and has Mq bits. In particular, for Mq=0, the combination pattern of $\{R(t', i1, i2, \ldots, iq-1, 1), R (t', i1, i2, \ldots, iq-1, 2), \ldots, R(t', i1, i2, \ldots, iq-1, Hq \times Vq)\}$ is a specific pattern at all the times. In the case of R(t', i1, i2, ..., iq-1)=0, a relation used to determine a combination pattern of $\{R(t', i1, i2, \ldots, iq-1, 1), R(t', i1, i2, \ldots, iq-1, 2), \ldots, R(t', i1, i2, \ldots, iq-1, Hq \times Vq)\}$ for the input data consisting of Mq bits is referred to hereafter as a qth negative-case mapping table taking the exposure time into consideration. Then, the set value of R(t', i1, i2, ..., iq-1, iq) is copied to the values of all R(t'-P(q)+1, i1, i2, ..., iq-1, iq), R (t'-P(q)+2, i1, i2, ..., iq-1, iq), ... and R(t+−1, i1, i2, ..., iq-1, iq). For P(q)=1, however, there is no copy destination. Thus, it is not necessary to carry out a copy operation.

Condition 23

For any value of q, the value of either Nq or Mq is at least 1.

Condition 24

For any value of q, the value of Uq is greater than the value of Zq, that is, the relation Uq>Zq holds true.

For q=1, however, there is no hierarchical layer higher than the first hierarchical layer. In this case, the mapping table satisfies condition 21, ignoring condition 22. That is to say, the mapping table satisfies condition 21' described as follows:

Condition 21' (for q=1)

Also let t' be a multiple of P(q), that is, a multiple of P(1). A combination pattern of $\{R(t', 1), R (t', 2), \ldots, R(t', H1 \times V1)\}$ for input data consisting of Nq bits (that is, N1 bits) is determined. The number of elements included in the combination pattern of $\{R(t', 1), R(t', 2), \ldots, R(t', H1 \times V1)\}$ is H1×V1. For input data consisting of any N1 bits, the number of elements having a value of 1 and the number of elements having a value of 0 are each fixed. The ratio of the number of elements having a value of 1 to the number of elements having a value of 0 has a fixed value of U1: (1−U1). That is to say, the number of elements having a value of 1 is U1×(H1×V1). On the other hand, the number of elements having a value of 0 is (1−U1)×(H1×V1). In addition, if the value of the input data consisting of N1 bits changes, the combination pattern of $\{R(t', 1), R (t', 2), \ldots, R(t', H1 \times V1)\}$ also changes as well.

In this case, N1 is a constant. The input data consisting of N1 bits is data, which is included in first information and has N1 bits. It is to be noted that N1 has a value of at least 1. A relation used to determine a combination pattern of $\{R(t', 1), R(t', 2), \ldots, R(t', H1 \times V1)\}$ for the input data consisting of N1 bits is referred to hereafter as a first positive-case mapping table taking the exposure time into consideration. Then, the set value of R(t', i1) is copied to the values of all R(t'-P(1)+1, i1), R(t'-P(1)+2, i1), ... and R(t+−1, i1). For P(1)=1, however, there is no copy destination. Thus, it is not necessary to carry out a copy operation.

In order to make the explanation easy to understand, condition 21' is given as a condition for keeping uniformity with other hierarchical layers. There is no special reason as to why this property must be satisfied.

There is a plurality of conceivable mapping methods that satisfy conditions 21, 22, 23, 24 and 21'. One of the methods is selected to be adopted as a method common to the encoder 101 and the decoder 203. By adoption of a mapping method that satisfies conditions 21, 22, 23, 24 and 21' described above, R(t, i1) R(t, i1, i2), ..., R (t, i1, i2, ..., iQ) are determined from pieces of information with resolutions ranging from the first resolution to the Qth resolution.

Now, consider a ratio of the number of ON LEDs in a rectangular LED block indicated by S (t, i1, i2, ..., iq) at a time t to the total number of all LEDs in the same rectangular LED block.

Assume that, for a value of q (where the value of q is 2, ..., Q), for any value of i1 (where the value of i1 is 1, 2, ..., H1×V1), for any value of i2 (where the value of i2 is 1, 2, ..., H2×V2), ..., for any value of iq (where the value of iq is 1, 2, ..., Hq×Vq) and at any time t (where t=1, 2, ..., T), for R(t, i1, i2, ..., iq)=1, the ratio of the number of ON LEDs in a rectangular LED block indicated by S (t, i1, i2, ..., iq) at a time t to the total number of all LEDs in the same rectangular LED block is set in advance. Let symbol F1(q) denote this ratio and let the total number of all LEDs in the rectangular LED block indicated by S (t, i1, i2, ..., iq) on the two-dimensional light-emitting unit 103 be (Hq+1, Hq+2×... ×HQ)×(Vq+1, Vq+2 ... ×VQ). In this case, the number of ON LEDs in the rectangular LED block indicated by S (t, i1, i2, ..., iq) is F1(q)×(Hq+1, Hq+2 ... ×HQ)×(Vq+1, Vq+2×... ×VQ).

Also assume that, for R(t, i1, i2, ..., iq)=0, at the time t, the ratio of the number of ON LEDs in a rectangular LED block indicated by S (t, i1, i2, ..., iq) to the total number of all LEDs in the same rectangular LED block is set in advance. Let symbol F0(q) denote this ratio and let the total number of all LEDs in the rectangular LED block indicated by S (t, i1, i2, ..., iq) on the two-dimensional light-emitting unit 103 be (Hq+1, Hq+2×... ×HQ)×(Vq+1, Vq+2×... ×VQ). In this case, the number of ON LEDs in the rectangular LED block indicated by S (t, i1, i2, ..., iq) is F0(q)×(Hq+1, Hq+2×... ×HQ)×(Vq+1, Vq+2×... ×VQ). Further assume that the relation F1(q) >F0(q) holds true.

In addition, as is obvious from the conditions described above, with the time t' being a multiple of P(q), the relations $R(t'-P(q)+1, i1, i2, \ldots, iq-1, iq) = R(t'-P(q)+2, i1, i2, \ldots, iq-1, iq) = \ldots = R(t', i1, i2, \ldots, iq-1, iq)$ hold true. Thus, from the above assumptions, with the time t' being a multiple of P(q), for $R(t', i1, i2, \ldots, i2, \ldots, iq) = 1$, at a time t between $(t'-P(q)+1)$ and t', LEDs in the rectangular LED block indicated by S (t, i1, i2, . . . , iq) are turned on always at a ratio of F1(q) For $R(t', i1, i2, \ldots, iq) = 0$, on the other hand, at a time t between $(t'-P(q)+1)$ and t', LEDs in the rectangular LED block indicated by S(t, i1, i2, . . . , iq) are turned on always at a ratio of F0(q).

Furthermore, by making the assumptions as described above, for $R(t, i1, i2, \ldots, iq-1) = 1$, as is obvious from condition 21 described above, the ratio of the number of ON LEDs in a rectangular LED block indicated by S(t, i1, i2, . . . , iq-1) at a time t to the total number of all LEDs in the same rectangular LED block is $Uq \times F1(q) + (1-Uq) \times F0(q) = F0(q) + Uq \times (F1(q) - F0(q))$ Let symbol F1(q-1) denote this ratio. In the case of $R(t, i1, i2, \ldots, iq-1) = 0$, as is obvious from condition 22 described above, the ratio of the number of ON LEDs in a rectangular LED block indicated by S(t, i1, i2, . . . , iq-1) to the total number of all LEDs in the same rectangular LED block at a time t is $Zq \times F1(q) + (1-Zq) \times F0(q) = F0(q) + Zq \times (F1(q) - F0(q))$. Let symbol F0(q-1) denote this ratio.

From the assumption that the relation F1(q)>F0(q) holds true and from condition 24 described above, it is obvious that the relation F1(q-1)>F0(q-1) also holds true as well.

As described earlier, S(t, i1, i2, . . . , iQ) indicates an LED at a time t. $R(t, i1, i2, \ldots, iQ) = 1$ indicates that this LED is ON. Thus, the ratio F1(Q) of the number of ON LEDs to the total number of all LEDs for the LED indicated by S(t, i1, i2, . . . , iQ) at a time t is 1. On the other hand, $R(t, i1, i2, \ldots, iQ) = 0$ indicates that this LED is OFF. Thus, the ratio F0(Q) of the number of ON LEDs to the total number of all LEDs for the LED indicated by S(t, i1, i2, . . . , iQ) at a time t is 0. That is to say, for q=Q, F1(q)=1 but F0(q)=0.

The above description suggests that it is possible to find F1(Q-1), F0(Q-1), F1(Q-2), F0(Q-2), . . . F1(1) and F0(0) in a recursive manner and it is obvious that the relations F1(Q-1)>F0(Q-1), F1(Q-2)>F0(Q-2), . . . and F1(1)>F0(0) hold true. As described above, F1(q) is the ratio of the number of ON LEDs in a rectangular LED block indicated by S(t, i1, i2, . . . , iq) at a time t to the total number of all LEDs in the same rectangular LED block for $R(t', i1, i2, \ldots, iq) = 1$. On the other hand, F0(q) is the ratio of the number of ON LEDs in a rectangular LED block indicated by S(t, i1, i2, . . . , iq) at a time t to the total number of all LEDs in the same rectangular LED block for $R(t', i1, i2, \ldots, iq) = 0$. In addition, with the time t' being a multiple of P (q), for $R(t', i1, i2, \ldots, iq) = 1$, at a time t between $(t'-P(q)+1)$ and t', LEDs in the rectangular LED block indicated by S(t, i1, i2, . . . , iq) are turned on always at a ratio of F1(q). For $R(t', i1, i2, \ldots, iq) = 0$, on the other hand, at a time t between $(t'-P(q)+1)$ and t', LEDs in the rectangular LED block indicated by S(t, i1, i2, . . . , iq) are turned on always at a ratio of F0(q)

The descriptions given above are summarized as follows. The number of devices (or the number of LEDs) employed in the two-dimensional light-emitting unit 103 is fixed. To be more specific, the number of LEDs arranged in the horizontal direction is H and the number of LEDs arranged in the vertical direction is V. In addition, H1, H2, . . . and HQ that satisfy $H1 \times H2 \times \ldots \times HQ = H$ as well as V1, V2, . . . and VQ that satisfy $V1 \times V2 \times \ldots \times VQ = V$ are set. Furthermore, constants U1, U2, U3, . . . and UQ as well as constants Z2, Z3, . . . and ZQ are also set. In addition, a time interval P(q) at which the qth information (where q=1, 2, . . . and Q) is transmitted is set. P(q) is a multiple of P(q+1). Moreover, constants N1, N2, N3, . . . and NQ as well as constants M2, M3, . . . and MQ are set as well. In addition, mapping methods that satisfy conditions 21, 22, 23, 24 and 21' described above are also set. The mapping methods that satisfy conditions 21, 22, 23, 24 and 21' described above are a first positive-case mapping table taking the exposure time into consideration, a second positive-case mapping table taking the exposure time into consideration, a third positive-case mapping table taking the exposure time into consideration, . . . , a qth positive-case mapping table taking the exposure time into consideration, a second negative-case mapping table taking the exposure time into consideration, a third negative-case mapping table taking the exposure time into consideration and a qth negative-case mapping table taking the exposure time into consideration. After these mapping tables taking the exposure time into considerations are set, values of F1(1), F0(1), F1(2), F0(2), . . . , F1(Q) and F0(Q) are also determined. These values and the mapping tables taking the exposure time into considerations are given to the encoder 101 of the transmitting apparatus 100 and the decoder 203 of the receiving apparatus 200 in advance so as to establish a state of matching between the transmitting apparatus 100 and the receiving apparatus 200.

It is to be noted that, as described above, F1(q) is the ratio of the number of ON LEDs in a rectangular LED block indicated by S(t, i1, i2, . . . , iq) at a time t to the total number of all LEDs in the same rectangular LED block for $R(t', i1, i2, \ldots, iq) = 1$. On the other hand, F0(q) is the ratio of the number of ON LEDs in a rectangular LED block indicated by S(t, i1, i2, . . . , iq) at a time t to the total number of all LEDs in the same rectangular LED block for $R(t', i1, i2, \ldots, iq) = 0$. Also as described above, these ratios are set at values fixed at all the times independently of input information with resolutions ranging from the first resolution to the Qth resolution. In addition, the relation F1(q)>F0(q) holds true. Furthermore, with the time t' being a multiple of P(q), for $R(t', i1, i2, \ldots, iq) = 1$, at a time t between $(t'-P(q)+1)$ and t', LEDs in the rectangular LED block indicated by S(t, i1, i2, . . . , iq) are turned on always at a ratio of F1(q). For $R(t', i1, i2, \ldots, iq) = 0$, on the other hand, at a time t between $(t'-P(q)+1)$ and t', LEDs in the rectangular LED block indicated by S(t, i1, i2, . . . , iq) are turned on always at a ratio of F0(q).

Figure 29:
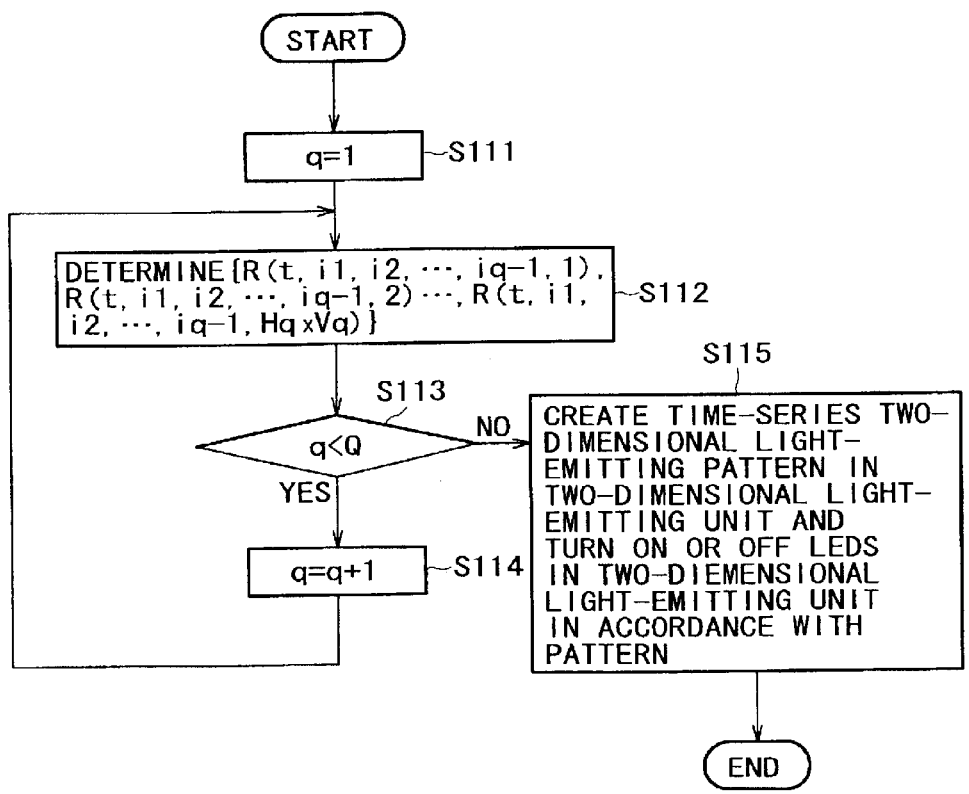
FIG. 29 shows a flowchart representing the procedure of a process carried out by the encoder employed in the transmitting apparatus.

FIG. 29 shows a flowchart representing the procedure of processing carried out by the encoder 101 of the transmitting apparatus 100 by adoption of such a mapping method.

As shown in the figure, the flowchart begins with a step S111 at which the variable q indicating the level of a hierarchical layer is set at 1. Then, at the next step S112, the values of $\{R(t, i1, i2, \ldots, iq-1, 1), R(t, i1, i2, \ldots, iq-1, 2), \ldots, R(t, i1, i2, \ldots, iq-1, Hq \times Vq)\}$ are determined. Details of the process carried out at the step S112 will be described later by referring to flowcharts shown in FIGS. 30 to 32.

Subsequently, the flow of the processing goes on to the next step S113 to form a judgment as to whether or not the value of q is smaller than Q. If the value of q is smaller than Q, indicating that a hierarchical layer at a higher frequency (a higher resolution) still exists, the flow of the processing goes on to a step S114. At the step S114, the value of q is incremented by 1. Then, the flow of the processing goes back to the step S112 to repeat the processes of the steps S112 to S114, these processes are carried out repeatedly till the value of q is found no longer smaller than Q at the step S113.

If the value of q is equal to Q at the step S113, on the other hand, the flow of the processing goes on to a step S115. At the step S115, the two-dimensional light-emitting unit 103 is driven to emit a beam in accordance with the value of R(t, i1, i2, ..., iQ−1, iQ), which has been determined at the step S112. To put it in detail, an LED indicated by S(t, i1, i2, ..., iQ−1, iQ) is turned on if the value of R(t, i1, i2, ..., iQ−1, iQ) is 1 or the LED indicated by S(t, i1, i2, ..., iQ−1, iQ) is turned off if the value of R(t, i1, i2, ..., iQ−1, iQ) is 0 at times t where t=1, 2, ..., T. This process is carried out for all LEDs in the two-dimensional light-emitting unit 103 to generate a two-dimensional blinking pattern before the execution of the whole processing routine is ended.

It is to be noted that the time T is assumed to be such a time that a period of time between the time 0 and the time T is long enough for transmitting pieces of information having resolutions ranging from the first resolution to the Qth one. In addition, it is quite within the bounds of possibility that information of a particular hierarchical layer such as the qth information is all transmitted earlier than the time T. That is to say, it is quite within the bounds of possibility that the transmission of the qth information is completed earlier than transmission of information of hierarchical layers other than this particular hierarchical layer. In this case, dummy data lasting at the time T is added to the tail of the qth information. The qth information and the dummy data are then encoded, and the transmission processing, that is, the operation to output a two-dimensional blinking pattern, is continued.

Figure 30:
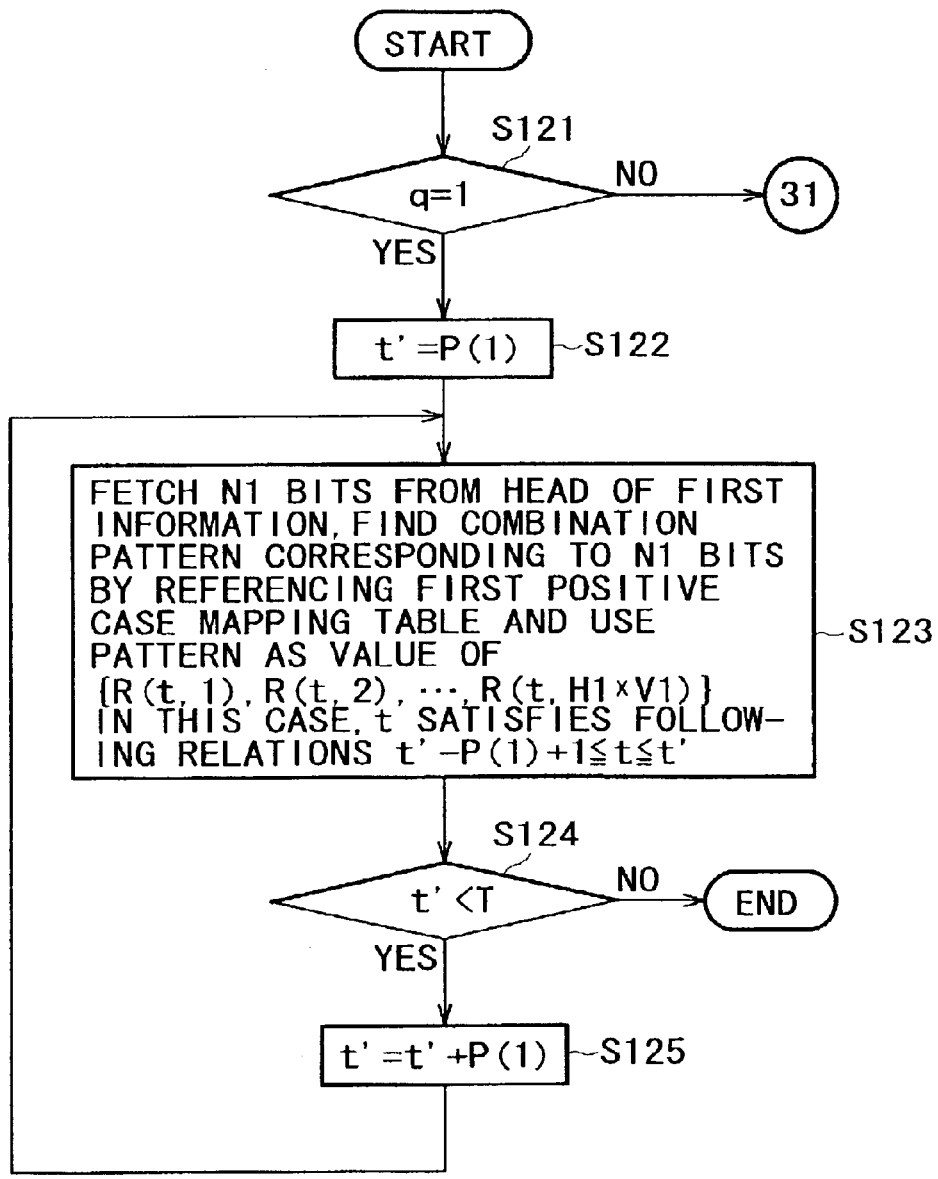
FIG. 30 shows a flowchart representing the procedure of details shown in FIG. 29 to determine {R(t, i1, i2, . . . , iq−1, 1), R(t, i1, i2, . . . , iq−1, 2), . . . , R(t, i1, i2, . . . , iq−1, Hq×Vq)} from qth information for a given value of q.
Figure 31:
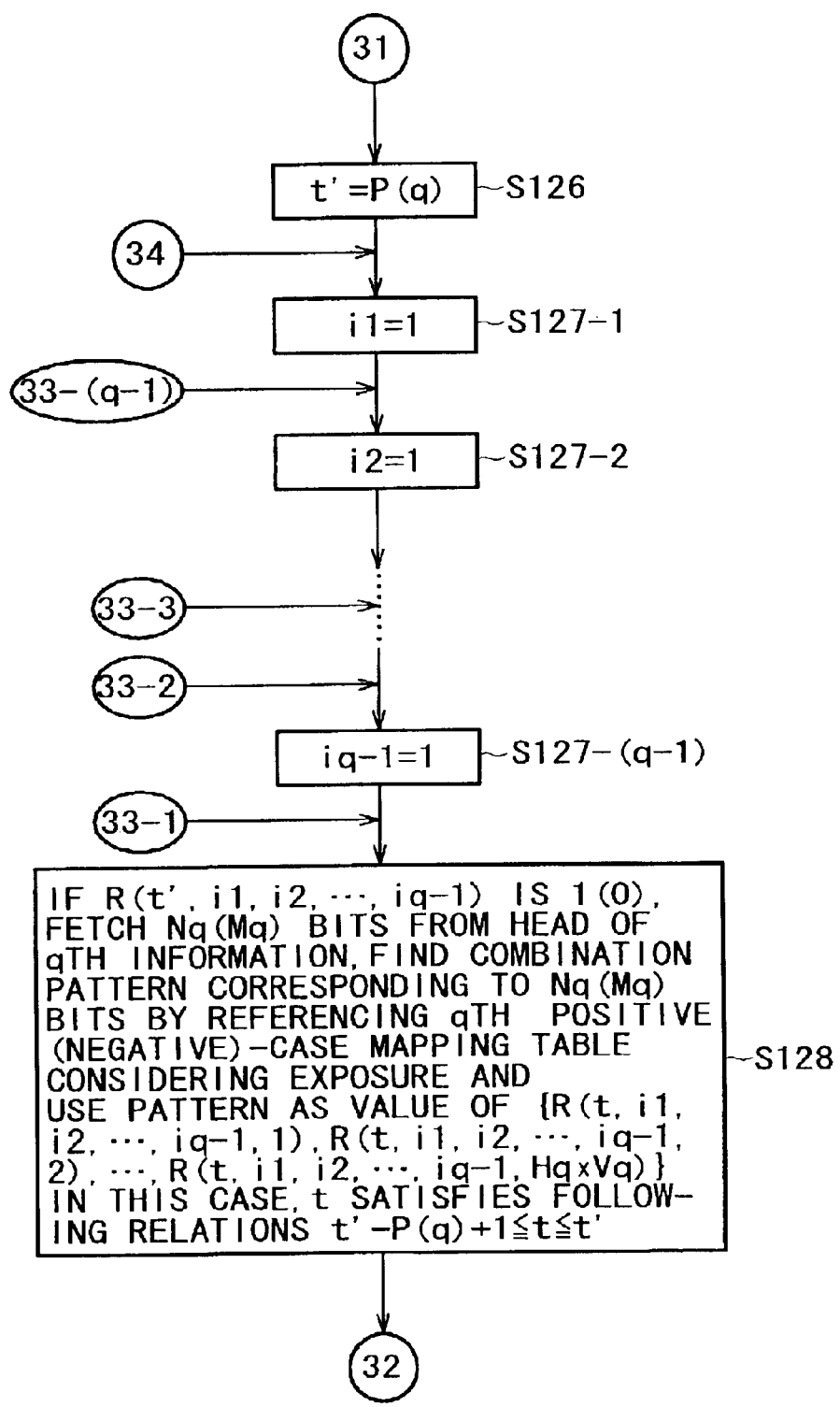
FIG. 31 shows a continuation flowchart representing the procedure of details to determine {R(t, i1, i2, iq−1, 1), R(t, i1, i2, . . . , iq−1, 2), . . . , R(t, i1, i2, . . . , iq−1, Hq×Vq)} from qth information for a given value of q.
Figure 32:
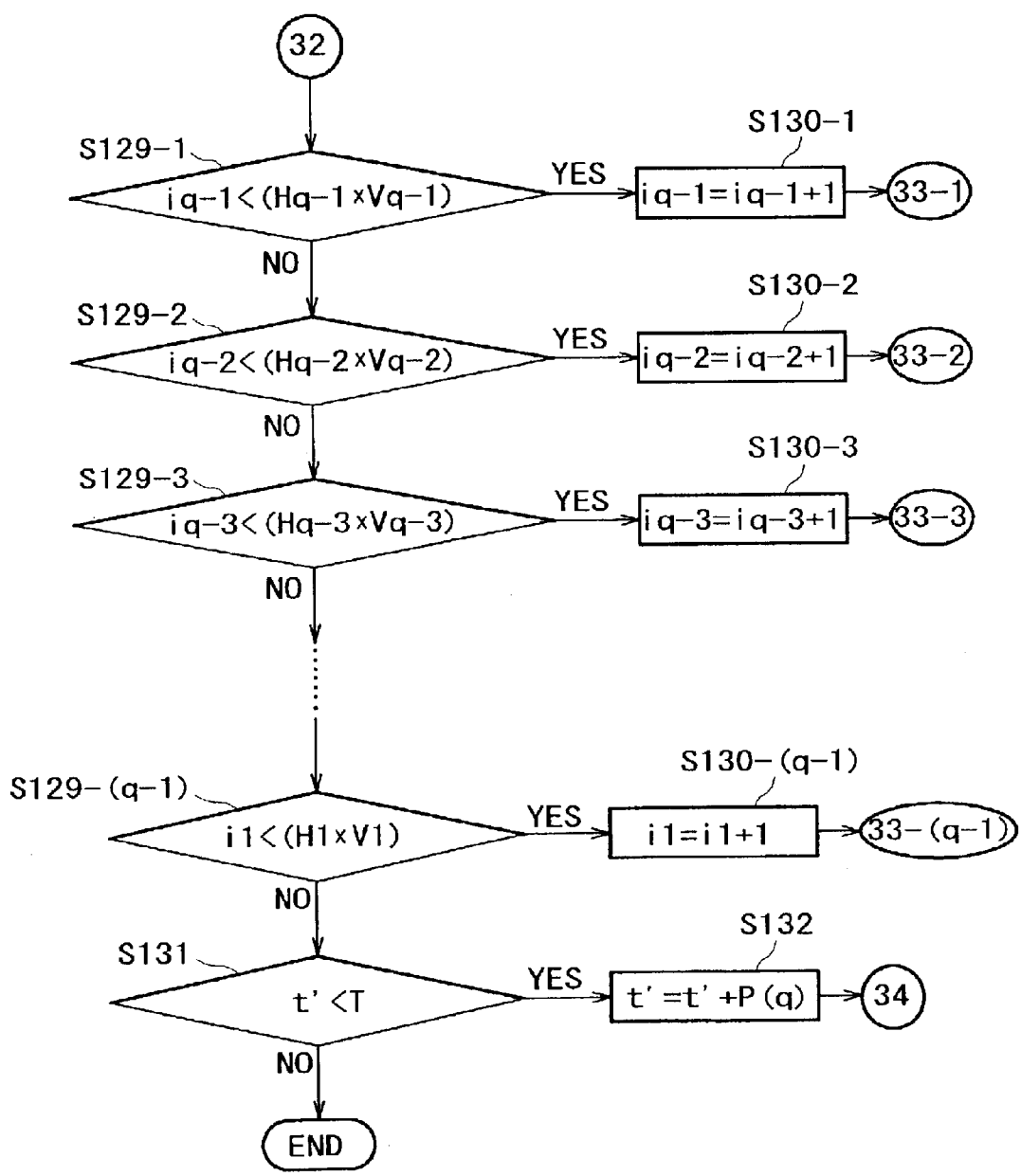
FIG. 32 shows a further continuation flowchart representing the procedure of details to determine {R(t, i1, i2, . . . , iq−1, 1), R(t, i1, i2, . . . , iq−1, 2), . . . , R(t, i1, i2, . . . , iq−1, Hq×Vq)} from qth information for a given value of q.

FIGS. 30 to 32 show the aforementioned flowcharts of subroutines representing details of the processing carried out at the step S112 to determine the values of {R(t, i1, i2, ..., iq−1, 1), R(t, i1, i2, ..., iq−1, 2), ..., R(t, i1, i2, ..., iq−1, Hq×Vq)} from the qth information for a given hierarchical layer q. It is to be noted that, as is obvious from the flowchart shown in FIG. 29, prior to this stage, all values of R(t, i1, i2, ..., iq−1) for t, i1, i2, ..., and iq−1 have already been determined.

As shown in FIG. 30, the flowchart begins with a step S121 to form a judgment as to whether or not the value of q is equal to 1. If the value of q is equal to 1, the flow of the processing goes on to a step S122. If the value of q is not equal to 1, on the other hand, the flow of the processing goes on to a step S126 of the flowchart shown in FIG. 31.

At the step S122, the variable t' representing a time is set at P(1). Then, at the next step S123, N1 bits are fetched from the head of the first information and a combination pattern corresponding to the N1 bits is found by referencing the first positive-case mapping table taking the exposure time into consideration. Then, the combination pattern is used as a value of {R(t', 1), R(t', 2), ..., R(t', H1×V1)}. That is to say, values of R(t', 1), R(t', 2), ..., R(t', H1×V1) are set. Subsequently, the values of R(t', i1) set for each value of i1 (where i1=1, 2, ..., H1×V1) are copied to all of R (t'−P(1)+1, i1), R(t'−P(1)+2, i1), ... and R(t+−1, i1). For P(1)=1, however, there is no copy destination. Thus, it is not necessary to carry out a copy operation. Then, the N1 bits fetched from the head of the first information are discarded and the bits following the N1 bits are shifted to the head of the first information.

Subsequently, the flow of the processing goes on to the next step S124 to form a judgment as to whether or not the variable t' representing a time is earlier than the time T. If the time t' is earlier than the time T, the flow of the processing goes on to a step S125. If the time t' is not earlier than the time T, on the other hand, the execution of the whole processing routine is ended. This is because, in this case, R(t', i1) has been set for all values of t (that is, for t=1, 2, ..., T) and for all values of i1(that is, for i1=1, 2, ..., H1×V1).

At the step S125, the variable t' representing a time is incremented by P(1) in order to prepare for a process for the next time. Then, the flow of the processing goes back to the step S123.

At the step S126, the variable t' representing a time is set at P(q). Then, the flow of the processing goes on to the next step S127-1.

At the step S127-1, the variable i1 is set at 1. Then, the flow of the processing goes on to the next step S127-2.

At the step S127-2, the variable i2 is set at 1. Then, the flow of the processing goes on to the next step S127-3.

By the same token, at the subsequent steps S127-3 to S127-(q−2), the variables i3 to iq−2 are set at 1. Finally, at a step S27-(q−1), the variable iq−1 is set at 1. Then, the flow of the processing goes on to the next step S128. It is to be noted that the steps S127-3 to S127-(q−2) are omitted from the flowchart in order to prevent the flowchart from being crowded with identical steps.

Then, at the step S128, the value of R(t', i1, i2, ..., iq−1) specified by the present values of t', i1, i2, ... and iq−1 is checked.

To put it in detail, if R(t', i1, i2, ..., iq−1) is 1, Nq bits are fetched from the head of the qth information and a combination pattern corresponding to the Nq bits is found by referencing the qth positive-case mapping table taking the exposure time into consideration. Then, the combination pattern is used as the value of {R (t', i1, i2, ..., iq−1, 1), R(t, ..., i1, i2, ..., iq−1, 2), ..., R(t', i1, i2, ..., iq−1, Hq×Vq)}. That is to say, values of R(t', i1, i2, ..., iq−1, 1), R(t', i1, i2, ..., iq−1, 2), ..., R(t', i1, i2, ..., iq−1, Hq×Vq) are set. Subsequently, the values of R(t', i1, i2, ..., iq−1, iq) set for each value of iq (where iq=1, 2, ... Hq×Vq) are copied to all of R(t'−P(q)+1, i1, i2, ..., iq−1, iq), R (t'−P(q)+2, i1, i2, ..., iq−1, iq), ... and R(t'−1, i1, i2, ..., iq−1, iq). For P(q)=1, however, there is no copy destination. Thus, it is not necessary to carry out a copy operation. Then, the Nq bits fetched from the head of the qth information are discarded and the bits following the Nq bits are shifted to the head of the qth information.

It is to be noted that, in accordance with condition 21 described above, for Nq−0, the value of {R (t', i1, i2, ..., iq−1, 1), R(t', i1, i2, ..., iq−1, 2), R(t', i1, i2, ..., iq−1, Hq×Vq)} is represented by a specific pattern at all the times. In this case, R(t', i1, i2, ..., iq−1, 1), R(t', i1, i2, ..., iq−1, 2), ..., R (t', i1, i2, ..., iq−1, Hq×Vq) are set at values represented by this specific pattern. Then, this specific pattern is copied for times (t'−P(q)+1) to (t+−1). In addition, in this case, the bits at the head of the qth information are not discarded.

In the case of R(t', i1, i2, ..., iq−1)=0, on the other hand, Mq bits are fetched from the head of the qth information and a combination pattern corresponding to the Mq bits is found by referencing the qth negative-case mapping table. Then, the combination pattern is used as the value of {R(t', i1, i2, ..., iq−1, 1), R(t', i1, i2, ..., iq−1, 2), ..., R(t', i1, i2, ..., iq−1, Hq×Vq)} That is to say, values of R(t', i1, i2, ..., iq−1, 1), R(t' i1, i2, ..., iq−1, 2), ..., R(t', i1, i2, ..., iq−1, Hq×Vq) are set. Subsequently, the values of R(t', i1, i2, ..., iq−1, iq) set for each value of iq (where iq=1, 2, ..., Hq×Vq) are copied to all of R(t'−P(q)+1, i1, i2, ..., iq−1, iq) R(t'−P(q)+2, i1, i2, ..., iq−1, iq), ..., and R (t+−1, i1, i2, ..., iq−1, iq). For P(q)=1, however, there is no copy destination. Thus, it is not necessary to carry out a copy operation. Then, the Mq bits fetched from the head of the qth information are discarded and the bits following the Mq bits are shifted to the head of the qth information.

It is to be noted that, in accordance with condition 22 described above, for Mq=0, the value of {R (t', i1, i2, ..., iq−1, 1), R(t', i1, i2, ..., iq−1, 2), ..., R(t', i1, i2, ..., iq−1, Hq×Vq)} is represented by a specific pattern at all the times. In this case, R(t', i1, i2, ..., iq−1, 1), R(t', i1, i2, ..., iq−1, 2), ..., R (t', i1, i2, ..., iq−1, Hq×Vq) are set at values represented by this specific pattern. Then, this specific pattern is copied for times (t'−P(q)+1) to (t'−1). In addition, in this case, the bits at the head of the qth information are not discarded.

Then, the flow of the processing goes on to the next step S129-1 of the flowchart shown in FIG. 32 to form a judgment as to whether or not the value of iq−1 is smaller than (Hq1×Vq−1). If the value of iq−1 is smaller than (Hq1×Vq−1), the flow of the processing goes on to a step S130-1. If the value of iq−1 is not smaller than (Hq1×Vq−1), on the other hand, the flow of the processing goes on to a step S129-2. At the step S130-1, the value of iq−1 is incremented by 1. Then, the flow of the processing goes back to the step S128.

At the step S129-2, the value of iq−2 is compared with (Hq2×Vq−2) to form a judgment as to whether or not the value of iq−2 is smaller than (Hq2×Vq−2). If the value of iq−2 is smaller than (Hq2×Vq−2), the flow of the processing goes on to a step S130-2. If the value of iq−2 is not smaller than (Hq2×Vq−2), on the other hand, the flow of the processing goes on to a step S129-3. At the step S130-2, the value of iq−2 is incremented by 1. Then, the flow of the processing goes back to the step S127-(q−1).

At the step S129-3; the value of iq−3 is compared with (Hq3×Vq−3) to form a judgment as to whether or not the value of iq−3 is smaller than (Hq3×Vq−3). If the value of iq−3 is smaller than (Hq3×Vq−3), the flow of the processing goes on to a step S130-3. If the value of iq−3 is not smaller than (Hq3×Vq−3), on the other hand, the flow of the processing goes on to a step S129-4. At the step S130-3, the value of iq−3 is incremented by 1. Then, the flow of the processing goes back to the step S127-(q−2).

Thereafter, the same process as the step S129-3 is carried out repeatedly at each of the subsequent steps S129-4, S129-5 and so on. At a step S129-(q−1), the value i1 is compared with (H1×V1) to form a judgment as to whether or not the value i1 is smaller than (H1×V1). If the value i1 is smaller than (H1×V1), the flow of the processing goes on to a step S130-(q−1). If the value i1 is not smaller than (H1×V1), on the other hand, the flow of the processing goes on to a step S131. At the step S130-(q−1), the value of i1 is incremented by 1. Then, the flow of the processing goes back to the step S127-2. It is to be noted that steps S129-4 to S129-(q−2) and steps S130-4 to S130-(q−2) are omitted from the flowchart in order to prevent the flowchart from being crowded with identical steps.

At the step S131, the variable t' representing a time is compared with the time T to form a judgment as to whether or not the variable t' is earlier than the time T. If the variable t' representing a time is earlier than the time T, the flow of the processing goes on to a step S132. At the step S132, the variable t' representing a time is incremented by P(q) in order to prepare for a process for the next time. Then, the flow of the processing goes back to the step S127-1.

If the variable t' representing a time is found not earlier than the time T at the step S131, on the other hand, the execution of this whole processing routine is ended. This is because the values of R(t', i1, i2, ..., iq−1, iq) for all the values of t (that is, for t=1, 2, ... and T), all the values of i1 (that is, for i1=1, 2, ... H1×V1), all the values of i2 (that is, for i2=1, 2, ... H2×V2), ... and all the values of iq (that is, for iq=1, 2, ... Hq×Vq) have been set.

By referring to the flowcharts shown in FIG. 29 and FIGS. 30 to 32, the above description has explained the procedure of the processing carried out by the encoder 101 to create a time-series two-dimensional light-emitting pattern on the two-dimensional light-emitting unit 103 from pieces of information ranging from the first information to the Qth information which are input via the input terminal 102.

The following description explains a process carried out by the decoder 203 employed in the receiving apparatus 200 as a reversed process of the data-encoding process described above.

As has already been explained earlier, if the receiving apparatus 200 is at a long distance from the transmitting apparatus 100, the camera 201 employed in the receiving apparatus 200 is not capable of taking a picture of a two-dimensional blanking pattern, which is displayed on the two-dimensional light-emitting unit 103, at a sufficient resolution. In such a case, a picture obtained as a result of a transformation process carried out by the perspective projection unit 202 employed in the receiving apparatus 200 is a more or less blurring picture. The picture obtained as a result of the transformation process has a width of H pixels and a height of V pixels. Nevertheless, by regarding a plurality of pixels as a blinking unit, average brightness of the blinking unit can be recognized.

If it is possible to detect a two-dimensional blinking pattern originated from H1×V1 rectangular LED blocks each consisting of (H2×H3×...×HQ)×(V2×V3×...×VQ) LEDs at an exposure time of P(1), the decoder 203 is capable of decoding the two-dimensional blinking pattern to generate the first information. If it is possible to further detect a two-dimensional blinking pattern originated from (H1×H2)×(V1×V2) rectangular LED blocks each consisting of (H3×H4×....×HQ)×(V3×V4×...×VQ) LEDs at an exposure time of P (2), the decoder 203 is capable of decoding the two-dimensional blinking pattern to generate the second information. Thereafter, a two-dimensional blinking pattern of a higher resolution needs to be detected at an exposure time to generate information of the same resolution. The degree of the two-dimensional blinking pattern resolution is determined by the blurring state of the H×V picture obtained as a result of a transformation process carried out by the perspective projection unit 202 employed in the receiving apparatus 200, where symbol H is the picture's width expressed in terms of pixels and symbol V is the picture's height expressed in terms of pixels.

Figure 33:
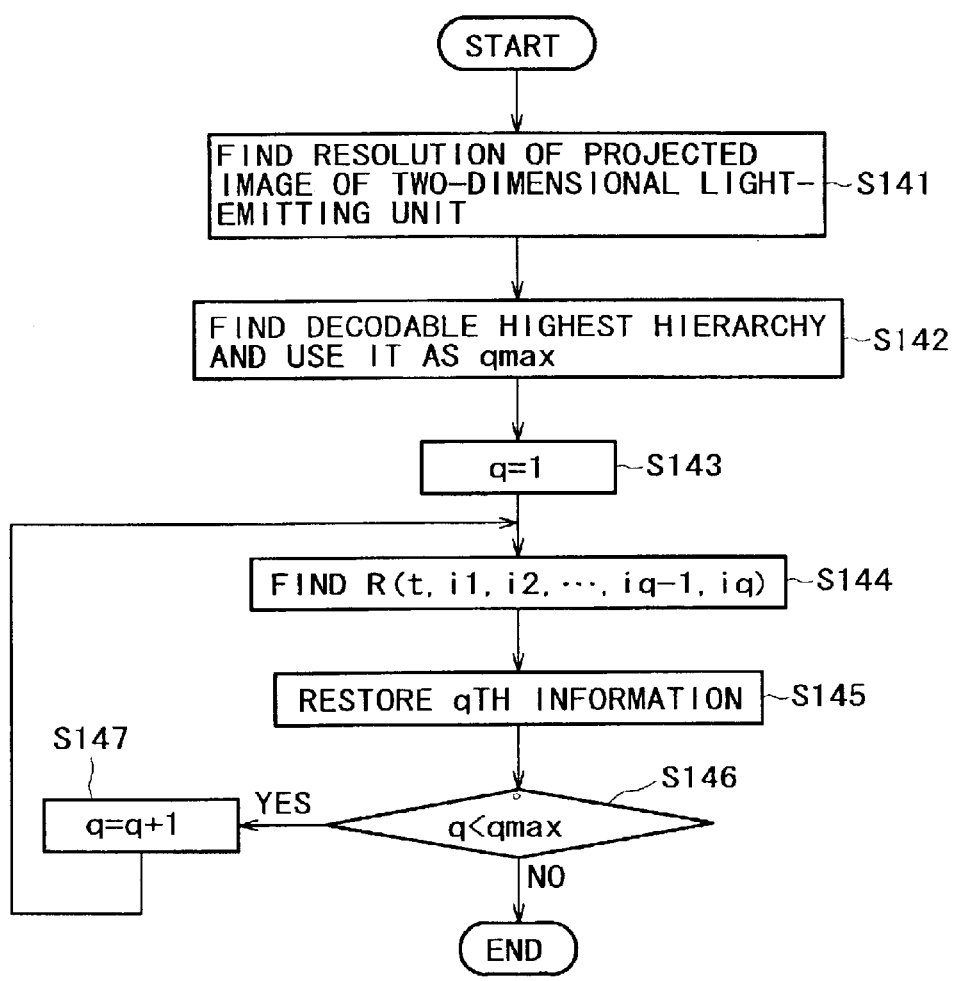
FIG. 33 shows a flowchart representing the procedure of a process carried out by the decoder employed in the receiving apparatus.

FIG. 33 shows a flowchart representing the procedure of processing carried out by the decoder 203 of the receiving apparatus 200 to decode a two-dimensional blinking pattern.

As shown in the figure, the flowchart begins with a step S141 to examine the true resolution of an H×V picture obtained as a result of a transformation process carried out by the perspective projection unit 202 employed in the receiving apparatus 200. As numerical values for expressing a resolution, symbol G0 is used as an identifiable unit in the horizontal direction and symbol G1 is used as an identifiable unit in the vertical direction.

Then, the flow of the processing goes on to the next step S142 to determine the depth of the hierarchy or the largest number of a hierarchical layer at which the decoding process can be carried out. To put it concretely, a process is carried out at the step S142 to find a smallest value of q that satisfies relations of (Hq+1×Hq+2×...×HQ)≧=G0 and (Vq+1×Vq+2×...×VQ)≧=G1. This smallest value of q is denoted by symbol qmax. It is to be noted that, for G0=G1=1, qmax is equal to Q (qmax=Q).

Then, at the next step S143, the variable q representing the hierarchical layer is set at 1. Subsequently, at the next step S144, the value of R(t, i1, i2, ..., iq−1, iq) is found. The procedure of a process carried out at the step S144 will be explained in detail later.

Then, at the next step S145, the two-dimensional blinking pattern is restored to the qth information. Details of a method to restore a two-dimensional blinking pattern to the qth information will be described later.

Subsequently, the flow of the processing goes on to the next step S146 to form a judgment as to whether or not the value of q is smaller than qmax. If the value of q is smaller than qmax, the flow of the processing goes on to a step S147. If the value of q is not smaller than qmax, on the other hand, the execution of the entire processing routine is ended. At the step S147, the value of q is incremented by 1. Then, the flow of the processing goes back to the step S144 in order to prepare for a process for the next hierarchical layer.

Figure 34:
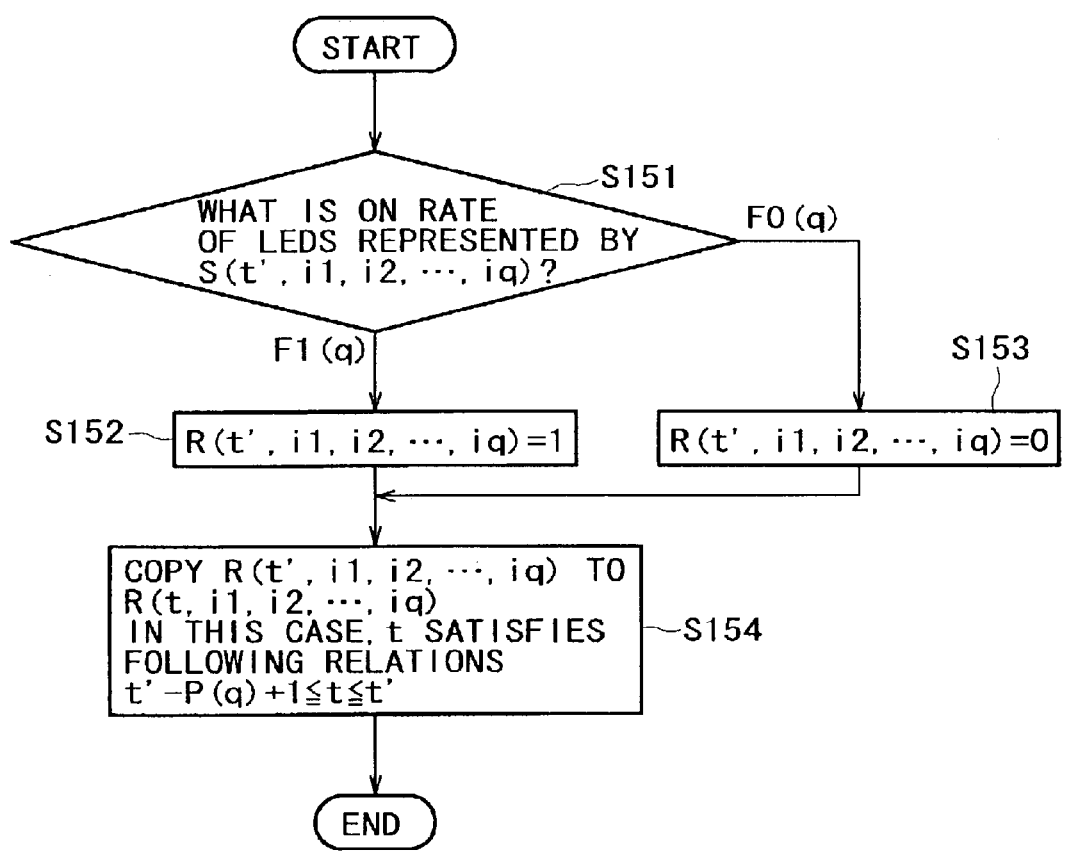
FIG. 34 shows a flowchart representing the procedure of details shown in FIG. 33 to determine R(t, i1, i2, . . . , iq−1, iq) for a given value of q from a shot picture of the two-dimensional light-emitting unit.

FIG. 34 shows a flowchart representing a detailed procedure of processing carried out at the step S144 of the flowchart shown in FIG. 33 to determine a value of R (t1, i1, i2, ..., iq, iq−1) from a projected picture of the two-dimensional light-emitting unit 103 for a given value of q. Speaking accurately, the projected picture is a H×V picture obtained as a result of an affine transformation process carried out by the prespective projection unit 202 on a picture taken by the camera 201. That is to say, the projected picture is a picture generated by the perspective projection unit 202 as a result of the transformation process.

As shown in the figure, the flowchart begins with a step S151 to form a judgment as to whether the ratio of the number of ON LEDs in a rectangular LED block indicated by S(t', i1, i2, ..., iq) at a time t' to the total number of all LEDs in the same rectangular LED block is equal to F1(q) or F0(q). If the ratio of the number of ON LEDs is equal to F1(q), the flow of the processing goes on to a step S152. If the ratio of the number of ON LEDs is equal to F0 (q), on the other hand, the flow of the processing goes on to a step S153. In actuality, however, due to existence of a noise, at the step S151, the ratio is examined to determine whether the ratio is at least equal to $\{F1(q)+F0(q)\}/2$ or smaller than $\{F1(q)+F0(q)\}/2$.

At the step S152, R(t', i1, i2, ... iq) is set at 1. Then, the flow of the processing goes on to a step S154. At the step S153, on the other hand, R(t', i1, i2, ... iq) is set at 0. Then, the flow of the processing goes on to the step S154.

At the step S154, the value of R(t', i1, i2, ... iq) is copied to all of R(t'−P(q)+1, i1, i2, ..., iq−1, iq), R(t'−P(q)+2, i1, i2, ..., iq−1, iq), ... and R(t+−1, i1, i2, ..., iq−1, iq). Then, the execution of the whole processing routine is ended. For P(q)=1, however, there is no copy destination. Thus, it is not necessary to carry out a copy operation.

It is to be noted that the processing routine represented by the flowchart shown in FIG. 34 is executed for all values of t', for all values of i1 (that is, for i1=1, 2, ... H1×V1) for all values of i2 (that is, for i2=1, 2, ... H2×V2), ... and for all values of iq (that is, for iq=1, 2, ..., Hq×Vq) In this case, the time t' is a multiple of (that is, one time, two times and so on) P (q) and is earlier than the time T.

Since F1(q) is a ratio of the number of ON LEDs in a rectangular LED block indicated by S(t, i1, i2, ..., iq) at a time t to the total number of all LEDs in the same rectangular LED block for R(t, i1, i2, ..., iq)=1 while F0(q) is a ratio of the number of ON LEDs in a rectangular LED block indicated by S(t, i1, i2, ..., iq) at a time t to the total number of all LEDs in the same rectangular LED block for R(t, i1, i2, ..., iq)=0, it is easy for the relevant people to understand that a method represented by the flowchart shown in FIG. 34 to find a value of R(t', i1, i2, ..., iq) is a proper method.

It is to be noted that, with the time t' being a multiple of P(q), for R(t', i1, i2, ..., iq)=1, at a time t between (t'−P(q)+1) and t', LEDs in the rectangular LED block indicated by S(t, i1, i2, ..., iq) are turned on always at a ratio of F1 (q).

For R(t', i1, i2, ..., iq)=0, on the other hand, at a time t between (t'−P(q)+1) and t', LEDs in the rectangular LED block indicated by S(t, i1, i2, ..., iq) are turned on always at a ratio of F0 (q). From these facts, by using a picture taken by the camera 201 of the receiving apparatus 200 at a continuous exposure from the time (t'−P(q)+1) to the time t', it is possible to find the ratio of the number of ON LEDs in a rectangular LED block at the step S151. As an alternative, if the sensitivity of the camera 201 is good and the camera 201 can be used for continuous shooting during a time interval of 1, by using an average value of P(q) pictures taken during a period between the time (t'−P (q)+1) to the time t', it is possible to find the ratio of the number of ON LEDs in a rectangular LED block at the step S151.

Figure 35:
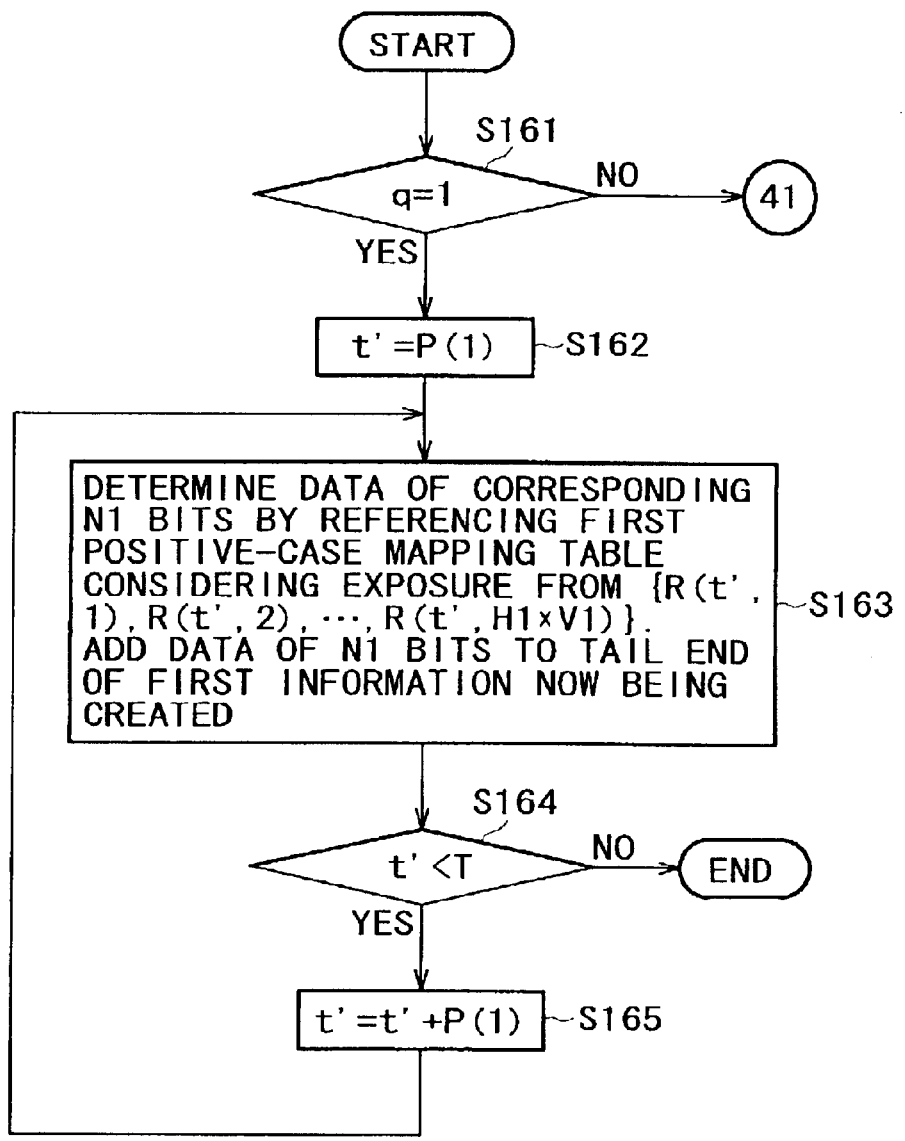
FIG. 35 shows a flowchart representing the procedure of details shown in FIG. 33 to determine qth information from R(t', i1, i2, . . . , iq−1, iq) for a given value of q.
Figure 36:
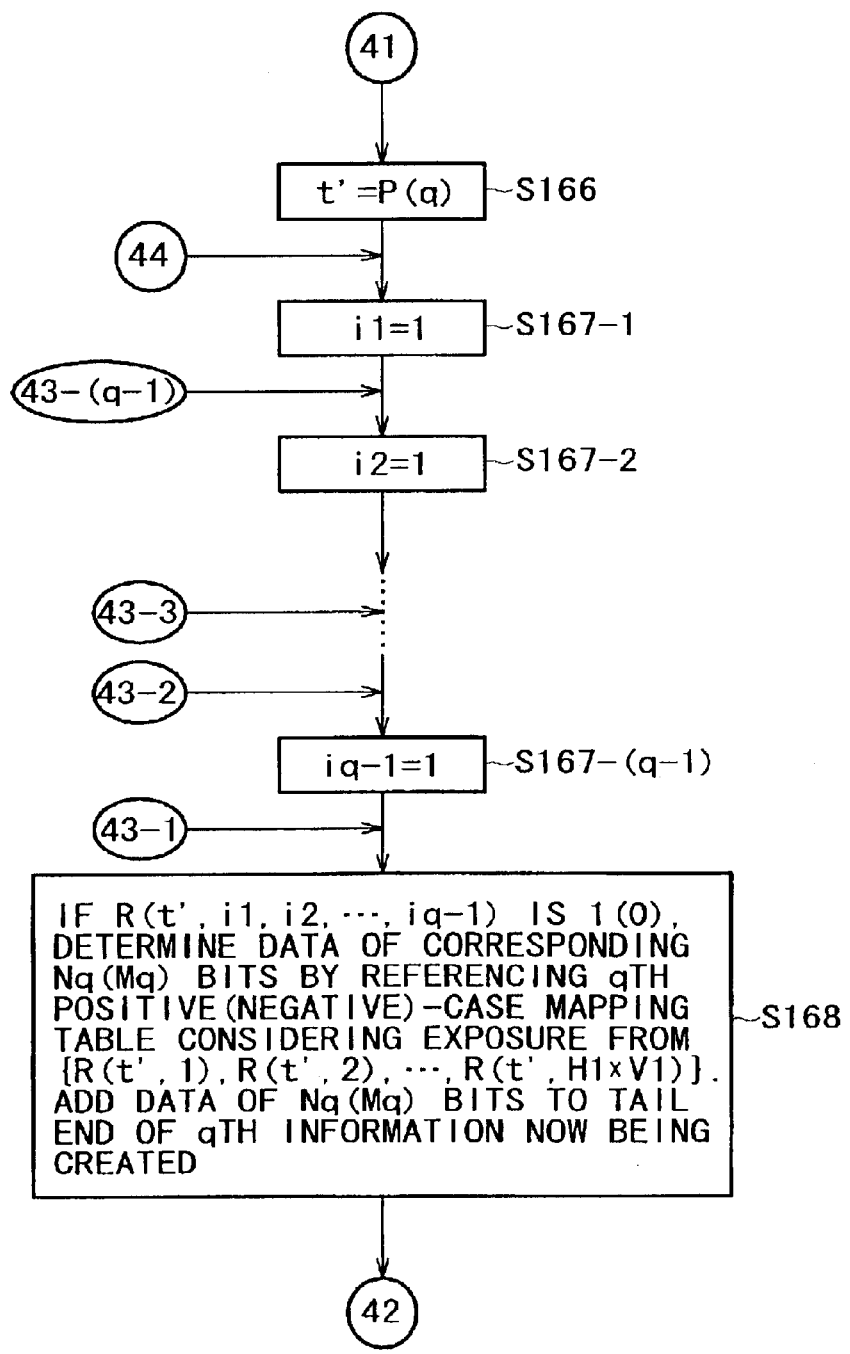
FIG. 36 shows a continuation flowchart representing the procedure of details to determine qth information from R(t', i1, i2, . . . , iq−1, iq) for a given value of q.
Figure 37:
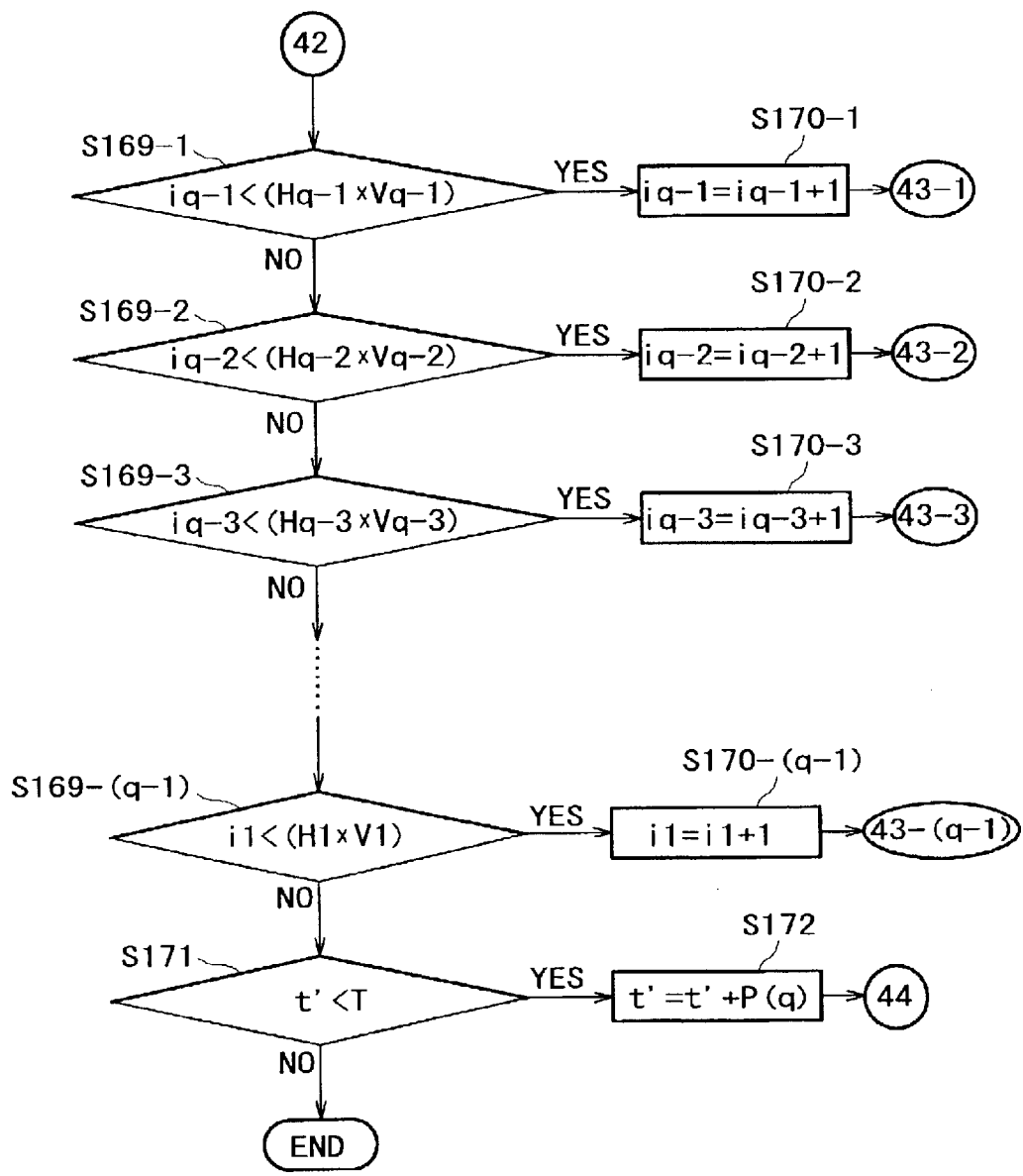
FIG. 37 shows a further continuation flowchart representing the procedure of details to determine qth information from R(t', i1, i2, . . . , iq−1, iq) for a given value of q.

FIGS. 35 to 37 show flowcharts representing a detailed procedure of processing carried out at the step S145 to find the qth information from R(t', i1, i2, ..., iq−1, iq) for a given value of q. It is to be noted that, as is obvious from the processing procedure represented by the flowchart shown in FIG. 33, prior to this stage, all values of R(t', i1, i2, ..., iq−1) for all t, i1, i2, ..., and iq−1, (where t=1, 2, ..., T) have already been determined.

The flowchart shown in FIG. 35 begins with a step S161 to form a judgment as to whether or not the value of q is equal to P(1). If the value of q is equal to 1, the flow of the processing goes on to a step S162. If the value of q is not equal to 1, on the other hand, the flow of the processing goes on to a step S166 of the flowchart shown in FIG. 36.

At the step S162, the variable t' representing a time is set at 1. Then, at the next step S163, data of the corresponding N1 bits of the first information is determined by referencing the first positive-case mapping table taking the exposure time into consideration from the pattern $\{R(t', 1), R(t', 2), ..., R(t', H1\times V1)\}$ and added to a tail end of a memory employed in the receiving apparatus 200 but shown in none of the figures. The memory is used as storage means for storing the first information by adding such data to its tail from time to time.

Then, the flow of the processing goes on to the next step S164 to form a judgment as to whether or not the variable t' representing a time is earlier than the time T. If the time t' is earlier than the time T, the flow of the processing goes on to a step S165. If the time t' is not earlier than the time T, on the other hand, the execution of the whole processing routine is ended. This is because, in this case, R(t, i1) has been restored to the first information for all values of t' and for all values of i1 (that is, for i1=1, 2, ... H1×V1). In this case, the value of t' is a multiple of (that is, one time, two times and so on) P(1) and not later than the time T.

At the step S165, the variable t' representing a time is incremented by P(1) in order to prepare for a process for the next time and, then, the flow of the processing goes back to the step S163.

At the step S166, the variable t' representing a time is set at P(q). Then, the flow of the processing goes on to a step S167-1.

At the step S167-1, the variable i1 is set at 1. Then, the flow of the processing goes on to a step S167-2.

At the step S167-2, the variable i2 is set at 1. Then, the flow of the processing goes on to a step S167-3.

Thereafter, the same process as the step S167-1 or S167-2 is carried out at each of the subsequent steps. Finally, at a step S167-(q−1), the variable iq−1 is set at 1. The flow of the processing then goes on to a step S168. It is to be noted that the steps S167-3 to S167-(q−2) are not shown in FIG. 36 to prevent the flowchart shown in the figure from becoming crowded with identical steps.

Then, at the next step S168, the value of R(t', i1, i2, ..., iq−1) specified by the present values of t', i1, i2, ..., i2, and iq−1 is checked.

To put it in detail, if R(t', i1, i2, ..., iq−1) is 1, data of corresponding Nq bits of the qth information is determined from the combination pattern of {R(t', i1, i2, ..., i2, ..., iq−1, 1), R(t', i1, i2, ..., iq−1, 2), ..., R(t', i1, i2, ..., iq−1, Hq×Vq)} by referencing the qth positive-case mapping table taking the exposure time into consideration, and added to a tail end of a memory employed in the receiving apparatus 200 but shown in none of the figures. The memory is used as storage means for storing the qth information.

It is to be noted that, in accordance with condition 21 described above, for Nq=0, data of the qth bit is not included and, hence, none is added to a tail end of the memory for storing the qth information. In this case, the value of {R(t', i1, i2, ..., iq−1, 1), R (t', i1, i2, ..., iq−1, 2), ..., R(t', i1, i2, ..., iq−1, Hq×Vq)} should be represented by a specific pattern at all the times.

In the case of R(t', i1, i2, ..., iq−1)=0, on the other hand, data of corresponding Mq bits of the qth information is determined referencing the qth negative-case mapping table taking the exposure time into consideration from the combination pattern of {R(t', i1, i2, ..., iq−1, 1), R(t', i1, i2, ..., iq−1, 2), ..., R(t', i1, i2, ..., iq−1, Hq×Vq)}, and added to a tail end of the memory employed in the receiving apparatus 200 to be used as storage means for storing the qth information.

It is to be noted that, in accordance with condition 22 described above, for Mq=0, data of the qth bit is not included and, hence, none is added to a tail end of the memory for storing the qth information. In this case, the value of {R(t', i1, i2, ..., iq−1, 1), R (t', i1, i2, ..., iq−1, 2), ..., R(t', i1, i2, ..., iq−1, Hq×Vq)} should be represented by a specific pattern at all the times.

Then, the flow of the processing goes on to the next step S169-1 of the flowchart shown in FIG. 37 to form a judgment as to whether or not the value of iq−1 is smaller than (Hq1×Vq−1). If the value of iq−1 is smaller than (Hq1×Vq−1), the flow of the processing goes on to a step S170-1. At the step S170-1, the value of iq−1 is incremented by 1. Then, the flow of the processing goes back to the step S168. If the value of iq−1 is not smaller than (Hq1×Vq−1), on the other hand, the flow of the processing goes on to a step S169-2.

At the step S169-2, the value of iq−2 is compared with (Hq2×Vq−2) to form a judgment as to whether or not the value of iq−2 is smaller than (Hq2×Vq−2). If the value of iq−2 is smaller than (Hq2×Vq−2), the flow of the processing goes on to a step S170-2. At the step S170-2, the value of iq−2 is incremented by 1. Then, the flow of the processing goes back to the step S167-(q−1). If the value of iq−2 is not smaller than (Hq2×Vq−2) on the other hand, the flow of the processing goes on to a step S169-3.

At the step S169-3, the value of iq−3 is compared with (Hq3×Vq−3) to form a judgment as to whether or not the value of iq−3 is smaller than (Hq3×Vq−3). If the value of iq−3 is smaller than (Hq3×Vq−3), the flow of the processing goes on to a step S170-3. At the step S170-3, the value of iq−3 is incremented by 1. Then, the flow of the processing goes back to the step S167-(q−2). If the value of iq−3 is not smaller than (Hq3×Vq−3), on the other hand, the flow of the processing goes on to a step S169-4.

Thereafter, the same process as the step S169-3 is carried out repeatedly at each of the subsequent steps S169-4, S169-5 and so on. At a step S169-(q−1), the value i1 is compared with (H1×V1) to form a judgment as to whether or not the value i1 is smaller than (H1×V1). If the value i1 is smaller than (H1×V1), the flow of the processing goes on to a step S170-(q−1). At the step S170-(q−1), the value of i1 is incremented by 1. Then, the flow of the processing goes back to the step S167-2. If the value i1 is not smaller than (H1×V1), on the other hand, the flow of the processing goes on to a step S171. It is to be noted that steps S169-4 to S169-(q−2) and steps S170-4 to S170-(q−2) are omitted from the flowchart in order to prevent the flowchart from being crowded with identical steps.

At the step S171, the variable t' representing a time is compared with the time T to form a judgment as to whether or not the variable t' is earlier than the time T. If the variable t' is earlier than the time T, the flow of the processing goes on to a step S172. At the step S172, the variable t is incremented by P(q) in order to prepare for a process for the next time and, then, the flow of the processing goes back to the step S167-1.

If the variable t' is not earlier than the time T, on the other hand, the execution of the whole processing routine is ended. This is because R(t', i1, i2, ..., iq−1, iq) for all the values of t', all the values of i1 (that is, for i1=1, 2, ..., H1×V1), all the values of i2 (that is, for i2=1, 2, ..., H2×V2), ... and all the values of iq (that is, for iq=1, 2, ..., Hq×Vq) have been restored to the qth information. In this case, the value of t' is a multiple of (that is, one time, two times and so on) P (q) and not later than the time T.

By referring to the flowcharts shown in FIGS. 33 and 34 as well as FIGS. 35 to 37, the above description has explained a method adopted by the decoder 203 of the receiving apparatus 200 to restore an input time-series two-dimensional light-emitting pattern generated by the two-dimensional light-emitting unit 103 information, which can be any one of pieces of information ranging from the first information, to the qmax-th information.

As is obvious from the above description, for a time-series two-dimensional light-emitting pattern generated by the two-dimensional light-emitting unit 103, the relation F1(q) >F0 (q) holds true. That is to say, a ratio F1 (q) of the number of ON LEDs in a rectangular LED block indicated by S(t, i1, i2, ..., iq) at a time t to the total number of all LEDs in the same rectangular LED block for R(t, i1, i2, ..., iq)=1 is different from a ratio F0(q) of the number of ON LEDs in a rectangular LED block indicated by S(t, i1, i2, ..., iq) at a time t' to the total number of all LEDs in the same rectangular LED block for R(t', i1, i2, ..., iq)=0.

Thus, the average brightness of LEDs included in a rectangular LED block indicated by S(t, i1, i2, ..., iq) at a time t can be found and compared with F1(q) and F0 (q) to determine the value of R(t, i1, i2, ..., iq). This is because the average brightness of LEDs included in a rectangular LED block indicated by S(t, i1, i2, ..., iq) at a time t represents the ratio of the number of ON LEDs in the same rectangular LED block at a time t to the total number of all LEDs in the same rectangular LED block.

In addition, with the time t' being a multiple of P (q), for R(t', i1, i2, ..., iq)=1, at a time t between (t'−P(q)+1) and t', LEDs in the rectangular LED block indicated by S(t, i1, i2, ..., iq) are turned on always at a ratio of F1 (q). For R(t', i1, i2, ..., iq)=0, on the other hand, at a time t between (t'−P(q)+1) and t', LEDs in the rectangular LED block indicated by S(t, i1, i2, ..., iq) are turned on always at a ratio of F0 (q). On the basis of these facts, by using the value of a picture taken by the camera 201 of the receiving apparatus 200 at a continuous exposure from the time (t'−P(q)+1) to the time t' or by using an average value of a plurality of pictures taken by the camera 201 of the receiving apparatus 200 at shorter time intervals from the time (t'−P(q)+1) to the time t', it is possible to find the ratio of the number of ON LEDs in a rectangular LED block indicated by S(t, i1, i2, . . . , iq) from the time (t'−P (q)+1) to the time t' to the total number of all LEDs in the same rectangular LED block and, hence, possible to find the value of R(t, i1, i2, . . . , iq) at any value of t.

As described above, as a method of mapping input data onto a LED blinking pattern of the two-dimensional light-emitting unit 103, it is possible to adopt a method satisfying conditions 21, 22, 23, 24 and 21' described above. It is also possible to conceive another mapping method satisfying conditions described as follows.

Condition 31

With the time t' being a multiple of P(q), in the case of R(t', i1, i2, . . . , iq−1)=1, a combination pattern of {R(t', i1, i2, . . . , iq−1, 1), R(t', i1, i2, . . . , iq−1, 2), . . . , R(t', i1, i2, . . . , iq−1, Hq×Vq)} for input data consisting of Lq bits is determined. The number of elements included in the combination pattern of {R(t', i1, i2, . . . , iq−1, 1), R(t', i1, i2, . . . , iq−1, 2), . . . , R (t', i1, i2, . . . , iq−1, Hq×Vq)} for the input data consisting of Lq bits is Hq×Vq. At least one of the Hq×Vq elements has a value of 1. In addition, if the input data consisting of Lq bits changes, the combination pattern of {R(t', i1, i2, . . . , iq−1, 1), R(t', i1, i2, . . . , iq−1, 2), . . . , R(t' i1, i2, . . . , iq−1, Hq×Vq)} for the input data consisting of Lq bits also changes as well.

In this case, symbol Lq denotes a constant of at least 1. The input data consisting of Lq bits is Lq-bit data included in the qth information. A relation used to determine a combination pattern of {R(t', i1, i2, . . . , iq−1, 1), R(t', i1, i2, . . . , iq−1, 2), . . . , R(t', i1, i2, . . . , iq−1, Hq×Vq)} for the input data consisting of Lq bits is referred to hereafter as a qth-case mapping table taking the exposure time into consideration. Then, the determined value of R(t', i1, i2, . . . , iq−1, iq) is copied to all of R(t'−P(q)+1, i1, i2, . . . , iq−1, iq), R(t'−P (q)+2, i1, i2, . . . , iq−1, iq), . . . and R(t'−1, i1, i2, . . . , iq−1, iq). For P(q)=1, however, there is no copy destination. Thus, it is not necessary to carry out a copy operation.

Condition 32

In the case of R(t, i1, i2, . . . , iq−1)=0, the values of {R(t, i1, i2, . . . , iq−1, 1), R(t, i1, i2, . . . , iq−1, 2), . . . , R(t, i1, i2, . . . , iq−1, Hq×Vq)} are all 0. Thus, the qth information is not transmitted by using {R (t, i1, i2, . . . , iq−1, 1), R(t, i1, i2, . . . , iq−1, 2), . . . , R (t, i1, i2, . . . , iq−1, Hq×Vq)}.

For q=1, however, there is no hierarchical layer above the first hierarchical layer. In such a case, condition 32 is ignored and condition 31 is used as a mapping table taking the exposure time into consideration. That is to say, the mapping table taking the exposure time into consideration satisfies condition 31' described as follows.

Condition 31' (for q=1)

A combination pattern of {R(t', 1), R(t', 2), . . . , R(t', H1×V1)} for input data consisting of Lq bits (that is, L1 bits) is determined. The number of elements included in the combination pattern of {R(t', 1), R(t', 2), . . . , R(t', H1×V1)} for the input data consisting of L1 bits is H1×V1. At least one of the H1×V1 elements has a value of 1. In addition, if the input data consisting of L1 bits changes, the combination pattern of {R(t', 1), R(t', 2), . . . , R(t', H1×V1)} for the input data consisting of L1 bits also changes as well.

In this case, symbol L1 denotes a constant of at least 1. The input data consisting of L1 bits is L1-bit data included in the first information. A relation used to determine a combination pattern of {R(t', 1), R(t', 2), . . . , R(t', H1×V1)} for the input data consisting of L1 bits is referred to hereafter as a first-case mapping table taking the exposure time into consideration. Then, the determined value of R(t', i1) is copied to all of R (t'−P(1)+1, i1), R(t'−P(1)+2, i1), . . . and R(t'−1, i1). For P(1)=1, however, there is no copy destination. Thus, it is not necessary to carry out a copy operation.

There is a plurality of conceivable mapping methods that satisfy conditions 31, 32 and 31'. One of the methods is selected to be adopted as a method common to the encoder 101 and the decoder 203.

By adoption of a mapping method that satisfies conditions 31, 32 and 31' described above, R(t, i1), R (t, i1, i2), . . . , R(t, i1, i2, . . . , iQ) are determined from pieces of information with resolutions ranging from the first resolution to the Qth resolution.

Now, consider a ratio of the number of ON LEDs in a rectangular LED block indicated by S(t, i1, i2, . . . , iq) at a time t to the total number of all LEDs in the same rectangular LED block.

For a value of q (where the value of q is 1 . . . , Q−1), for any value of i1 (where the value of i1 is 1, 2, . . . , H1×V1), for any value of i2 (where the value of i2 is 1, 2, . . . , H1×V1), for any value of iq (where the value of iq is 1, 2, . . . , Hq×Vq) and at any time t (where t=1, 2, . . . , T), R(t, i1, i2, . . . , iq, iq+1) is all 0 in accordance with condition 32 provided that R(t, i1, i2, . . . , iq) is 0. Thus, if R(t, i1, i2, . . . , iq) is 0, the value of R(t, i1, i2, . . . , iQ) is 0 at all the times for any value of iq+1 (where the value of iq+1 is 1, 2, . . . , Hq+1×Vq+1), for any value of iq+2 (where the value of iq+2 is 1, 2, . . . , Hq+2×Vq+2), . . . and for any value of iQ (where the value of iQ is 1, 2, . . . , HQ×VQ). A ratio of the number of ON LEDs in the rectangular LED block indicated by S(t, i1, i2, . . . , iq) to the total number of all LEDs in the same rectangular LED block is 0 at all the times t. Let symbol F0 (q) denote this ratio.

For a value of q (where the value of q is 1, . . . , Q−1), for any value of i1 (where the value of i1 is 1, 2, . . . , H1×V1), for any value of i2 (where the value of i2 is 1, 2, . . . , H1×V1), . . . , for any value of iq (where the value of iq is 1, 2, . . . , Hq×Vq) and at any time t, the value of R(t", i1, i2, . . . , iq) is 1 for all values of t" satisfying the relations (t'−P(q)+1)≦t"≦t' provided that R(t', i1, i2, . . . , iq) is 1. In this case, the value of t' is a multiple of P(q) and satisfies the relations (t'−P(q)+1)≦t≦t'. In addition, from the fact that P(q) is a multiple of P(q+1) and from condition 31, at least one of the values of R(t, i1, i2, . . . , iq, iq+1) is 1. Furthermore, from the fact that P(q+1) is a multiple of P(q+2) and from condition 31, at least one of the values of R(t, i1, i2, . . . , iq, iq+1, iq+2) is 1.

The reasoning described above is repeated as follows. If R(t, i1, i2, . . . , iq) is 1, R(t, i1, i2, . . . , iQ) is 1 for at least a value of iq+1 (where the value of iq+1, is 1, 2, . . . , Hq+1×Vq+1), for at least a value of iq+2 (where the value of iq+2 is 1, 2, . . . , Hq+2×Vq+2), . . . and for at least a value of iQ (where the value of iQ is 1, 2, . . . , HQ×VQ). This means that, at a time t, 1×1 LED indicated by S(t, i1, i2, . . . , iQ) is ON. In other words, if R(t, i1, i2, . . . , iq) is 1, the ratio of the number of ON LEDs in the rectangular LED block indicated by S(t, i1, i2, . . . , iq) to the total number of all LEDs in the same rectangular LED block at the time t is not always fixed. However, the ratio is certainly greater than 0. Let symbol F1 (q) denote this value of the ratio.

Thus, even if a mapping method satisfying such a condition is determined, a relation of F1 (q)>F0 (q) holds true. In addition, since F0 (q) is equal of 0, the receiving apparatus 200 is capable of forming a judgment on R(t, i1, i2, ..., iq) in dependence on whether the ratio of the number of ON LEDs in the rectangular LED block indicated by S(t, i1, i2, ..., iq) to the total number of all LEDs in the same rectangular LED block at the time t is equal of 0 or greater than 0. In addition, for a value of t' equal to a multiple of P(q) and for R (t, i1, i2, ..., iq)=1, during a period from the time t=t'−P(q)+1 to the time t', LEDs in the rectangular LED block indicated by S(t, i1, i2, ..., iq) are in an ON state always at a ratio other than 0. That is to say, during the period from the time t=t'−P(q)+1 to the time t', one or more LEDs in the rectangular LED block indicated by S(t, i1, i2, ..., iq) are in an ON state. In some cases, a specific LED in the rectangular LED block indicated by S(t, i1, i2, ..., iq) is in an ON state continuously during the period from the time t=t'−P (q)+1 to the time t'. In other cases, a plurality of LEDs in the rectangular LED block indicated by S(t, i1, i2, ..., iq) is turned on and off from time to time so that, at any time, at least one of the LEDs is in an ON state.

In this case, the processing carried out by the encoder 101 employed in the transmitting apparatus 100 is about the same as the processing described earlier by referring to the flowcharts shown in FIGS. 29 and 30 to 32. In this case, however, the encoder 101 carries out processes different from those performed at the steps S123 of the flowchart shown in FIG. 30 and the S128 of the flowchart shown in FIG. 31.

In this case, in the process corresponding to the step S123, L1 bits are fetched from the head of the first information and a combination pattern corresponding to the L1 bits is found by referencing a first-case mapping table taking the exposure time into consideration. Then, the combination pattern is used as a value of {R(t', 1), R(t', 2), ..., R(t', H1×V1)}. That is to say, values of R(t', 1), R(t', 2), ..., R(t', H1×V1) are set. Then, the determined value of R(t', i1) is copied to all of R (t'−P(1)+1, i1), R(t'−P(1)+2, i1), and R(t'−1, i1) for all values of i1 where i1=1, 2, ..., H1×V1. For P(1)=1, however, there is no copy destination. Thus, it is not necessary to carry out a copy operation. Subsequently, the L1 bits fetched from the head of the first information are discarded and the bits following the L1 bits are shifted to the head of the first information.

In the process corresponding to the step S128, the value of R(t', i1, i2, ..., iq−1) specified by the present values of t', i1, i2, ... and iq−1 is also examined.

To put it in detail, if R(t', i1, i2, ..., iq−1) is 1, Lq bits are fetched from the head of the qth information and a combination pattern corresponding to the Lq bits is found by referencing the qth-case mapping table taking the exposure time into consideration. Then, the combination pattern is used as the value of {R(t', i1, i2, ..., iq−1, 1), R(t', i1, i2, ..., iq−1, 2), R (t', i1, i2, ..., iq−1, Hq×Vq)}. That is to say, values of R(t', i1, i2, ..., iq−1, 1), R(t', i1, i2, ..., iq−1, 2), ..., R(t', i1, i2, ..., iq−1, Hq×Vq) are set. Then, the determined value of R(t', i1, i2, ..., iq−1, iq) is copied to all of R(t'−P(q)+1, i1, i2, ..., iq−1, iq), R(t'−P (q)+2, i1, i2, ..., iq−1, iq), and R(t+−1, i1, i2, ..., iq−1, iq) for all values of iq where iq=1, 2, ..., Hq×Vq. For P(q)=1, however, there is no copy destination. Thus, it is not necessary to carry out a copy operation. Subsequently, the Lq bits fetched from the head of the qth information are discarded and the bits following the Lq bits are shifted to the head of the qth information.

In the case of R(t', i1, i2, ..., iq−1)=0, on the other hand, the values of R(t, i1, i2, ..., iq−1, 1), R(t, i1, i2, ..., , ..., iq−1, 2), ... and R(t, i1, i2, ..., iq−1, Hq×Vq) are all set at 0. In this case, the variable t has any value in the entire range t'−P(q)+1 to t'. The bits at the head of the qth information are not discarded.

In addition, in this case, the processing carried out by the decoder 203 employed in the receiving apparatus 200 is about the same as the processing described earlier by referring to the flowcharts shown in FIGS. 33, 34 and 35 to 37. In this case, however, the decoder 203 carries out processes different from those performed at the step S151 of the flowchart shown in FIG. 34, the step S163 of the flowchart shown in FIG. 35 and the step S168 shown in FIG. 36.

In this case, in the process corresponding to the step S151, the ratio of the number of ON LEDs in the rectangular LED block indicated by S(t', i1, i2, ..., iq) to the total number of all LEDs in the same rectangular LED block at the time t' is examined to form a judgment as to whether or not the ratio is equal of 0. If the ratio of the number of ON LEDs in a rectangular LED block is not equal of 0, the flow of the processing goes on to a step S152. If the ratio of the number of ON LEDs in a rectangular LED block is equal of 0, on the other hand, the flow of the processing goes on to a step S153.

In addition, in the process corresponding to the step S163, data of the corresponding L1 bits of the first information is determined by referencing the first-case mapping table taking the exposure time into consideration from the pattern {R(t', 1), R(t', 2), ..., R(t', H1×V1)}, and added to a tail end of a memory employed in the receiving apparatus 200 but shown in none of the figures. The memory is used as storage means for storing the first information by adding such data to its tail from time to time.

Furthermore, in the process corresponding to the step S168, the value of R(t', i1, i2, ..., iq−1) specified by the present values of t', i1, i2, ... and iq−1 is examined.

To put it in detail, if R(t', i1, i2, ..., iq−1) is 1, data of corresponding Lq bits of the qth information is determined from the combination pattern of {R(t', i1, i2, ..., iq−1, 1), R(t', i1, i2, ..., iq−1, 2), ..., R(t', i1, i2, ..., iq−1, Hq×Vq)} by referencing the qth-case mapping table taking the exposure time into consideration, and added to a tail end of a memory employed in the receiving apparatus 200 as described above to be used as storage means for storing the qth information by adding such data to its tail from time to time.

In the case of R(t', i1, i2, ..., iq−1)=0, on the other hand, the combination pattern of {R(t', i1, i2, ..., iq−1, 1), R(t', i1, i2, ..., iq−1, 2), R(t', i1, i2, ..., iq−1, Hq×Vq)} is 0 at all the times and, since the information of the qth bit is not included, none is added to a tail end of the memory for storing the qth information.

In this way, by adopting a mapping method satisfying conditions 31, 32 and 31' described above, the receiving apparatus 200 is also capable of receiving information at hierarchical layers ranging from the first layer to the qmaxth one. The received information is among information transmitted by the transmitting apparatus 100 at hierarchical layers ranging from the first layer to the qth layer.

It is to be noted that this specification does not include a description of correction of errors included in transmitted data. In the field of communications, however, there is generally adopted an additional error-correction function based on parity bits added to transmitted data. Since such an error-correction function is commonly known, its explanation is omitted from this specification. That is to say, also in the case of the present invention, it is possible to provide a configuration in which parity bits are added to information to be transmitted so that the receiving apparatus 200 is capable of correcting errors.

In addition, while the two-dimensional light-emitting unit 103 includes a plurality of LEDs laid out to form a matrix in the embodiments described above, it is needless to say that light-emitting devices other than the LEDs may also be employed.

As has been described in detail above, in accordance with the present invention, it is possible to properly encode data to be transmitted into a transmitted optical signal expressed by a blinking pattern of a light and possible to properly decode the blinking pattern. By virtue of the present invention, it is thus possible to provide an excellent data-encoding apparatus, an excellent data-encoding method to be adopted by the data-encoding apparatus, an excellent data-decoding apparatus, an excellent data-decoding method to be adopted by the data-decoding apparatus, an excellent data-transmitting apparatus employing the data-encoding apparatus, an excellent data-receiving apparatus employing the data-decoding apparatus, an excellent computer program implementing the data-encoding method, an excellent computer program implementing the data-decoding method and an excellent storage mediums for storing the computer programs.

In addition, in accordance with the present invention, it is possible to properly encode data to be transmitted into a transmitted optical signal expressed by a blinking pattern of light sources laid out to form a two-dimensional matrix and possible to properly decode the blinking pattern. By virtue of the present invention, it is thus possible to provide an excellent data-encoding apparatus, an excellent data-encoding method to be adopted by the data-encoding apparatus, an excellent data-decoding apparatus, an excellent data-decoding method to be adopted by the data-decoding apparatus, an excellent data-transmitting apparatus employing the data-encoding apparatus, an excellent data-receiving apparatus employing the data-decoding apparatus, an excellent computer program implementing the data-encoding method, an excellent computer program implementing the data-decoding method and an excellent storage mediums for storing the computer programs.

Furthermore, in accordance with the present invention, it is possible to decode data to be transmitted into an optical signal expressed by a blinking pattern of light sources laid out to form a two-dimensional matrix so that the data can be transmitted at a bit rate according to the distance to a transmission target of the optical signal and possible to decode the blinking pattern. By virtue of the present invention, it is thus possible to provide an excellent data-encoding apparatus, an excellent data-encoding method to be adopted by the data-encoding apparatus, an excellent data-decoding apparatus, an excellent data-decoding method to be adopted by the data-decoding apparatus, an excellent data-transmitting apparatus employing the data-encoding apparatus, an excellent data-receiving apparatus employing the data-decoding apparatus, an excellent computer program implementing the data-encoding method, an excellent computer program implementing the data-decoding method and an excellent storage mediums for storing the computer programs.

Moreover, in accordance with the present invention, the space of a two-dimensional blinking pattern output by the data-transmitting apparatus's two-dimensional light-emitting unit including a plurality of LEDs laid out on a two-dimensional planar surface is divided into a plurality of resolution sub-spaces having resolution different from each other. A process carried out by the data-transmitting apparatus to encode data to be transmitted is a process to map the data onto a two-dimensional blinking pattern in the resolution sub-spaces. Thus, by transmitting a two-dimensional blinking pattern obtained as a result of a process to map data to be transmitted in a sub-space at a low resolution, the data-receiving apparatus is capable of reading the two-dimensional blinking pattern even if the data-receiving apparatus is located far away from the data-transmitting apparatus so that the resolution of the data-receiving apparatus is reduced to an insufficient level. If the data-receiving apparatus is taken to a location close to the data-transmitting apparatus so that the resolution of the data-receiving apparatus is increased to a sufficient level, the data-receiving apparatus will be capable of reading a two-dimensional blinking pattern obtained as a result of a process to map data to be transmitted in a sub-space at a high resolution. As a result, even if a data-receiving apparatus is at a location far away from the data-transmitting apparatus, the data-receiving apparatus is capable of obtaining information to a certain degree, allowing a person carrying the data-receiving apparatus to form a judgment as to whether or not it is necessary for the person to approach the data-transmitting apparatus in order to obtain more detailed information.

In addition, in accordance with the present invention, the two-dimensional light-emitting unit is divided into LED blocks each consisting of a plurality of LEDs to be used as means for transmitting information at a hierarchical layer of a certain resolution level. A ratio of the number of LEDs in each LED block to the total number of all LEDs in the same LED block is set by the data-transmitting apparatus at a value determined by the hierarchical layer at which the information to be transmitted is encoded. By finding the ratio of the number of LEDs in each LED block to the total number of all LEDs in the same LED block in a process to decode the received data, the data-receiving apparatus is capable of restoring the data to the original information of the hierarchical layer. To put it in detail, the data-transmitting unit generates a two-dimensional blanking pattern as a low-frequency portion or a high-frequency portion in one of the resolution sub-spaces cited above. The low-frequency portion can be regarded as a signal representing an average value of blinking states of a plurality of LEDs. On the other hand, the high-frequency portion is a signal representing the blinking state of each LED. Inform of one kind is transmitted as a low-frequency portion while information of another kind is transmitted as a high-frequency portion. Thus, if the distance between the data-receiving apparatus and the data-transmitting apparatus serving as a transmission source is long, data transmitted as a low-frequency portion can be read by the data-receiving apparatus.

Furthermore, in accordance with the present invention, the data-transmitting apparatus is capable of controlling the transmission time for each hierarchical layer. To be more specific, the data-transmitting apparatus is capable of transmitting a low-frequency portion at a low transmission speed P(q) (q is a relatively low value). Thus, the data-receiving apparatus is capable of shooting the low-frequency portion by lengthening the exposure time. As a result, a data-receiving apparatus is capable of receiving information of a low-frequency portion transmitted by the data-transmitting apparatus even if the data-receiving apparatus is located far away from the data-transmitting apparatus and, hence, prone to insufficient exposure.

The present invention has been explained by referring to specific embodiments. It is obvious, however, that a person skilled in the art is capable of making changes to the embodiments or designing a substitute for any of the embodiments within a range not departing from the true spirit of the present invention. That is to say, the embodiments of the present invention are each merely a typical implementation of the present invention and are not to be interpreted as limitations to the scope of the present invention described in this specification. The scope of the present invention is determined only by claims appended at the end of this specification.

What is claimed is:

1. A data-encoding apparatus for mapping data onto a pattern in a two-dimensional picture space, said data-encoding apparatus comprising:

space-disassembling means for disassembling said two-dimensional picture space into a plurality of picture sub-spaces having resolution different from each other; and data-mapping means for mapping data onto a pattern in any one of said picture sub-spaces that has a resolution suitable for said data.

2. The data-encoding apparatus according to claim 1, wherein said data-mapping means maps data onto a pattern in one of said picture sub-spaces that has a relatively high resolution by satisfying a pattern obtained as a result of a mapping process carried out on said data in one of said picture sub-spaces that has a relatively low resolution.

3. The data-encoding apparatus according to claim 1, wherein:

said two-dimensional picture space comprises a plurality of light-emitting devices arranged on a two-dimensional planar surface;

said data-mapping means maps data in one of said picture sub-spaces that has a ith resolution onto a pattern by setting a ratio for each area in said two-dimensional picture space at predetermined value where said ratio is a ratio of the number of said light-emitting devices that are in an ON state in said area comprising $n_i$ said light-emitting devices to the number of all said light emitting devices in said area; and for j<k, a relation $n_j<n_k$ holds true where symbols j and k each denote a resolution whereas symbol $n_j$ denotes the number of said light-emitting devices included in said two-dimensional picture space area for the jth resolution and symbol $n_k$ denotes the number of said light-emitting devices included in said two-dimensional picture space area for the kth resolution.

4. The data-encoding apparatus according to claim 1, wherein said data-mapping means:

determines a resolution, at which data is to be encoded in a mapping process in one of said picture sub-spaces that has said resolution, in accordance with the size of said data;

maps data onto a pattern in one of said picture sub-spaces that has a relatively low resolution onto a state recognizable even in an observation of said two-dimensional picture space at an insufficient resolution;

maps finer data onto a pattern in one of said picture sub-spaces that has a high resolution; and maps abstracted rough data onto a pattern in one of said picture sub-spaces that has a low resolution.

5. The data-encoding apparatus according to claim 1, wherein said data-mapping means adds data for correction of errors to each of said picture sub-spaces having different resolution.

6. The data-encoding apparatus according to claim 1, wherein, in a process of encoding data of a computer graphic, said data-mapping means maps geometrical data of a drawing object onto a pattern in one of said picture sub-spaces that has a low resolution and texture data of said drawing object onto a pattern in one of said picture sub-spaces that has a high resolution.

7. The data-encoding apparatus according to claim 6, wherein said data-mapping means selects the resolution of one of said picture sub-levels, in which a mapping process is to be carried out, in accordance with a frequency component of said texture data.

8. A data-encoding method for mapping data onto a pattern in a two-dimensional picture space, said data-encoding method comprising:

a space-disassembling step of disassembling said two-dimensional picture space into a plurality of picture sub-spaces having resolution different from each other; and a data-mapping step of mapping data onto a pattern in any one of said picture sub-spaces that has a resolution suitable for said data.

9. A data-decoding apparatus for decoding data obtained as a result of a mapping process carried out in a two-dimensional picture space, said data-receiving apparatus comprising:

space-disassembling means for disassembling said two-dimensional picture space into one or more picture sub-spaces having resolution different from each other; and data-restoring means for decoding data obtained as a result of a mapping process carried out in any one of said picture sub-spaces that has a resolution suitable for said data.

10. The data-decoding apparatus according to claim 9, wherein:

said data-restoring means restores original data from data obtained as a result of a mapping process carried out in one of said picture sub-spaces that has a ith resolution by decoding a ratio for each area in said two-dimensional picture space where said ratio is a ratio of the number of said light-emitting devices that are in an ON state in said area comprising $n_i$ light-emitting devices to the number of all said light emitting devices in said area; and for j<k, a relation $n_j<n_k$ holds true where symbols j and k each denote a resolution whereas symbol $n_j$ denotes the number of said light-emitting devices included in said two-dimensional picture space area for the jth resolution and symbol $n_k$ denotes the number of said light-emitting devices included in said two-dimensional picture space area for the kth resolution.

11. The data-decoding apparatus according to claim 9, wherein said data-restoring means restores original data from pieces of data obtained as results of mapping processes carried out in said picture sub-spaces that have identifiable resolution.

12. The data-decoding apparatus according to claim 9, wherein said data-restoring means detects the number of errors included in each of said picture sub-spaces by using error-correction data added to each of said picture sub-spaces having different resolution.

13. The data-decoding apparatus according to claim 9, wherein said data-restoring means fetches geometrical data of a drawing object from one of said picture sub-spaces that has a low resolution and fetches texture data of a drawing object from one of said picture sub-spaces that has a high resolution.

14. A data-decoding method for decoding data obtained as a result of a mapping process carried out in a two-dimensional picture space, said data-receiving method comprising:

a space-disassembling step of disassembling said two-dimensional picture space into one or more picture sub-spaces having resolution different from each other; and a data-restoring step of decoding data obtained as a result of a mapping process carried out in any one of said picture sub-spaces that has a resolution suitable for the data.

15. A data-transmitting apparatus for outputting transmitted data in a format of an optical signal, said data-transmitting apparatus comprising:
- two-dimensional light-emitting means including a plurality of light-emitting devices arranged on a two-dimensional planar surface;
- space-disassembling means for disassembling a two-dimensional picture space of blinking states of said light-emitting devices included in said two-dimensional light-emitting means into a plurality of picture sub-spaces having resolution different from each other; and
- data-mapping means for mapping data onto a pattern in any one of said picture sub-spaces that has a resolution suitable for said data, wherein a blinking pattern obtained as a result of a mapping process carried out by said data-mapping means is output by using said light-emitting devices included in said two-dimensional light-emitting means.

16. A data-receiving apparatus used for receiving data transmitted in a format of an optical signal, said data-receiving apparatus comprising:
- shooting means for shooting an optical blinking pattern spread over a two-dimensional planar surface;
- space-disassembling means for disassembling a two-dimensional picture space into one or more picture subspaces having resolution different from each other; and
- data-restoring means for restoring original data by decoding data obtained as a result of a mapping process carried out on said original data in any one of said picture sub-spaces that has a resolution suitable for said original data.

17. The data-receiving apparatus according to claim 16, wherein said data-receiving apparatus further having a perspective-projection means for carrying out a perspective-projection process on the picture of said two-dimensional picture space taken by using said shooting means.

18. A computer program written in a format that can be read for execution by a computer employed in a computer system for carrying out a data-encoding process to map data onto a pattern in a two-dimensional space, said computer program comprising:
- a space-disassembling step of disassembling said two-dimensional picture space into a plurality of picture sub-spaces having resolution different from each other; and
- a data-mapping step of mapping data onto a pattern in any one of said picture sub-spaces that has a resolution suitable for said data.

19. A computer program written in a format that can be read for execution by a computer employed in a computer system for carrying out a data-encoding process to map data onto a pattern in a two-dimensional space, said computer program comprising:
- a space-disassembling step of disassembling said two-dimensional picture space into one or more picture sub-spaces having resolution different from each other; and
- a data-restoring step of restoring original data by decoding data obtained as a result of a mapping process carried out on said original data in any one of said picture sub-spaces that has a resolution suitable for said original data.

* * * * *